(12) United States Patent
Sasaki

(10) Patent No.: US 6,885,519 B2
(45) Date of Patent: Apr. 26, 2005

(54) THIN FILM MAGNETIC HEAD AND THE MANUFACTURING METHOD

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 645 days.

(21) Appl. No.: 09/888,504

(22) Filed: Jun. 26, 2001

(65) Prior Publication Data

US 2002/0030929 A1 Mar. 14, 2002

(30) Foreign Application Priority Data

Jun. 28, 2000 (JP) ........................................ 2000-195125

(51) Int. Cl.$^7$ ............................................. G11B 5/147
(52) U.S. Cl. ...................................................... 360/126
(58) Field of Search ................................. 360/126, 125, 360/120, 119, 317

(56) References Cited

U.S. PATENT DOCUMENTS

| | | | |
|---|---|---|---|
| 5,224,002 A | * | 6/1993 | Nakashima et al. ........ 360/126 |
| 5,438,747 A | | 8/1995 | Krounbi et al. |
| 5,600,519 A | | 2/1997 | Heim et al. |
| 5,739,991 A | * | 4/1998 | Matono et al. ............. 360/317 |
| 6,137,652 A | * | 10/2000 | Ezaki et al. ................ 360/317 |
| 6,510,025 B1 | * | 1/2003 | Narumi et al. ............. 360/126 |
| 6,731,460 B1 | * | 5/2004 | Sasaki ........................ 360/126 |

FOREIGN PATENT DOCUMENTS

| | | |
|---|---|---|
| JP | A 7-262519 | 10/1995 |
| JP | A 8-249614 | 9/1996 |
| JP | 10-269524 | * 10/1998 |

\* cited by examiner

Primary Examiner—Allen Cao
(74) Attorney, Agent, or Firm—Oliff & Berridge, PLC

(57) ABSTRACT

Provided are a thin film magnetic head having superior overwrite characteristics as well as having a locally minimized pole width and a method of manufacturing the same. A top pole chip comprises a first magnetic film that is a top layer portion of the top pole chip, and a second magnetic film that is a bottom layer portion of the top pole chip. Both the first and second magnetic films are made of a magnetic material having a high magnetic flux density of 1.5 tesla or more. Even when the pole width is locally minimized to about 0.3 $\mu$m or less, the saturation of magnetic flux in the top pole chip can be prevented, and therefore superior overwrite characteristics can be ensured.

17 Claims, 29 Drawing Sheets

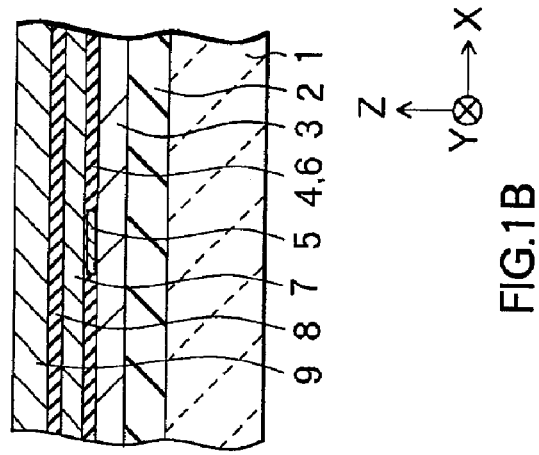
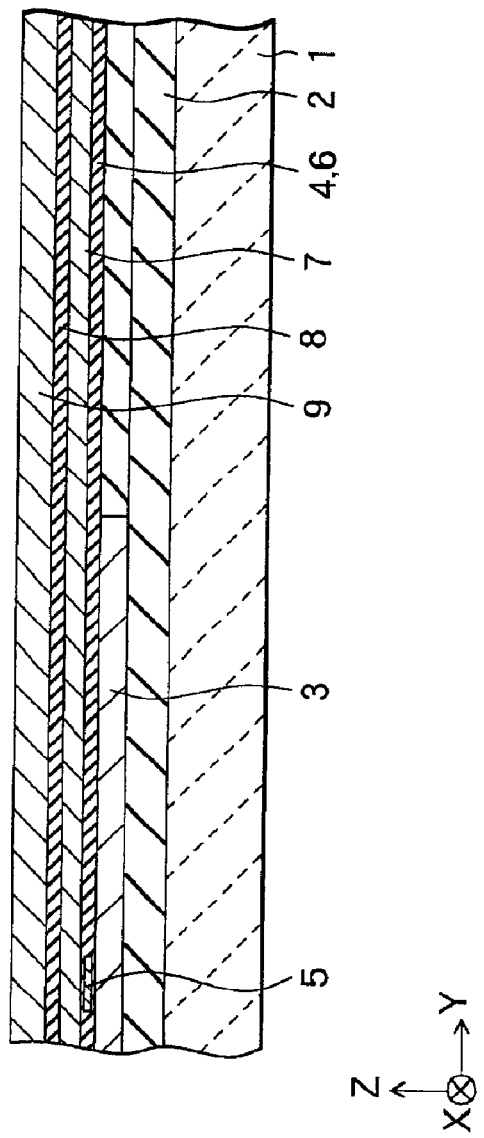
FIG.1A
FIG.1B

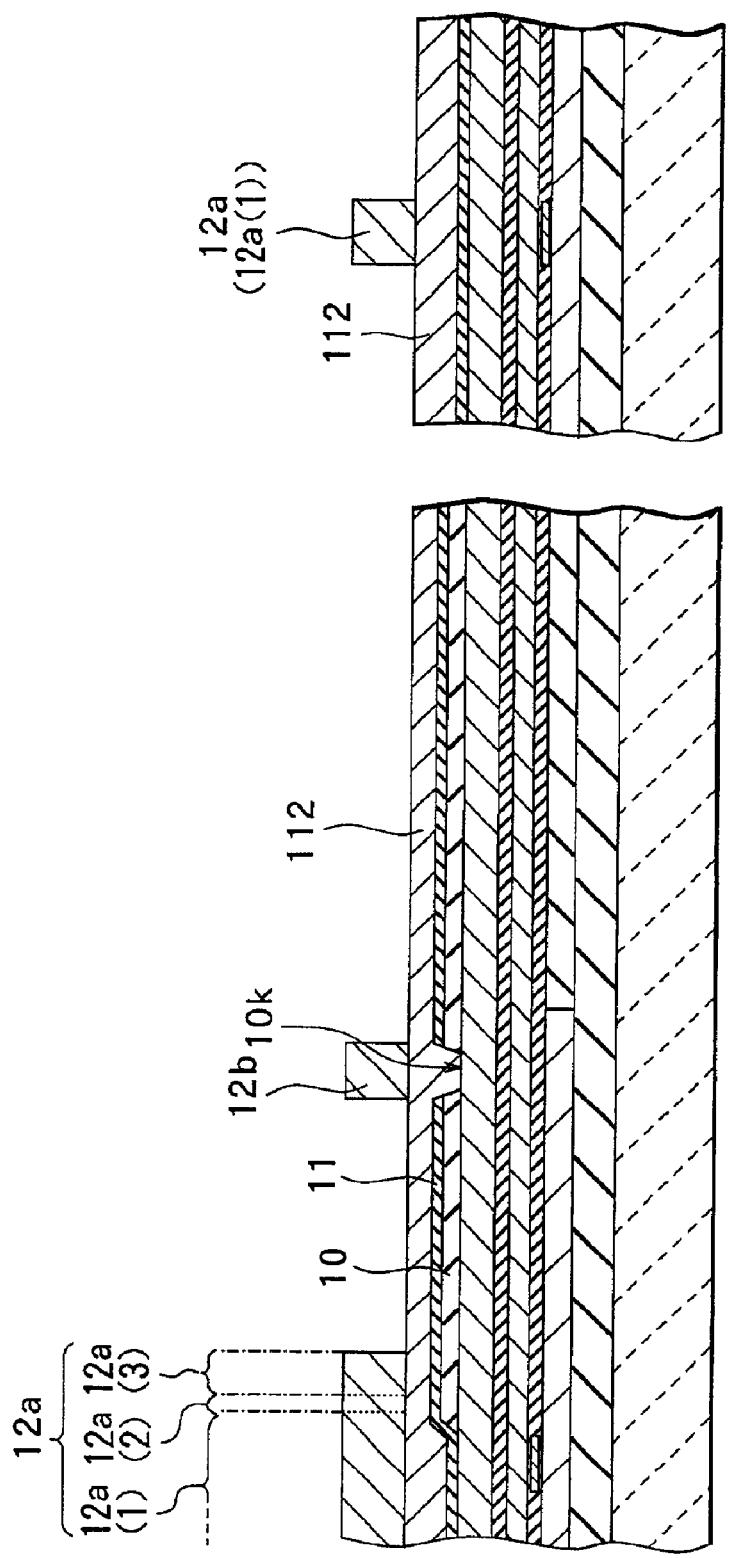
FIG.3A
FIG.3B

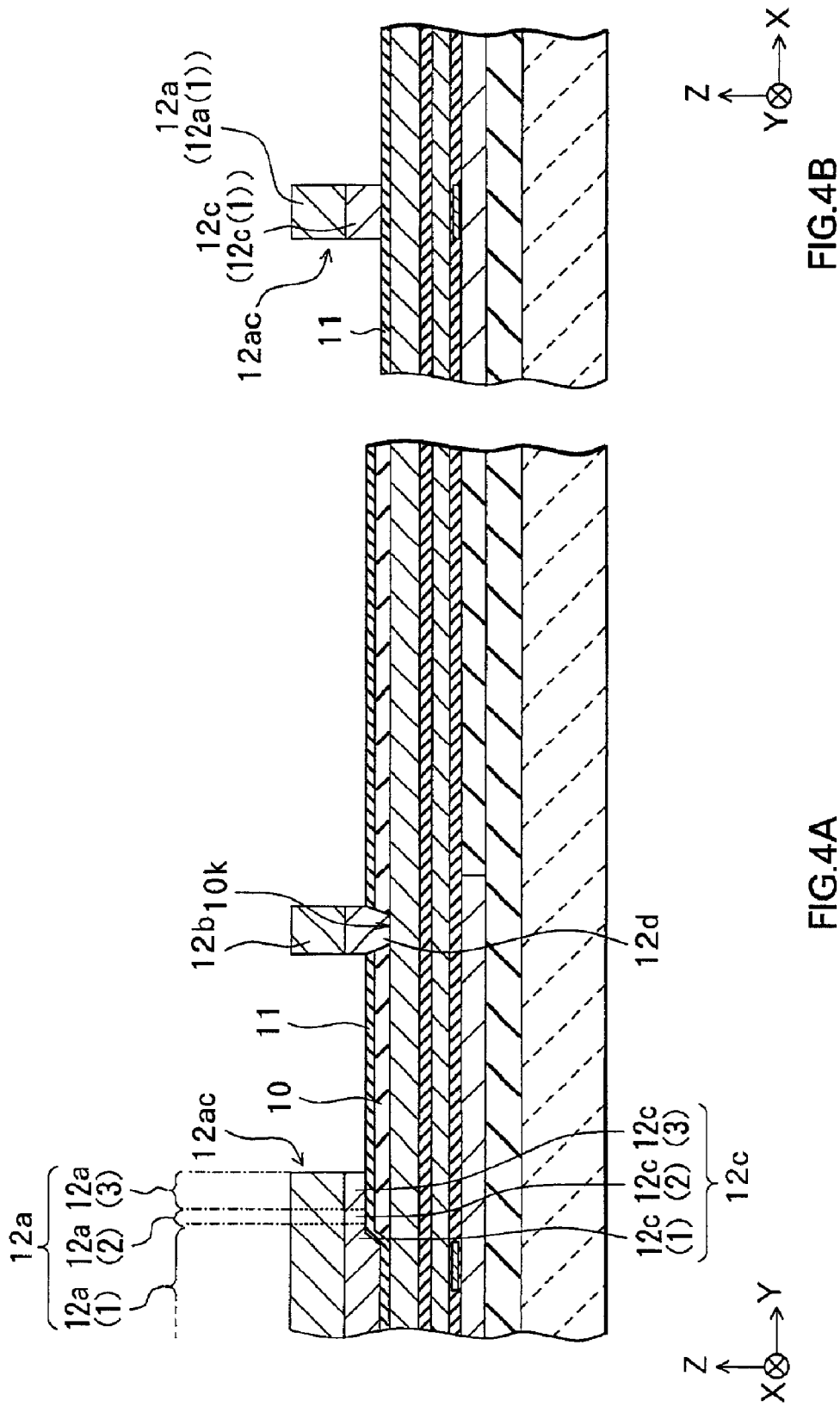

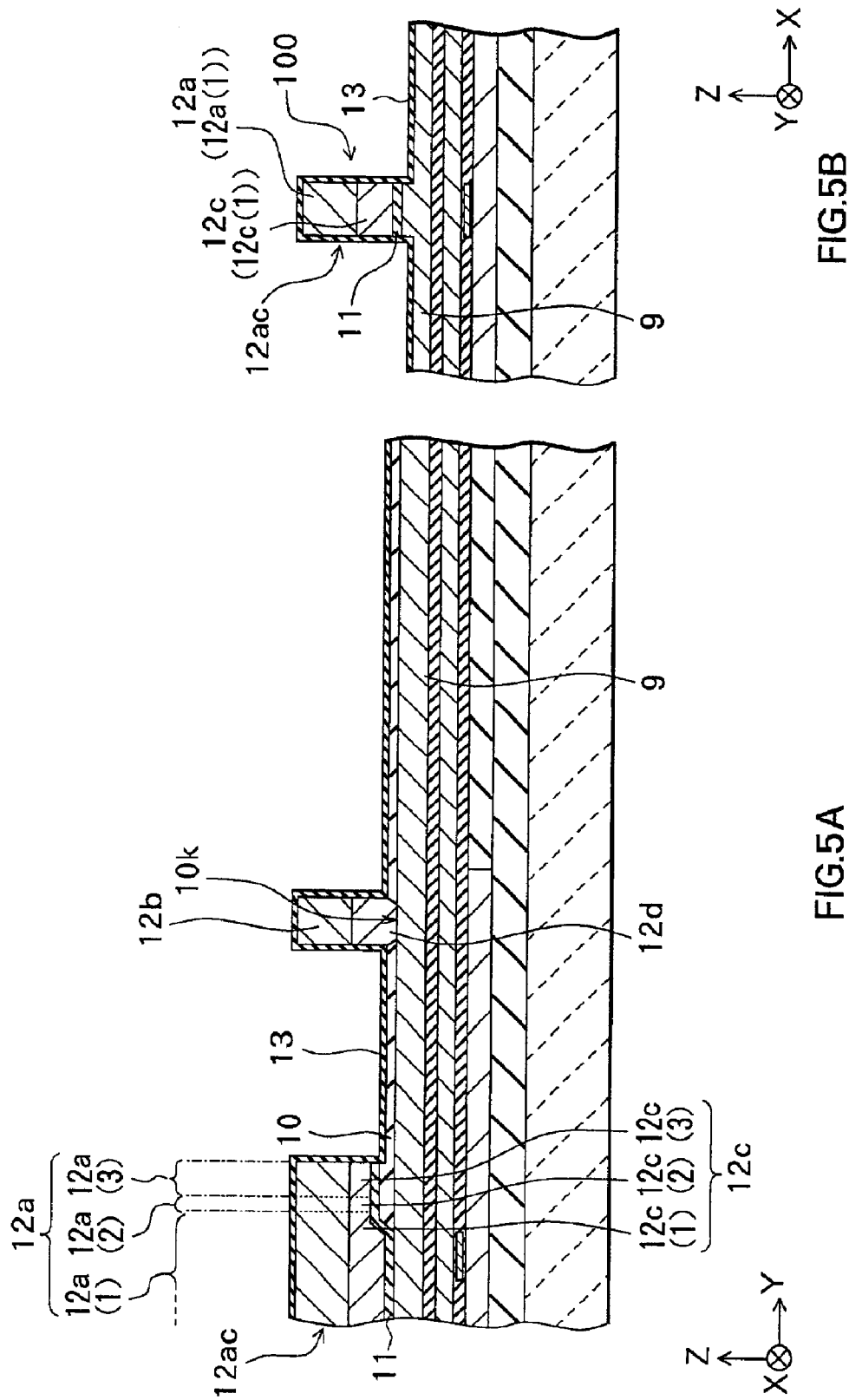

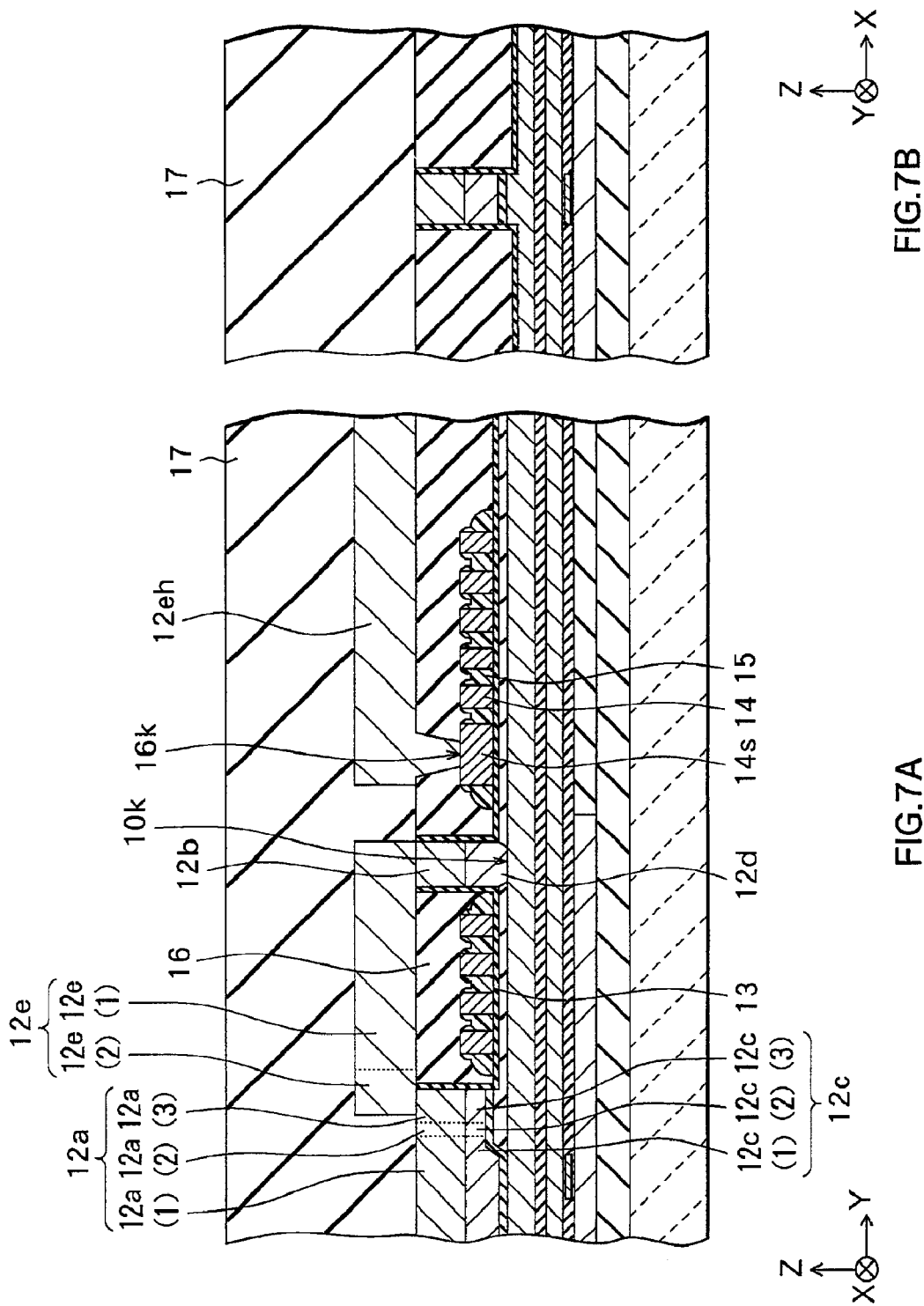

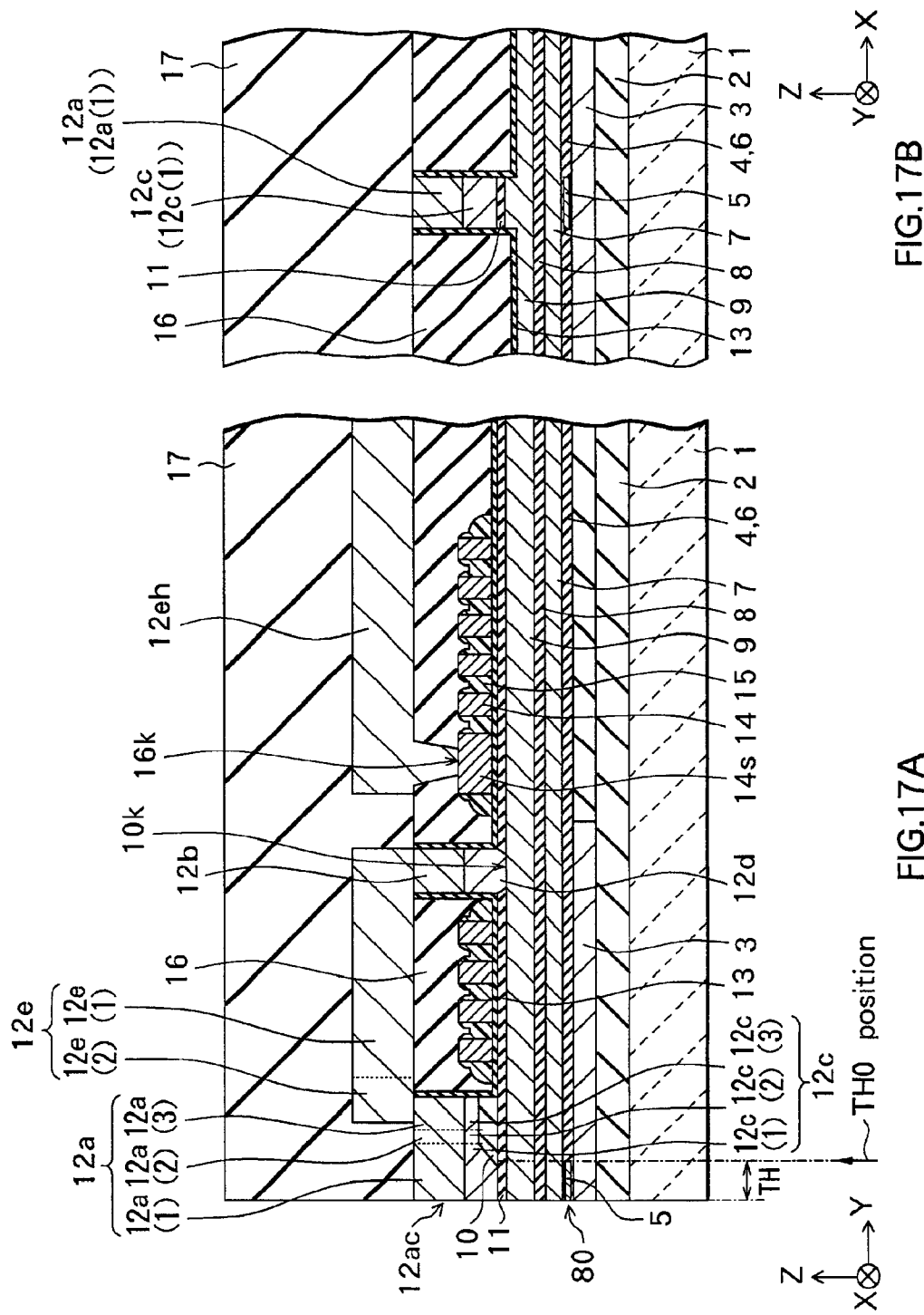

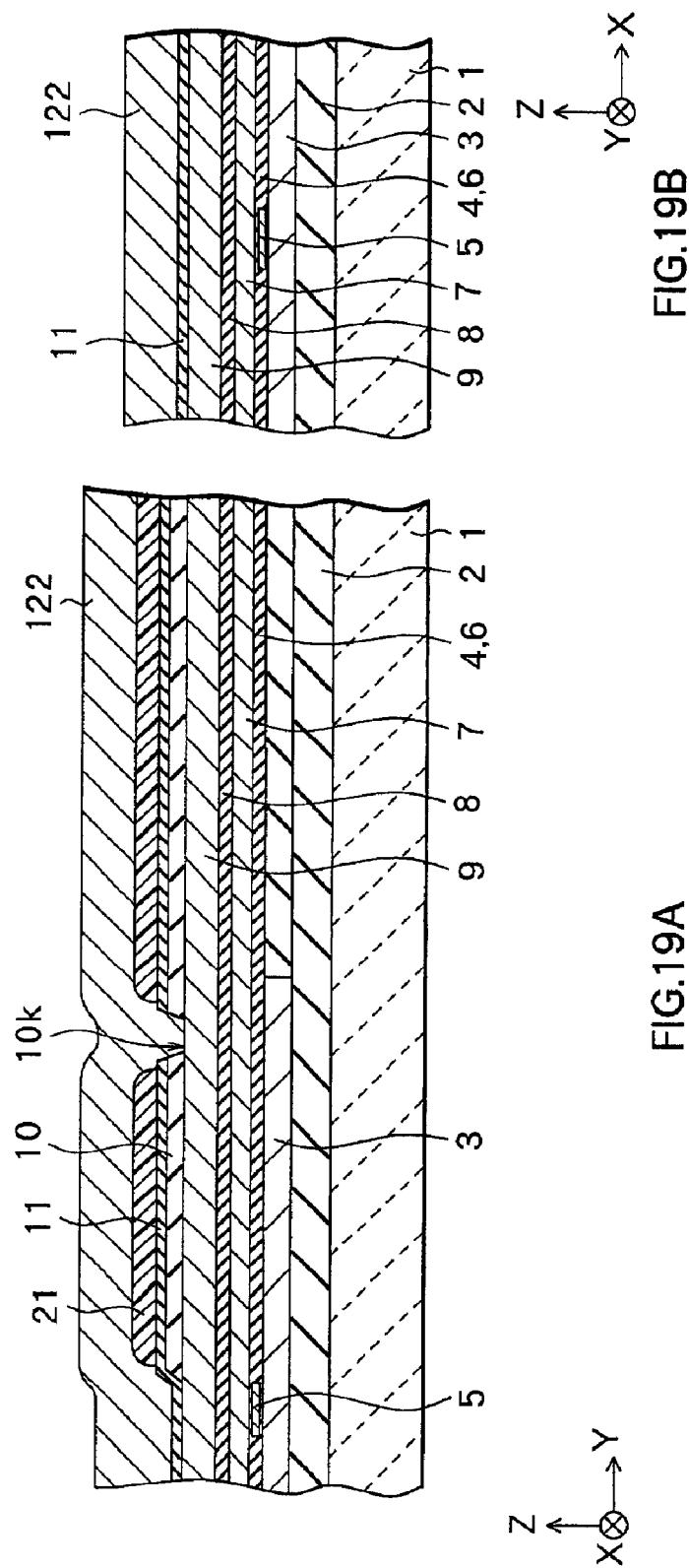

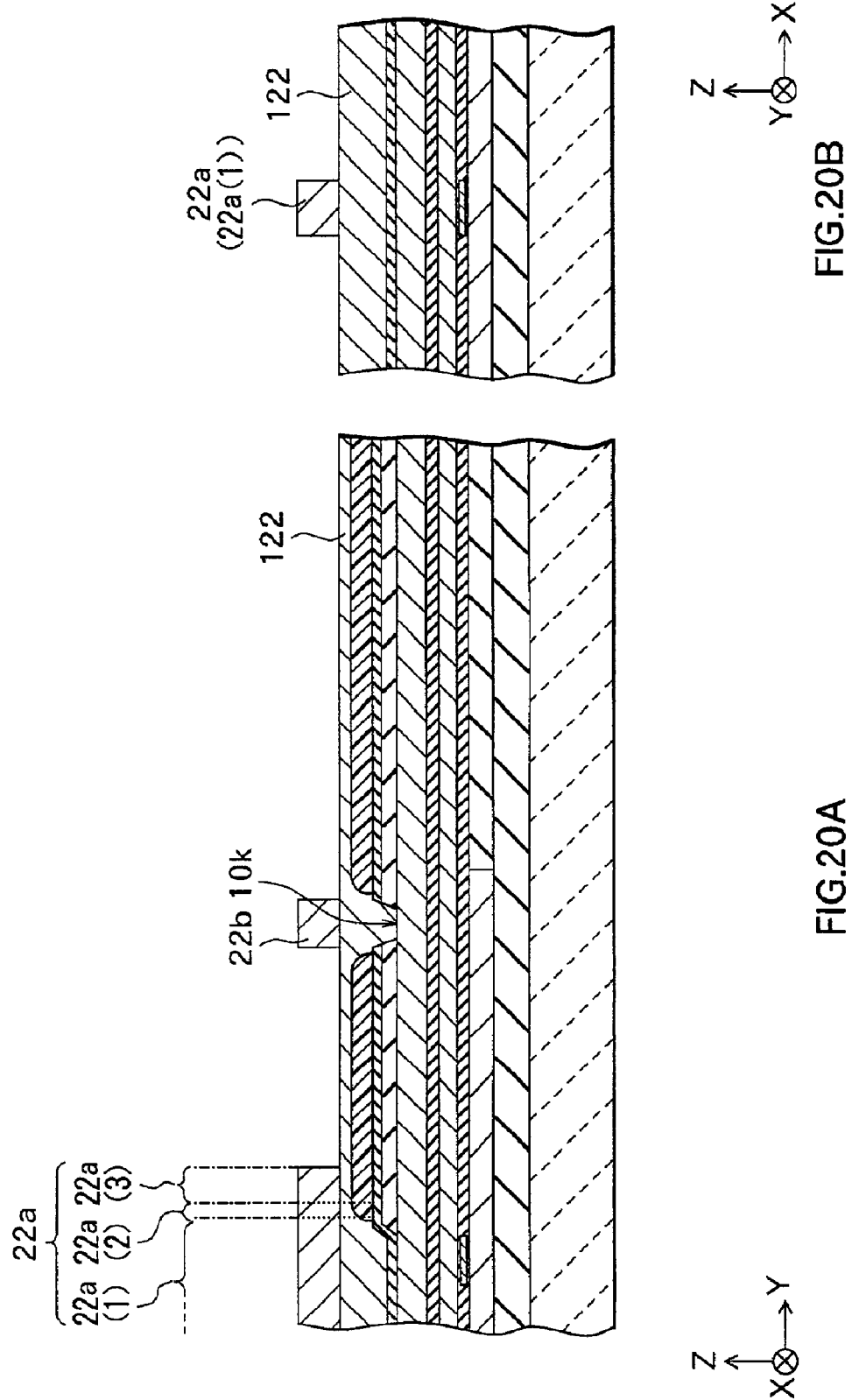

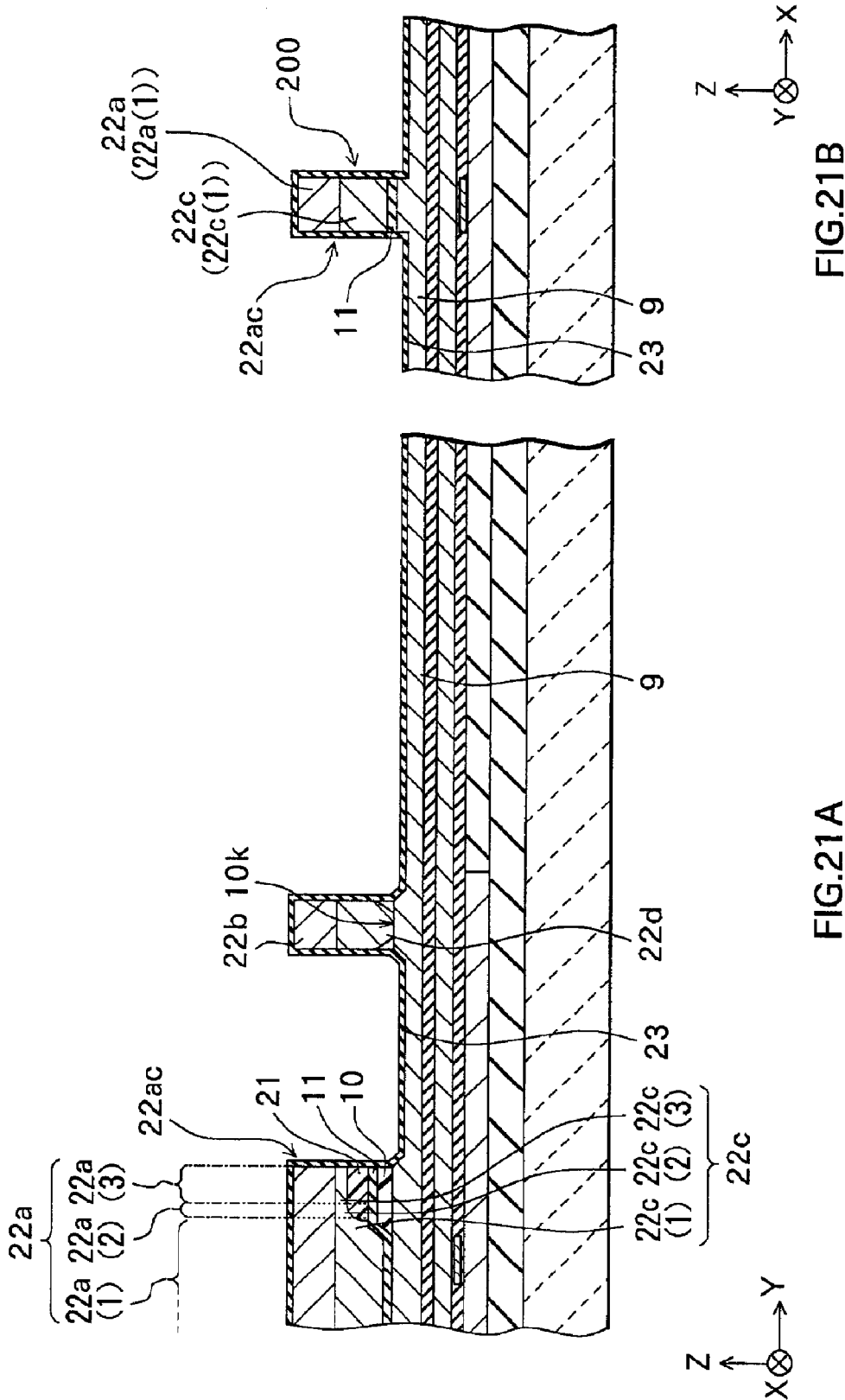

TRLATED ART

THIN FILM MAGNETIC HEAD AND THE MANUFACTURING METHOD

BACKGROUND OF THE INVENTION

1. Field of Invention

The invention relates to a thin film magnetic head having at least an inductive magnetic transducer for writing, and a method of manufacturing the same.

2. Description of Related Art

Recently, an improvement in performance of a thin film magnetic head has been sought in accordance with an increase in a surface recording density of a hard disk drive. A composite thin film magnetic head, which has a stacked structure comprising a recording head having an inductive magnetic transducer for writing and a reproducing head having a magnetoresistive (hereinafter referred to as MR) element for reading, is widely used as the thin film magnetic head.

To increase a recording density of the performance of the recording head, it is necessary to increase a track density on a magnetic recording medium. For this purpose, it is necessary to realize a recording head having a narrow track structure in which a top pole and a bottom pole, which are formed on and under a write gap therebetween, respectively, have a narrow width that is from a few microns to the submicron order on an air bearing surface, and semiconductor fabrication technology is used in order to achieve the above-mentioned recording head.

The description is now given with reference to FIGS. 29 to 34 with regard to a method of manufacturing a composite thin film magnetic head as an example of a method of manufacturing a thin film magnetic head of the related art.

In the manufacturing method, first of all, as shown in FIG. 29, an insulating layer 102 made of, for example, aluminum oxide ($Al_2O_3$, hereinafter referred to as "alumina") is deposited with a thickness of about 5.0 $\mu$m to 10.0 $\mu$m on a substrate 101 made of, for example, altic ($Al_2O_3$—TiC). Then, a bottom shield layer 103 for a reproducing head is formed on the insulating layer 102. Then, an alumina layer, for example, is deposited with a thickness of 100 nm to 200 nm on the bottom shield layer 103 by means of sputtering, and thus a shield gap film 104 is formed. Then, an MR film 105 for constituting an MR element for reproducing is formed with a thickness of a few tens of nanometers on the shield gap film 104 in such a manner that the MR film 105 has a desired pattern by means of high-accuracy photolithography. Then, lead layers (riot shown) for functioning as lead electrode layers to be electrically connected to the MR film 105 are formed on both sides of the MR film 105. After that, a shield gap film 106 is formed on the lead layers, the shield gap film 104 and the MR film 105, and thus the MR film 105 is sandwiched in between the shield gap films 104 and 106. Then, a top shield-cum-bottom pole (hereinafter referred to as "a bottom pole") 107 made of a magnetic material for use in both the reproducing and recording heads, e.g., a nickel-iron alloy (NiFe, hereinafter referred to as "Permalloy (a trade name)") is formed on the shield gap film 106.

Then, as shown in FIG. 30, a write gap layer 108 made of an insulating material, e.g., alumina is formed on the bottom pole 107. Then, a photoresist film 109 is formed into a predetermined pattern on the write gap layer 108 by means of high-accuracy photolithography. Then, a thin film coil 110 made of, for example, copper (Cu) for an inductive recording head is formed on the photoresist film 109 by means of electroplating. Then, a photoresist is formed into a predetermined pattern by means of high-accuracy photolithography so as to coat the photoresist film 109 and the thin film coil 110, and thereafter the photoresist is subjected to heat treatment at a temperature of 250 degrees, for example. By this heat treatment, a photoresist film 111 for providing insulation between windings of the thin film coil 110 is formed.

Then, as shown in FIG. 31, a part of the write gap layer 108, which is located rearward with respect to the thin film coil 110 (on the right side in FIG. 31), is etched in order to form a magnetic path, whereby an opening 108a is formed and thus the bottom pole 107 is partly exposed. Then, a top yoke-cum-top pole (hereinafter referred to as "a top pole") 112 made of a magnetic material for the recording head, e.g., Permalloy is formed by means of electroplating so as to coat an exposed surface of the bottom pole 107, the photoresist film 11 and the write gap layer 108. For example, the top pole 112 has a planar shape shown in FIG. 34 to be described later and includes a yoke portion 112a and a pole chip portion 112b. The top pole 112 is in contact with and magnetically coupled to the bottom pole 107 in the opening 108a. Then, the respective parts of the write gap layer 108 and the bottom pole 107, which are located in a peripheral region around the pole chip portion 112b, are selectively etched and removed by about 0.5 $\mu$m by means of ion milling using the pole chip portion 112b of the top pole 112 as a mask (see FIG. 33). Then, an overcoat layer 113 made of, for example, alumina is formed so as to coat the top pole 112. Finally, a track surface of the recording head and the reproducing head, i.e., an air bearing surface 120 is formed through the steps of machining and polishing, and thus a thin film magnetic head is completed.

FIGS. 32 to 34 show a structure of the completed thin film magnetic head. FIG. 32 shows a cross section of the thin film magnetic head in a direction perpendicular to the air bearing surface 120. FIG. 33 shows an enlarged view of a cross section of a pole portion 500 in a direction parallel to the air bearing surface 120. FIG. 34 shows a planar structure of the thin film magnetic head. FIG. 31 corresponds to a cross section viewed in the direction of the arrows along the line XXXI—XXXI of FIG. 34. FIGS. 32 to 34 do not show the overcoat layer 113 and so forth. FIG. 34 shows the thin film coil 110 and the photoresist film 111 whose outermost ends alone are shown.

In FIGS. 32 and 34, "TH" indicates a throat height, and "MRH" indicates an MR height. The "throat height (TH)" refers to one of factors that determine the performance of the recording head, and refers to a length between the position of an edge of an insulating layer (the photoresist film 111) for electrically isolating the thin film coil 110 from the other conductive portions, which is closest to the air bearing surface 120, i.e., a throat height zero position (a TH0 position), and the position of the air bearing surface 120. An optimization of the throat height (TH) is desired for an improvement in the performance of the recording head. The throat height (TH) is controlled by the amount of polishing of the air bearing surface 120. The "MR height (MRH)" refers to a length between the position of a farthest edge of the MR film 105 from the air bearing surface 120, i.e., an MR height zero position (an MRH0 position), and the position of the air bearing surface 120. The MR height (MRH) is also controlled by the amount of polishing of the air bearing surface 120.

Factors that determine the performance of the thin film magnetic head include an apex angle ($\theta$) shown in FIG. 32, as well as the throat height (TH), the MR height (MRH) and so on. The apex angle θ refers to an average degree of inclination of an inclined surface of the photoresist film 111 close to the air bearing surface 120.

As shown in FIG. 33, a structure in which the respective parts of the write gap layer 108 and the bottom pole 107 are etched in self-alignment with the pole chip portion 112b of the top pole 112 is called a trim structure. The trim structure allows preventing an increase in an effective track width resulting from a spread of a magnetic flux generated during the writing of data on a narrow track. "P2W" indicates a width of a portion (hereinafter referred to as "a pole portion 500") having the trim structure, namely, a pole width (or "a track width"). "P2L" indicates a thickness of the pole chip portion 112b constituting a part of the pole portion 500, namely, a pole length. Lead layers 121 for functioning as lead electrode layers to be electrically connected to the MR film 105 are provided on both sides of the MR film 105. The lead layers 121 are not shown in FIGS. 29 to 32.

As shown in FIG. 34, the top pole 112 has the yoke portion 112a occupying most of the top pole 112, and the pole chip portion 112b having a substantially uniform width as the pole width P2W. An outer edge of the yoke portion 112a forms an angle α with a surface parallel to the air bearing surface 120 in a coupling portion between the yoke portion 112a and the pole chip portion 112b. An outer edge of the pole chip portion 112b forms an angle β with the surface parallel to the air bearing surface 120 in the above-mentioned coupling portion. FIG. 34 shows the case where α and β are, for example, about 45 degrees and about 90 degrees, respectively. As described above, the pole chip portion 112b is a portion for functioning as a mask for forming the pole portion 500 having the trim structure. As can be seen from FIGS. 32 and 34, the pole chip portion 112b lies on the flat write gap layer 108, and the yoke portion 112a lies on a coil portion (hereinafter referred to as "an apex portion"), which is coated with the photoresist film 111 and rises like a hill.

Detailed structural features of the top pole are described in Unexamined Japanese Patent Application Publication No. Hei 8-249614, for example. The publication gives the description with regard to the top pole having a structure in which a width of a portion located rearward with respect to the TH0 position (that is, located away from the air bearing surface 120) becomes gradually greater.

In the thin film magnetic head shown in FIGS. 31 and 34, when a current passes through the thin film coil 110 at the time of the recording operation of information, a magnetic flux is generated in response to the current. The generated magnetic flux propagates through the top pole 112 from the yoke portion 112a to the pole chip portion 112b, and further propagates and reaches to a tip portion of the pole chip portion 112b close to the air bearing surface 120. After reaching to the tip portion of the pole chip portion 112b, the magnetic flux generates a signal magnetic field for recording to the outside near the write gap layer 108. The signal magnetic field partly magnetizes a magnetic recording medium, thereby enabling information to be recorded on the magnetic recording medium.

The pole width P2W of the pole portion 500 determines a write track width on the magnetic recording medium. To increase the recording density, it is necessary that the pole portion 500 be formed with high accuracy so as to make the pole width P2W extremely small. Too great a pole width P2W causes a phenomenon in which data is written on adjacent regions as well as a predetermined write track region on the magnetic recording medium, namely, a side erase phenomenon, which therefore makes it impossible to increase the recording density. In recent years in particular, it has been required that the pole width P2W be locally minimized to about 0.3 μm or less in order to enable recording at a high surface recording density, that is, in order to form a recording head having a narrow track structure, and therefore an urgent necessity is to establish manufacturing technology for locally minimizing the pole width P2W.

Frame plating is used as a method of forming the top pole, as described in Unexamined Japanese Patent Publication No. Hei 7-262519, for example. The top pole 112 is formed by use of frame plating in the following manner. First, a thin electrode film made of, for example, Permalloy is formed over an underlayer including the apex portion by means of sputtering, for instance. Then, the electrode film is coated with a photoresist so as to form a photoresist film, thereafter the photoresist film is patterned by means of photolithography, and thus a frame pattern (an outer frame) for plating is formed. The frame pattern has an opening pattern corresponding to the planar shape of the top pole 112. Then, the top pole 112 made of, for example, Permalloy is formed in the opening pattern of the frame pattern by means of electroplating using the frame pattern as a mask and using as a seed layer the electrode film formed in the preceding step.

The apex portion is located higher than the other portions by 7 to 10 μm or more, for example. The apex portion is coated with a photoresist of 3 mm to 4 μm in thickness. When a film thickness of the photoresist on the apex portion must be at least 3 μm or more, a photoresist film having a thickness of, for example, 8 to 10 μm or more is formed under the apex portion because the fluidic photoresist flows intensively to a lower place.

To realize the locally minimum pole width P2W, it is necessary to form the frame pattern having the opening pattern having a locally minimum width (e.g., 1.0 μm or less) corresponding to the pole width P2W. That is, the opening pattern having a locally minimum width of 1.0 μm or less must be formed by the photoresist film having a thickness of 8 to 10 μm or more. However, it is very difficult in manufacturing process to form the frame pattern having the opening pattern having the locally minimum width by using the above-mentioned photoresist film having a great film thickness.

In the case where the top pole 112 is formed on a region having an uneven structure comprising the apex portion and so on, there is, moreover, a problem that the accuracy in forming the top pole 112 deteriorates greatly for the following reason. That is, when the photoresist film formed on the region having the uneven structure is subjected to exposure in the step of forming the frame pattern for forming the top pole 112, light is reflected obliquely or transversely from an inclined surface portion or the like of the underlayer (the electrode film). The reflected light causes an increase or a reduction in an exposed region in the photoresist film. Consequently, in the photoresist film, the width of the opening pattern having the locally minimum width corresponding to the pole chip portion 112b of the top pole 112 increases in a width direction.

Besides the above-mentioned problem about the accuracy in forming the top pole 112, a problem exists: that is, overwrite characteristics of the thin film magnetic head deteriorate for the following reason. That is, when the pole width P2W is locally minimized, a magnetic volume of the pole chip portion 112b constituting the pole portion 500 generally becomes lower. The "magnetic volume" refers to the capacity of magnetic flux that can be contained in a magnetic layer portion. When the pole width P2W becomes smaller and thus the "magnetic volume" of the pole chip portion 112b is not properly ensured, "saturation of magnetic flux" occurs in the pole chip portion 112b, so that the magnetic flux cannot sufficiently reach to the tip portion of the pole chip portion 112b. In particular, when a magnetic material such as Permalloy having a magnetic flux density of about 1.2 tesla is used as a material of the top pole 112, processing characteristics for forming a desired magnetic layer pattern become facilitated, but, when the pole width P2W is locally minimized (to about 0.3 $\mu\square$m or less), the magnetic flux is saturated in the pole chip portion 112b, so that the magnetic flux is insufficiently supplied to the tip portion of the pole chip portion 112b.

SUMMARY OF THE INVENTION

The invention is designed to overcome the foregoing problems. It is an object of the invention to provide a thin film magnetic head having superior overwrite characteristics as well as having a locally minimized pole width, and a method of manufacturing a thin film magnetic head.

In a thin film magnetic head of the invention including: a first magnetic layer and a second magnetic layer which are magnetically coupled to each other and have two magnetic poles facing each other with a gap layer in between near and in a recording-medium-facing surface to be faced with a recording medium; and a thin film coil provided between the first and second magnetic layers with an insulating layer in between, the first magnetic layer having a predetermined magnetic layer portion including a uniform width portion which extends away from the recording-medium-facing surface and determines a write track width on the recording medium, the predetermined magnetic layer portion includes a first magnetic film and a second magnetic film which are located apart from and close to the gap layer, respectively, and both the first and second magnetic films are made of a magnetic material having a magnetic flux density of 1.5 tesla or more.

In the thin film magnetic head of the invention, the first magnetic film and the second magnetic film are located apart from and close to the gap layer, respectively, and the predetermined magnetic layer portion includes the first magnetic film and the second magnetic film. Preferably, both the first and second magnetic films are made of a magnetic material having a magnetic flux density of 1.5 tesla or more.

In the thin film magnetic head of the invention, at least one of the first and second magnetic films may be made of either an alloy containing at least nickel and iron or iron nitride, or at least one of the first and second magnetic films may be made of an amorphous alloy such as an alloy made of cobalt and iron, an oxide of an alloy made of zirconium, cobalt and iron, or a nitride of an alloy made of zirconium and iron. The alloy containing nickel and iron may further contain at least cobalt. Preferably, the first magnetic film is made of an alloy containing at least nickel, iron and cobalt, and the second magnetic film is made of either an alloy containing at least nickel and iron or an alloy made of cobalt and iron.

In the thin film magnetic head of the invention, an interface between the first and second magnetic films may be flat.

In the thin film magnetic head of the invention, a first nonmagnetic layer pattern, which extends in such a manner that the rearward portion thereof is coupled to the insulating layer and the front edge thereof terminates at a predetermined position at the front of the recording-medium-facing surface, may be provided between the second magnetic layer and the second magnetic film. In this case, it is preferable that the first nonmagnetic layer pattern be made of a nonmagnetic metal.

In the thin film magnetic head of the invention, a second nonmagnetic layer pattern, which extends in such a manner that the rearward portion thereof is coupled to the insulating layer and the front edge thereof terminates rearward with respect to the front edge of the first nonmagnetic layer pattern, may be further provided between the first nonmagnetic layer pattern and the second magnetic film.

In the thin film magnetic head of the invention, the second magnetic layer may have a flat surface, and the first and second nonmagnetic layer patterns may be inclined to the flat surface of the second magnetic layer at and near the respective front edges of the first and second nonmagnetic layer patterns.

In the thin film magnetic head of the invention, the front edge of the first nonmagnetic layer pattern may be located in a region in which the uniform width portion of the predetermined magnetic layer portion lies.

In a method of manufacturing a thin film magnetic head of a first aspect of the invention including: a first magnetic layer and a second magnetic layer which are magnetically coupled to each other and have two magnetic poles facing each other with a gap layer in between near and in a recording-medium-facing surface to be faced with a recording medium; and a thin film coil provided between the first and second magnetic layers with an insulating layer in between, the first magnetic layer having a predetermined magnetic layer portion including a uniform width portion which extends away from the recording-medium-facing surface and determines a write track width on the recording medium, the step of forming the predetermined magnetic layer portion includes the steps of: forming a magnetic material layer; selectively forming a first magnetic film for constituting one part of the predetermined magnetic layer portion, on the magnetic material layer; and selectively etching the magnetic material layer by using the first magnetic film as a mask, thereby selectively forming a second magnetic film for constituting the other part of the predetermined magnetic layer portion.

In the method of manufacturing a thin film magnetic head of the first aspect of the invention, firstly, the magnetic material layer is formed, and thereafter the first magnetic film for constituting one part of the predetermined magnetic layer portion is selectively formed on the magnetic material layer. Then, the magnetic material layer is selectively etched by using the first magnetic film as the mask, whereby the second magnetic film for constituting the other part of the predetermined magnetic layer portion is selectively formed.

In the method of manufacturing a thin film magnetic head of the first aspect of the invention, either an alloy containing at least nickel and iron or iron nitride may be used as a material of at least one of the first and second magnetic films, or an amorphous alloy such as an alloy made of cobalt and iron, an oxide of an alloy made of zirconium, cobalt and iron, or a nitride of an alloy made of zirconium and iron may be used as a material of at least one of the first and second magnetic films. Preferably, an alloy further containing at least cobalt is used as the alloy containing nickel and iron. Preferably, an alloy containing at least iron, nickel and cobalt is used as a material of the first magnetic film, and either an alloy containing at least nickel and iron or an alloy made of cobalt and iron is used as a material of the second magnetic film.

In the method of manufacturing a thin film magnetic head of the first aspect of the invention, the magnetic material layer may be formed by means of sputtering, and the first magnetic film may be formed through the growth of a plated film.

In the method of manufacturing a thin film magnetic head of the first aspect of the invention, the step of etching may involve reactive ion etching. In this case, it is preferable that the step of etching take place in a gaseous atmosphere containing a halogen element, or it is more preferable that the step of etching take place in a gaseous atmosphere containing at least one of chlorine and boron trichloride. Preferably, the step of etching takes place at a temperature of 50 degrees or higher, or, more preferably, the step of etching takes place at a temperature of 90 degrees or higher or at a temperature between 50 and 300 degrees inclusive.

In the method of manufacturing a thin film magnetic head of the first aspect of the invention, the step of etching may further include selectively removing the gap layer and the second magnetic layer, except for a region where the uniform width portion of the predetermined magnetic layer portion is formed.

In a method of manufacturing a thin film magnetic head of a second aspect of the invention including: a first magnetic layer and a second magnetic layer which are magnetically coupled to each other and have two magnetic poles facing each other with a gap layer in between near and in a recording-medium-facing surface to be faced with a recording medium; and a thin film coil provided between the first and second magnetic layers with an insulating layer in between, the first magnetic layer having a predetermined magnetic layer portion including a uniform width portion which extends away from the recording-medium-facing surface and determines a write track width on the recording medium, the step of forming the predetermined magnetic layer portion includes the steps of: forming the second magnetic layer; selectively forming a first nonmagnetic layer pattern on the second magnetic layer; forming the gap layer so as to coat the first nonmagnetic layer pattern and the second magnetic layer around the first nonmagnetic layer pattern; forming a magnetic material layer on the gap layer; polishing and flattening a surface of the magnetic material layer; selectively forming a first magnetic film for constituting one part of the predetermined magnetic layer portion, on the flattened magnetic material layer; and selectively etching the magnetic material layer by using the first magnetic film as a mask, thereby selectively forming a second magnetic film for constituting the other part of the predetermined magnetic layer portion.

In the method of manufacturing a thin film magnetic head of the second aspect of the invention, first, the second magnetic layer is formed, and thereafter the first nonmagnetic layer pattern is selectively formed on the second magnetic layer. Then, the gap layer is formed so as to coat the first nonmagnetic layer pattern and the second magnetic layer around the first nonmagnetic layer pattern, and thereafter the magnetic material layer is formed on the gap layer. Then, the surface of the magnetic material layer is polished and flattened, and thereafter the first magnetic film for constituting one part of the predetermined magnetic layer portion is selectively formed on the flattened magnetic material layer. Then, the magnetic material layer is selectively etched by using the first magnetic film as the mask, whereby the second magnetic film for constituting the other part of the predetermined magnetic layer portion is selectively formed.

In a method of manufacturing a thin film magnetic head of a third aspect of the invention including: a first magnetic layer and a second magnetic layer which are magnetically coupled to each other and have two magnetic poles facing each other with a gap layer in between near and in a recording-medium-facing surface to be faced with a recording medium; and a thin film coil provided between the first and second magnetic layers with an insulating layer in between, the first magnetic layer having a predetermined magnetic layer portion including a uniform width portion which extends away from the recording-medium-facing surface and determines a write track width on the recording medium, the step of forming the predetermined magnetic layer portion includes the steps of: forming the second magnetic layer; forming the gap layer on the second magnetic layer; selectively forming a first nonmagnetic layer pattern on the gap layer; selectively forming a magnetic material layer so as to coat the first nonmagnetic layer pattern and the gap layer around the first nonmagnetic layer pattern; polishing and flattening a surface of the magnetic material layer; forming a first magnetic film for constituting one part of the predetermined magnetic layer portion, on the flattened magnetic material layer; and selectively etching the magnetic material layer by using the first magnetic film as a mask, thereby selectively forming a second magnetic film for constituting the other part of the predetermined magnetic layer portion.

In the method of manufacturing a thin film magnetic head of the third aspect of the invention, first, the second magnetic layer is formed, and thereafter the gap layer is formed on the second magnetic layer. Then, the first nonmagnetic layer pattern is selectively formed on the gap layer, and thereafter the magnetic material layer is selectively formed so as to coat the first nonmagnetic layer pattern and the gap layer around the first nonmagnetic layer pattern. Then, the surface of the magnetic material layer is polished and flattened, and thereafter the first magnetic film for constituting one part of the predetermined magnetic layer portion is selectively formed on the flattened magnetic material layer. Then, the magnetic material layer is selectively etched by using the first magnetic film as the mask, whereby the second magnetic film for constituting the other part of the predetermined magnetic layer portion is selectively formed.

In a method of manufacturing a thin film magnetic head of a fourth aspect of the invention including: a first magnetic layer and a second magnetic layer which are magnetically coupled to each other and have two magnetic poles facing each other with a gap layer in between near and in a recording-medium-facing surface to be faced with a recording medium; and a thin film coil provided between the first and second magnetic layers with an insulating layer in between, the first magnetic layer having a predetermined magnetic layer portion including a uniform width portion which extends away from the recording-medium-facing surface and determines a write track width on the recording medium, the step of forming the predetermined magnetic layer portion includes the steps of: forming the second magnetic layer; selectively forming a first nonmagnetic layer pattern on the second magnetic layer; forming the gap layer so as to coat the first nonmagnetic layer pattern and the second magnetic layer around the first nonmagnetic layer pattern; selectively forming a second nonmagnetic layer pattern on a region of the gap layer corresponding to a region where the first nonmagnetic layer pattern is located; forming a magnetic material layer so as to coat the second nonmagnetic layer pattern and the gap layer around the second nonmagnetic layer pattern; polishing and flattening a surface of the magnetic material layer; selectively forming a first magnetic film for constituting one part of the predetermined magnetic layer portion, on the flattened magnetic material layer; and selectively etching the magnetic material layer by using the first magnetic film as a mask, thereby selectively forming a second magnetic film for constituting the other part of the predetermined magnetic layer portion.

In the method of manufacturing a thin film magnetic head of the fourth aspect of the invention, firstly, the second magnetic layer is formed, and thereafter the first nonmagnetic layer pattern is selectively formed on the second magnetic layer. Then, the gap layer is formed so as to coat the first nonmagnetic layer pattern and the second magnetic layer around the first nonmagnetic layer pattern, and thereafter the second nonmagnetic layer pattern is selectively formed on the region of the gap layer corresponding to the region where the first nonmagnetic layer pattern is located. Then, the magnetic material layer is formed so as to coat the second nonmagnetic layer pattern and the gap layer around the second nonmagnetic layer pattern, and thereafter the surface of the magnetic material layer is polished and flattened. Then, the first magnetic film for constituting one part of the predetermined magnetic layer portion is selectively formed on the flattened magnetic material layer, and thereafter the magnetic material layer is selectively etched by using the first magnetic film as the mask, whereby the second magnetic film for constituting the other part of the predetermined magnetic layer portion is selectively formed.

Other and further objects, features and advantages of the invention will appear more fully from the following description.

BRIEF DESCRIPTION OF THE DRAWINGS

FIGS. 1A and 1B are cross sectional views for describing a step of a method of manufacturing a thin film magnetic head according to a first embodiment of the invention;

FIGS. 3A and 3B are cross sectional views for describing a step following the step of FIGS. 2A and 2B;

FIGS. 4A and 4B are cross sectional views for describing a step following the step of FIGS. 3A and 3B;

FIGS. 5A and 5B are cross sectional views for describing a step following the step of FIGS. 4A and 4B;

FIGS. 7A and 7B are cross sectional views for describing a step following the step of FIGS. 6A and 6B;

FIGS. 17A and 17B are cross sectional views of another modification of the structure of the thin film magnetic head according to the first embodiment of the invention;

FIGS. 19A and 19B are cross sectional views for describing a step of a method of manufacturing a thin film magnetic head according to a second embodiment of the invention;

FIGS. 20A and 20B are cross sectional views for describing a step following the step of FIGS. 19A and 19B;

FIGS. 21A and 21B are cross sectional views for describing a step following the step of FIGS. 20A and 20B;

DETAILED DESCRIPTION OF PREFERRED EMBODIMENTS

Embodiments of the invention will be described in detail below with reference to the drawings.

First Embodiment

Firstly, the description is given with reference to FIGS. 1A to 12 with regard to an example of a method of manufacturing a composite thin film magnetic head as a method of manufacturing a thin film magnetic head according to a first embodiment of the invention.

FIGS. 1A, 2A, 3A, 4A, 5A, 6A, 7A and 8A show a cross section perpendicular to an air bearing surface, and FIGS.

Figure 9:
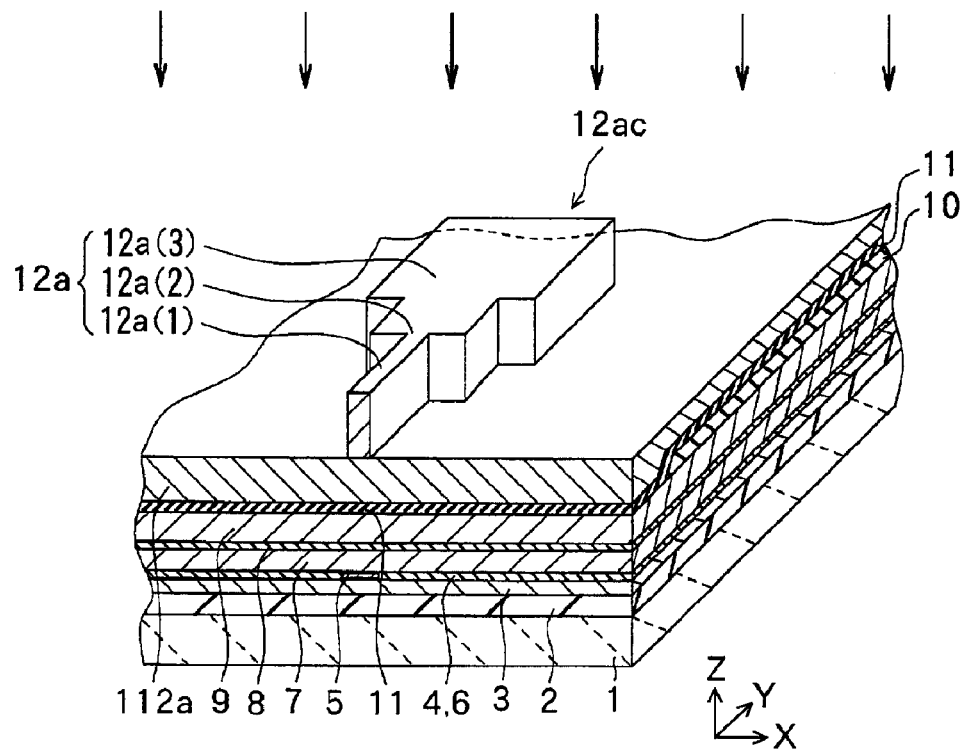
FIG. 9 is a perspective view corresponding to FIGS. 3A and 3B.
Figure 10:
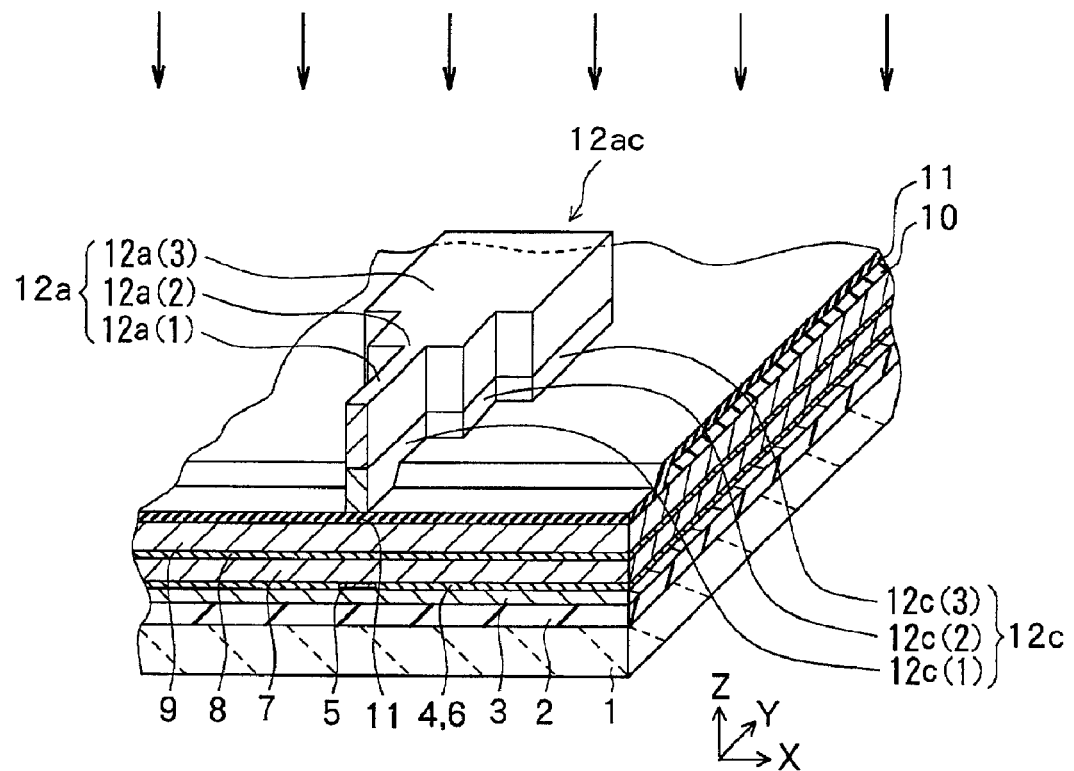
FIG. 10 is a perspective view corresponding to FIGS. 4A and 4B.
Figure 11:
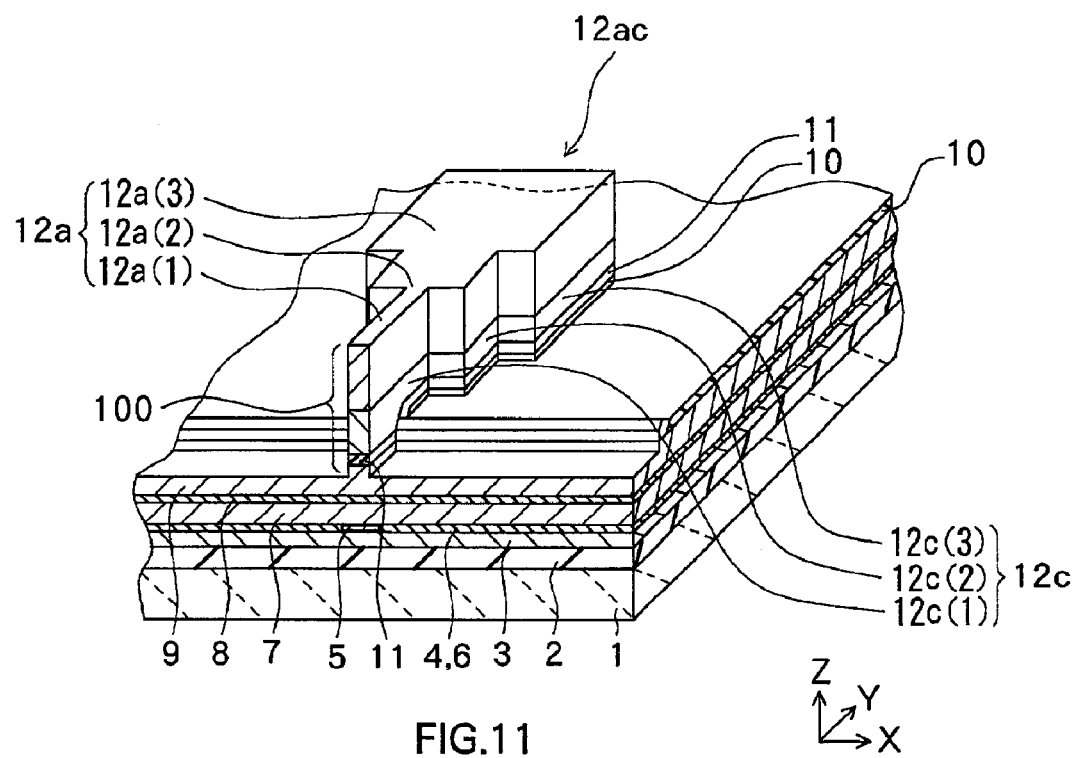
FIG. 11 is a perspective view corresponding to FIGS. 5A and 5B.

1B, 2B, 3B, 4B, 5B, 6B, 7B and 8B show a cross section of a pole portion parallel to the air bearing surface. FIGS. 9 to 12 are perspective views corresponding to main manufacturing steps. FIG. 9 corresponds to a state shown in FIGS. 3A and 3B, FIG. 10 corresponds to a state shown in FIGS. 4A and 4B, FIG. 11 corresponds to a state shown in FIGS. 5A and 5B, and FIG. 12 corresponds to a state shown in FIGS. 8A and 8B. FIG. 11 does not show an insulating film 13 and the like shown in FIGS. 5A and 5B, and FIG. 12 does not show insulating films 13, 15 and 16, a thin film coil 14, an overcoat layer 17 and the like shown in FIGS. 8A and 8B.

In the following description, an X-axis direction, a Y-axis direction and a Z-axis direction in FIGS. 1A to 12 are expressed as "a width direction", "a length direction" and "a thickness direction or a height direction", respectively. The side close to an air bearing surface 80 in the Y-axis direction (or the side to form the air bearing surface 80 in the following step) is expressed as "a front side (or a frontward side)", and the opposite side is expressed as "a rear side (or a rearward side)".

Method of Manufacturing Thin Film Magnetic Head

In the manufacturing method according to the embodiment, first of all, as shown in FIGS. 1A and 1B, an insulating layer 2 made of, for example, alumina is deposited with a thickness of about 3.0 μm to 5.0 μm on a substrate 1 made of, for example, attic (Al$_2$O$_3$—TiC). Then, Permalloy (Ni: 80 wt %, Fe: 20 wt %), for example, is selectively formed with a thickness of about 2.0 μm to 3.0 μm on the insulating layer 2 by use of, for example, frame plating, and thus a bottom shield layer 3 for a reproducing head is formed. The description is given later with regard to details about a forming procedure and the like for frame plating. The bottom shield layer 3 has a planar shape shown in FIG. 13 to be described later, for example. Permalloy having the composition of, for instance, 45 wt % Ni and 55 wt % Fe, as well as Permalloy having the above-mentioned composition of 80 wt % Ni and 20 wt % Fe, may be used as Permalloy for forming the bottom shield layer 3. Then, an alumina layer, for example, is formed with a thickness of about 4.0 μm to 5.0 μm so as to coat the overall surface, and thereafter a surface of the alumina layer is polished by means of, for example, CMP (chemical mechanical polishing) until the bottom shield layer 3 is exposed. Thus, the overall surface becomes flattened through the above-mentioned polishing.

Next, as shown in FIGS. 1A and 1B, a shield gap film 4 made of, for example, alumina is formed with a thickness of about 100 nm to 200 nm on the bottom shield layer 3 by means of sputtering, for example. Then, an MR film 5 for constituting an MR element that is a principal part of the reproducing head is formed into a desired shape on the shield gap film 4 by use of high-accuracy photolithography. Then, lead layers (not shown) for functioning as lead electrode layers to be electrically connected to the MR film 5 are formed on both sides of the MR film 5. Then, a shield gap film 6 is formed on the lead layers, the shield gap film 4 and the MR film 5, and thus the MR film 5 is sandwiched in between the shield gap films 4 and 6. A material of the shield gap film 6, a method of forming the shield gap film 6 and the like are substantially the same as those of the shield gap film 4.

Next, as shown in FIGS. 1A and 1B, a top shield layer 7 is selectively formed with a thickness of about 1.0 μm to 1.5 μm on the shield gap film 6. The top shield layer 7 has a planar shape shown in FIG. 13 to be described later, for example. A material of the top shield layer 7, a method of forming the top shield layer 7 and the like are substantially the same as those of the bottom shield layer 3. Then, an insulating film 8 made of, for example, alumina is formed with a thickness of about 0.15 μm to 0.2 μm on the top shield layer 7 by means of sputtering, for example.

Next, as shown in FIGS. 1A and 1B, a bottom pole 9 made of a magnetic material having a high magnetic flux density of, for example, 1.5 tesla or more, e.g., iron nitride (FeN), is selectively formed on the insulating film 8. The bottom pole 9 has a planar shape shown in FIG. 13 to be described later, for example. The bottom pole 9 is formed through the following procedure. That is, first, an iron nitride layer, for example, is formed with a thickness of about 2.0 μm to 2.5 μm on the insulating film 8 by means of sputtering, for example. Then, the iron nitride layer is etched and patterned by means of, for example, reactive ion etching (hereinafter referred to as "RIE") using a mask having a predetermined shape and material, and thus the bottom pole 9 is selectively formed. The bottom pole 9 becomes substantially flat over the overall surface thereof. In general, the rate of etching using RIE is higher than the rate of etching using ion milling. Therefore, the use of RIE as an etching method allows forming the bottom pole 9 in a shorter time, as compared to the use of ion milling. To form the bottom pole 9 by use of an etching process using RIE, etching conditions such as the type of etching gas to be used for etching and a processing temperature for etching, in particular, are optimized, and thus the time required to form the bottom pole 9 can be further reduced. The description is given later with regard to details about an optimization of the etching conditions. Besides iron nitride, a magnetic material having a high magnetic flux density of 1.5 tesla or more similarly to iron nitride, e.g., an amorphous alloy such as a cobalt-iron alloy (FeCo), a zirconium-cobalt-iron alloy oxide (FeCoZrO) or a zirconium-iron alloy nitride (FeZrN), may be used as a material of the bottom pole 9. A metallic material such as chromium or a nonmetallic material such as a photoresist film can be used as a material of a mask to be used for forming the bottom pole 9. The bottom pole 9 corresponds to a specific example of "a second magnetic layer" of the invention.

Figure 2B:
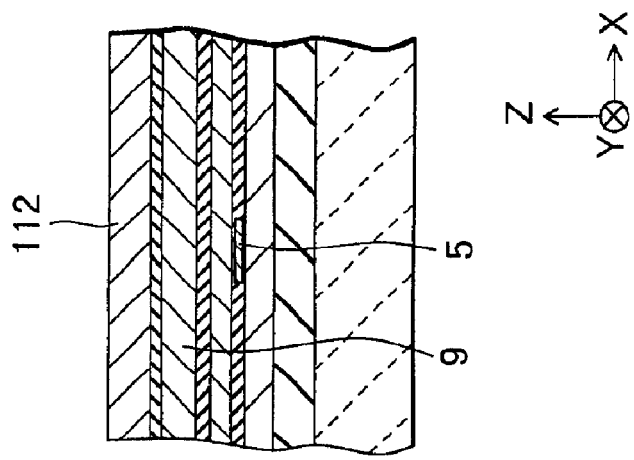
FIGS. 2A and 2B are cross sectional views for describing a step following the step of FIGS. 1A and 1B.
Figure 2A:
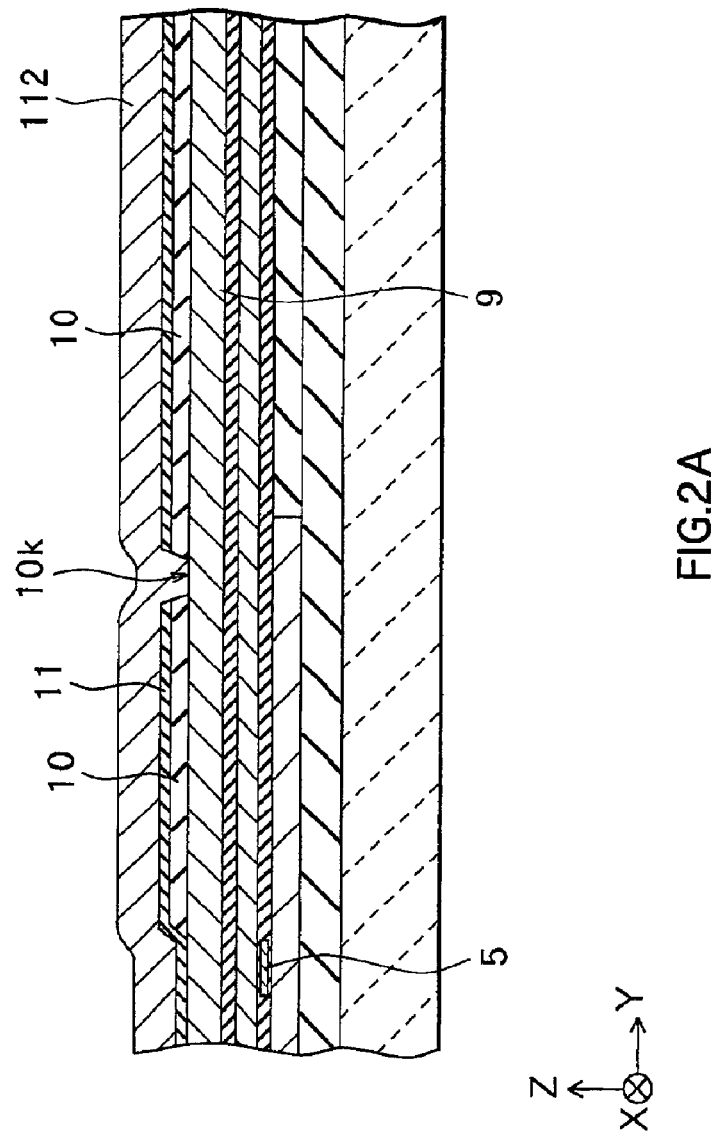

Next, a layer made of a nonmagnetic material, e.g., an alumina layer, is formed with a thickness of about 0.3 μm to 0.8 μm on the bottom pole 9 by means of, for example, sputtering, and thereafter the alumina layer is etched and patterned by means of, for example, RIE using a mask having a predetermined shape and material. By this etching process, a nonmagnetic layer pattern 10 is selectively formed adjacent to the flat surface of the bottom pole 9 as shown in FIGS. 2A and 2B. Besides the above-mentioned alumina, a nonmagnetic metallic material, e.g., a nickel-copper alloy (NiCu) or the like, may be used as a material of the nonmagnetic layer pattern 10. The etching process for forming the nonmagnetic layer pattern 10 selectively removes a part of a front region of the alumina layer and a part of a rear region of the alumina layer in which a magnetic path connecting portion 12d is to be formed in the following step. An opening 10k for connecting the bottom pole 9 to a top pole 12 to be formed in the following step is formed in the "rear region" of the above-mentioned removed regions.

The nonmagnetic layer pattern 10 serves to determine a throat height zero position (a TH0 position) for serving as a reference position for determining a throat height (TH). For example, the nonmagnetic layer pattern 10 is formed in such a manner that the position of a most front edge of the nonmagnetic layer pattern 10 is substantially matched to the position of a most rear edge of the MR film 5. For instance, it is preferable that the nonmagnetic layer pattern 10 have a surface inclined to the flat surface of the bottom pole 9 at and near at least a front edge of the nonmagnetic layer pattern 10, because a magnetic flux can smoothly flow through a part of a top pole chip portion 12*ac* (see FIGS. 4A and 4B) to be formed in the following step, more specifically a part to be formed over the above-mentioned inclined surface. A nonmagnetic metallic material such as nickel copper (NiCu) or the like, as well as an inorganic insulating material such as the above-mentioned alumina, may be used as a material of the nonmagnetic layer pattern 10. A material of a mask to be used for forming the nonmagnetic layer pattern 10 is the same as the material of the mask used for forming the bottom pole 9.

Next, as shown in FIGS. 2A and 2B, a write gap layer 11 made of, for example, alumina is formed with a thickness of about 0.1 μm to 0.15 μm by means of, for example, sputtering so as to coat about the overall surface. The write gap layer 11 is formed in such a manner that the opening 10*k* formed in the preceding step is not coated with alumina. As shown in FIGS. 2A and 2B, the write gap layer 11 includes a stepped region corresponding to a stepped portion formed between the flat surface of the bottom pole 9 and the surface of the nonmagnetic layer pattern 10 and extends from the flat surface of the bottom pole 9 onto the nonmagnetic layer pattern 10. Hereinafter, a portion of the write gap layer 11, which is formed on the bottom pole 9, is called "a bottom step region", and a portion of the write gap layer 11, which is formed on the nonmagnetic layer pattern 10, is called "a top step region". The write gap layer 11 corresponds to a specific example of "a gap layer" of the invention, and the nonmagnetic layer pattern 10 corresponds to a specific example of "a first nonmagnetic layer pattern" of the invention.

Next, as shown in FIGS. 2A and 2B, a pole chip precursory layer 112 (hereinafter sometimes referred to as "an iron nitride layer") made of a magnetic material having a high magnetic flux density of 1.5 tesla or more, e.g., iron nitride, is formed with a thickness of about 0.8 μm to 2.0 μm by means of, for example, sputtering so as to coat the overall surface. The pole chip precursory layer 112 is a preparatory layer that is to be patterned into a pole chip portion 12*c* by an etching process in the following step. In the following description, the preparatory layer, which is to be patterned so as to have a predetermined shape in the following step, is called "a precursory layer", which is expressed in the same manner as the preparatory layer. As shown in FIGS. 2A and 2B, a surface portion of the pole chip precursory layer 112 has an uneven structure corresponding to an uneven structure of an underlayer comprising the nonmagnetic layer pattern 10 and so forth. Besides iron nitride, a magnetic material having a high magnetic flux density of 1.5 tesla or more similarly to iron nitride, e.g., Permalloy or an amorphous alloy such as a cobalt-iron alloy (FeCo), a zirconium-cobalt-iron alloy oxide (FeCoZrO) or a zirconium-iron alloy nitride (FeZrN), may be used as a material of the pole chip precursory layer 112. The pole chip precursory layer 112 corresponds to a specific example of "a magnetic material layer" of the invention.

Next, as shown in FIGS. 3A and 3B, the surface of the pole chip precursory layer 112 is polished and flattened by means of CMP, for example. For instance, this polishing takes place until a film thickness of the pole chip precursory layer 112 reaches to about 0.5 μm to 1.5 μm in a region located frontward with respect to a region where the nonmagnetic layer pattern 10 is located.

Next, as shown in FIGS. 3A, 3B and 9, a pole chip portion 12*a* made of a magnetic material containing iron (Fe), nickel (Ni) and cobalt (Co) and having a high magnetic flux density of 1.5 tesla or more, e.g., an iron-nickel-cobalt alloy (CoNiFe, Co: 45 wt %, Ni: 30 wt %, Fe: 25 wt %), is selectively formed with a thickness of about 1.5 μm to 2.5 μm at a predetermined position on the pole chip precursory layer 112 by means of frame plating, for example. At the same time when the pole chip portion 12*a* is formed, a magnetic path connecting portion 12*b* is selectively formed on the pole chip precursory layer 112 over the opening 10*k*. Both the pole chip portion 12*a* and the magnetic path connecting portion 12*b* constitute a part of the top pole 12. A material containing at least one of chromium (Cr), boron (B), gold (Au) and copper (Cu), as well as three metallic elements mentioned above, may be used as a material of the pole chip portion 12*a*.

The pole chip portion 12*a* has a planar shape shown in FIG. 13 to be described later, for example, and includes a front end portion 12*a*(1), a middle portion 12*a*(2) and a rear end portion 12*a*(3), which are located in this order when viewed at the side to form the air bearing surface 80 in the following step (the left side in FIG. 3). The front end portion 12*a*(1) is a portion having a uniform width that determines a write track width on a recording medium. Structural features of the pole chip portion 12*a* will be described later. The above-mentioned "predetermined position" at which the pole chip portion 12*a* is formed is, for example, such a position that the pole chip portion 12*a* extends from the bottom step region of the write gap layer 11 to the top step region thereof and that, more particularly, the most front edge of the nonmagnetic layer pattern 10 is located in a region in which the front end portion 12*a*(1) lies. The pole chip portion 12*a* corresponds to a specific example of "a first magnetic film" of the invention.

The pole chip portion 12*a* is formed by means of frame plating in the following manner. First, an electrode film (not shown) for functioning as a seed layer for electroplating is formed with a thickness of about 70 μm by means of sputtering, for example. For instance, an iron-nickel-cobalt alloy (Co: 45 wt %, Ni: 30 wt %, Fe: 25 wt %) having a high magnetic flux density of 1.5 tesla or more, or the like is used as a material of the electrode film. Then, the electrode film is coated with, for example, a positive photoresist (hereinafter referred to as "a photoresist"), and thus a photoresist film (not shown) is formed. Then, a predetermined region of the photoresist film is selectively exposed to light by use of a mask (not shown) having a predetermined shape pattern. A material of the mask used for this exposure is the same as the material of the mask used for forming the bottom pole 9. Then, the exposed region of the photoresist film is developed, and thus a frame pattern (an outer frame) (not shown) for use in plating of frame plating is formed. The frame pattern has an opening corresponding to the above-mentioned exposed region. Then, the pole chip portion 12*a* made of an iron-nickel-cobalt alloy (Co: 45 wt %, Ni: 30 wt %, Fe: 25 wt %) is formed by means of electroplating using the frame pattern as a mask and using as the seed layer the electrode film formed in the preceding step. Finally, the frame pattern is removed. The magnetic path connecting portion 12*b* is formed by using the same material and method as the above-described material and method for forming the pole chip portion 12*a*.

Then, the pole chip precursory layer 112 is etched and patterned by means of, for example, RIE using both the pole chip portion 12*a* and the magnetic path connecting portion 12*b* as masks. This etching process selectively removes the pole chip precursory layer 112 excluding regions where the pole chip portion 12*a* and the magnetic path connecting portion 12b are located, and thus the pole chip portion 12c and the magnetic path connecting portion 12d for constituting a part of the top pole 12 are formed as shown in FIGS. 4A, 4B and 10. RIE is used as an etching method for patterning the pole chip precursory layer 112, and thus the pole chip portion 12c and the magnetic path connecting portion 12d can be formed with higher accuracy in a shorter time. The masks in themselves, i.e., the pole chip portion 12a and the magnetic path connecting portion 12b in themselves, are also etched by the etching process for forming the pole chip portion 12c and so on, so that the film thicknesses of the portions 12a and 12b decrease.

For the etching process using RIE for forming the pole chip portion 12c and so on, it is particularly preferable that an etching gas containing a halogen element, e.g., an etching gas containing at least one of chlorine ($Cl_2$), boron trichloride ($BCl_2$), hydrogen chloride (HCl), carbon tetrafluoride ($CF_4$), sulfur hexafluoride (S $F_6$) and boron tribromide ($BBr_3$) and an additive such as hydrogen ($H_2$), oxygen ($O_2$), nitrogen $N_2$) or argon (Ar), be used and that a processing temperature be equal to or higher than 50 degrees. The etching process using RIE is performed at the above-mentioned temperature in the above-mentioned gaseous atmosphere, and thus a chemical reaction of the etching process for the pole chip precursory layer 112 made of iron nitride, in particular, is accelerated, so that the time required to form the pole chip portion 12c and the magnetic path connecting portion 12d can be further reduced. To perform the etching process in a much shorter time, for example, it is more preferable that the processing temperature be equal to or higher than 90 degrees or lie between 50 and 300 degrees.

The pole chip portion 12c and the magnetic path connecting portion 12d have substantially the same structural features as the pole chip portion 12a and the magnetic path connecting portion 12b have. The pole chip portion 12c has a front end portion 12c(1), a middle portion 12c(2) and a rear end portion 12c(3), which correspond to the front end portion 12a(1), the middle portion 12a(2) and the rear end portion 12a(3) of the pole chip portion 12a, respectively. The front end portion 12c(1) is a portion having a uniform width that determines the write track width on the recording medium, similarly to the front end portion 12a(1). The pole chip portion 12c and the magnetic path connecting portion 12d are made of a magnetic material (iron nitride) having a high magnetic flux density of 1.5 tesla or more, similarly to the pole chip portion 12a and the magnetic path connecting portion 12b. Hereinafter, the pole chip portion 12a and the pole chip portion 12c are sometimes generically called "a top pole chip 12ac".

As described above, the top pole chip 12ac is formed as a combination of the pole chip portion 12a and the pole chip portion 12c. That is, the top pole chip 12ac is not constructed at once through a single step of forming but is constructed through, for example, the steps of forming the pole chip portion 12a (a top layer portion) and the pole chip portion 12c (a bottom layer portion), which are two parts, i.e., top and bottom parts, into which the top pole chip 12ac is divided. The pole chip portion 12c corresponds to a specific example of "a second magnetic film" of the invention. The front end portion 12a(1) of the pole chip portion 12a and the front end portion 12c(1) of the pole chip portion 12c correspond to a specific example of "a uniform width portion" of the invention, and the top pole chip 12ac corresponds to a specific example of "a predetermined magnetic layer portion" of the invention.

Next, the overall surface (excluding a region where the magnetic path connecting portions 12b and 12d are located) is etched by about 0.3 µm to 0.4 µm by means of, for example, RIE using the top pole chip 12ac as a mask. This etching process selectively removes and trenches the write gap layer 11 and the bottom pole 9 except for a region where the top pole chip 12ac is located. The above-mentioned etching process is performed in such a manner that an upper part of the nonmagnetic layer pattern 10 is also selectively removed. The selective removal of the nonmagnetic layer pattern 10 is made possible by adjusting the etching conditions so that the etching rate for alumina (the nonmagnetic layer pattern 10) may be lower than the etching rate for iron nitride (the bottom pole 9). By the etching process, a pole portion 100 having a trim structure is formed as shown in FIGS. 5A, 5B and 11. The pole portion 100 comprises the front end portion 12a(1) of the pole chip portion 12a, the front end portion 12c(1) of the pole chip portion 12c, a portion of the bottom pole 9 corresponding to the front end portion 12a(1) and so on, and a portion of the write gap layer 11 sandwiched between the portion of the bottom pole 9 and the front end portion 12a(1) and so on. The above-mentioned portions constituting the pole portion 100 have substantially the same width. The use of RIE allows performing the etching process for the write gap layer 11 and the bottom pole 9 in a shorter time.

To etch the write gap layer 11 and the bottom pole 9 by means of RIE, for example, it is preferable that a mixed gas of chlorine and boron trichloride be used as an etching gas and the processing temperature lie between 100 and 200 degrees. The etching process using RIE is performed at the above-mentioned temperature in the above-mentioned gaseous atmosphere, whereby the etching process can be carried out under control of high precision, and the time required for the etching process can be further reduced. By the etching process, the pole chip portion 12a and the magnetic path connecting portion 12b in themselves are also etched, so that the film thicknesses of the portions 12a and 12b further decrease.

Next, as shown in FIGS. 5A and 5B, an insulating film 13 made of, for example, alumina is formed with a thickness of about 0.3 µm to 0.5 µm so as to coat the overall surface.

Figure 6B:
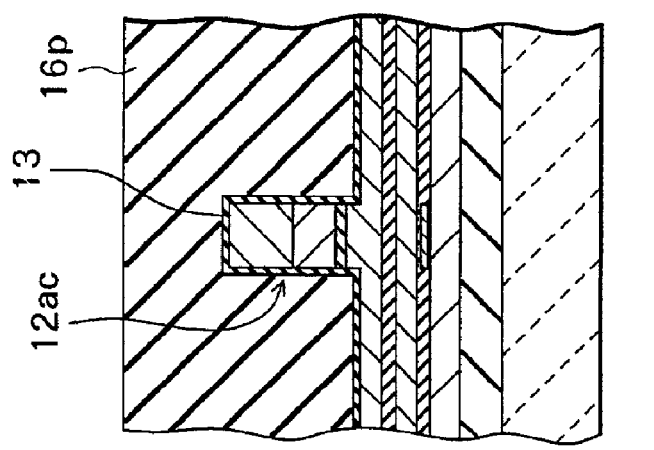
FIGS. 6A and 6B are cross sectional views for describing a step following the step of FIGS. 5A and 5B.
Figure 6A:
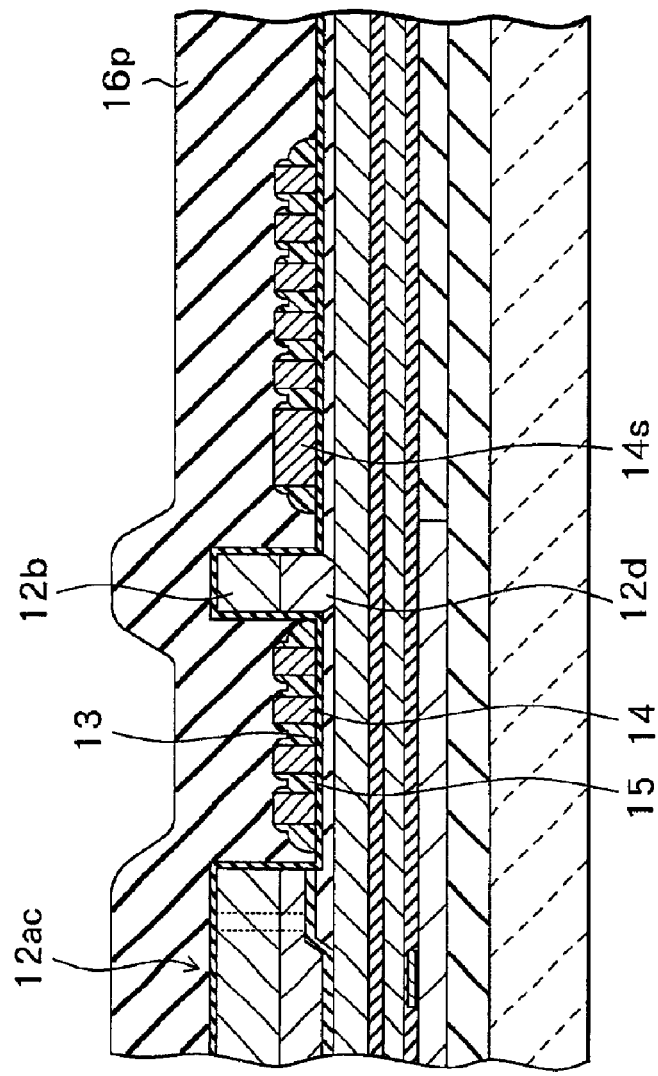

Next, as shown in FIGS. 6A and 6B, a thin film coil 14 made of, for example, copper (Cu) for an inductive recording head is selectively formed with a thickness of about 1.0 µm to 1.5 µm on the flat insulating film 13 in a region located rearward with respect to the region where the top pole chip 12ac is located (excluding the region where the magnetic path connecting portions 12b and 12d are located), by means of electroplating, for example. The thin film coil 14 has a spiral planar structure shown in FIG. 13 to be described later, for example. The thin film coil 14 is, in part alone, shown in FIGS. 6A and 6B. At the same time when the thin film coil 14 is formed, for example, a coil connecting portion 14s is integrally formed with the thin film coil 14 on the insulating film 13 at an inner terminal end of the thin film coil 14. The coil connecting portion 14s serves to electrically connect the thin film coil 14 to a coil connecting wiring 12eh (see FIGS. 7A and 7B) to be formed in the following step.

Next, a material exhibiting fluidity during heating, e.g., an organic insulating material such as a photoresist, is formed into a predetermined pattern between and around windings of the thin film coil 14 (including the coil connecting portion 14s) by means of high-accuracy photolithography. Then, this photoresist film is subjected to heat treatment at a temperature between 200 and 250 degrees, for example. This heat treatment allows the photoresist to flow and fill up a gap between the windings of the thin film coil 14 and the like, thereby forming an insulating film 15 for providing insulation between the windings of the thin film coil 14 and the like, as shown in FIGS. 6A and 6B. The insulating film 15 can be formed in such a manner that the insulating film 15 does not coat the top surfaces of both the thin film coil 14 and the coil connecting portion 14s (see FIGS. 6A and 6B) or the insulating film 15 coats the top surfaces thereof.

Next, as shown in FIGS. 6A and 6B, an alumina layer 16p, for example, is formed with a thickness of about 3.0 μm to 4.0 μm by means of, for instance, sputtering so as to coat the overall surface, and thus the alumina layer 16p coats a region having an uneven structure comprising the top pole chip 12ac, the magnetic path connecting portions 12b and 12d, the thin film coil 14, the coil connecting portion 14s and so forth.

Next, the overall surface of the alumina layer 16p is polished and flattened by means of CMP, for example. By this polishing, an insulating film 16 for coating the thin film coil 14 and so on is formed as shown in FIGS. 7A and 7B. The polishing takes place until at least the pole chip portion 12a and the magnetic path connecting portion 12b are exposed. When an inorganic insulating material such as alumina is used as a material of the insulating film 16, the inorganic insulating material permits preventing the occurrence of clogging of a polishing surface of a CMP polishing disc and also permits forming a smoother polished surface, as distinct from a soft insulating material such as a photoresist.

Next, as shown in FIGS. 7A and 7B, the insulating film 16 coating the top surface of the coil connecting portion 14s is partly etched by means of, for example, RIE or ion milling, and thus an opening 16k for connecting the coil connecting portion 14s to the coil connecting wiring 12eh to be formed in the following step is formed.

Next, as shown in FIGS. 7A and 7B, a top yoke 12e for constituting a part of the top pole 12 is selectively formed with a thickness of about 2.0 μm to 3.0 μm on the flattened region, more specifically a region extending from the magnetic path connecting portion 12b to the rear end portion 12a(3) of the pole chip portion 12a. The top yoke 12e has a planar shape shown in FIG. 13 to be described later, for example, and includes a yoke portion 12e(1) lying on a region over the thin film coil 14, and a connecting portion 12e(2) located at the front of the yoke portion 12e(1) and extending so as to overlap a part of the rear end portion 12a(3) of the pole chip portion 12a. Structural features of the top yoke 12e will be described later. A rearward portion of the top yoke 12e is magnetically coupled to the bottom pole 9 with the magnetic path connecting portions 12b and 12d in between via the opening 10k, and a frontward portion of the top yoke 12e is magnetically coupled to the pole chip portion 12c with the pole chip portion 12a in between.

At the same time when the top yoke 12e is formed, the coil connecting wiring 12eh is formed in a region extending from the coil connecting portion 14s to an external circuit (not shown). The coil connecting wiring 12eh serves to electrically connect the coil connecting portion 14s to the external circuit (not shown). A material of the top yoke 12e and the coil connecting wiring 12eh and a method of forming them are the same as those of the bottom pole 9 or the like, for example. That is, a layer made of iron nitride that is a magnetic material having a high magnetic flux density of 1.5 tesla or more, for instance, is formed by means of, for example, sputtering, thereafter the iron nitride layer is etched and patterned by means of RIE, and thus the top yoke 12e and so on are formed. The top yoke 12e is formed as in the case of the bottom pole 9 or the like: that is, the etching conditions for the etching process using RIE (e.g., the type of etching gas, the processing temperature and so on) are optimized, and thus the top yoke 12e can be formed with higher accuracy in a shorter time.

For example, the top yoke 12e is formed in such a manner that the most front edge thereof is located rearward with respect to a coupling position between the middle portion 12a(2) and the rear end portion 12a(3) of the pole chip portion 12a. More specifically, it is preferable that the most front edge of the top yoke 12e be located at a distance of about 0.5 μm or more far from the position of the air bearing surface 80 (see FIGS. 8A and 8B) to be formed in the following step, because the top yoke 12e is located sufficiently apart from the air bearing surface 80 and thus the occurrence of a side erase phenomenon resulting from a direct exit of magnetic flux from the top yoke 12e to the air bearing surface 80 can be avoided. Moreover, for example, the top yoke 12e is formed in such a manner that the position of the most rear edge of the top yoke 12e substantially matches the position of the most rear edge of the magnetic path connecting portions 12b and 12d. The top pole 12 comprising the pole chip portions 12a and 12c (the top pole chip 12ac), the magnetic path connecting portions 12b and 12d and the top yoke 12e corresponds to a specific example of "a first magnetic layer" of the invention.

Next, as shown in FIGS. 7A and 7B, an overcoat layer 17 made of an insulating material, e.g., an inorganic insulating material such as alumina, is formed with a thickness of about 20 μm to 40 μm so as to coat the overall surface.

Figures 8A, 8B:
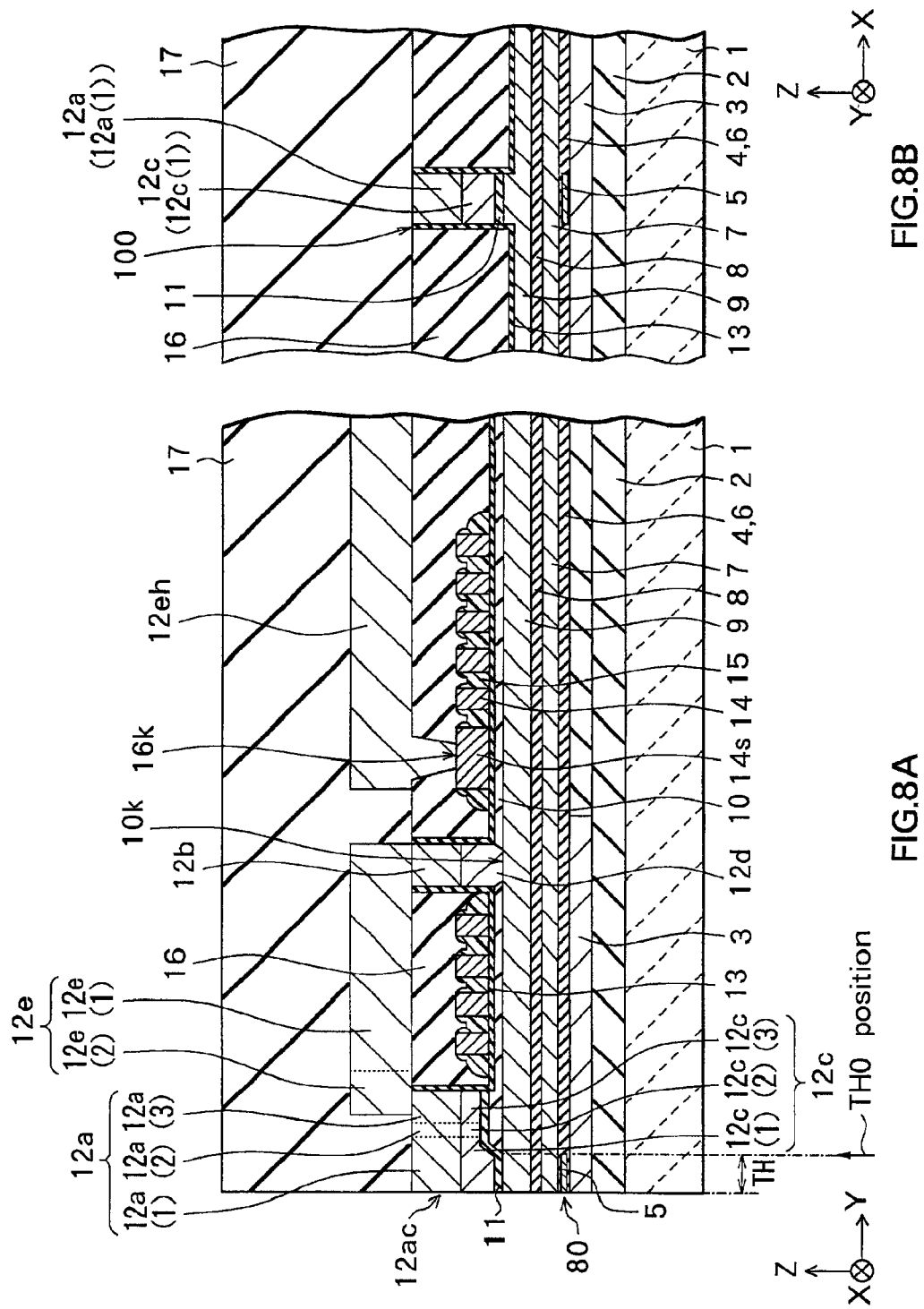
FIGS. 8A and 8B are cross sectional views for describing a step following the step of FIGS. 7A and 7B.
Figure 12:
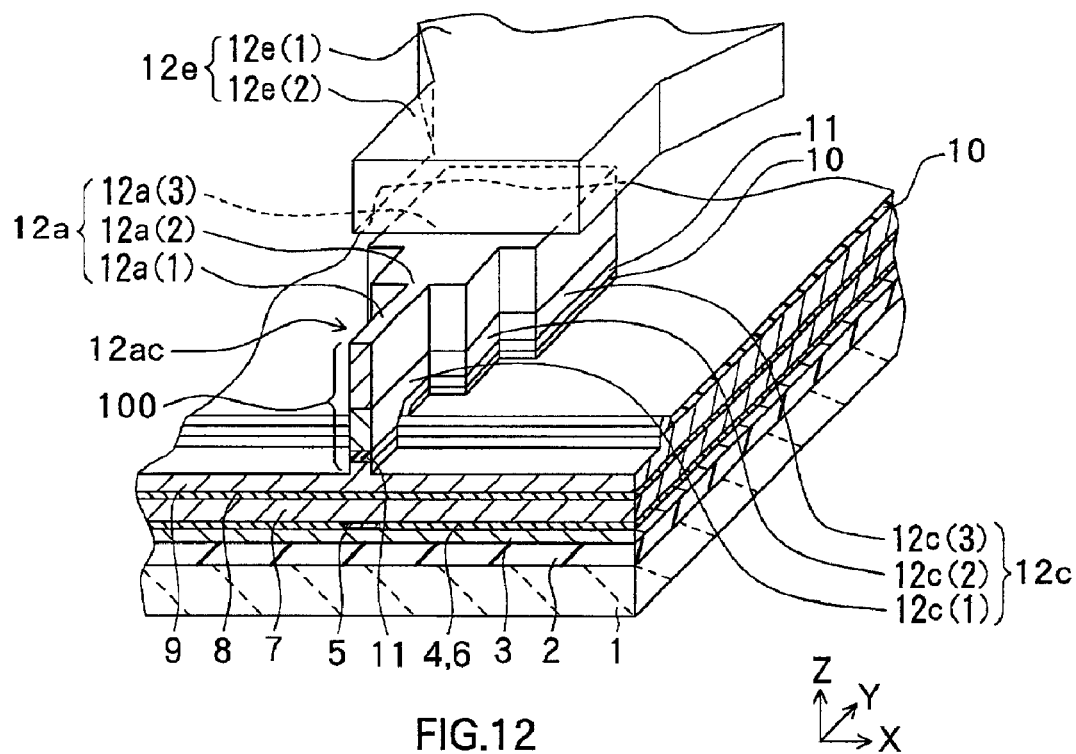
FIG. 12 is a perspective view corresponding to the cross sectional views shown in FIGS. 8A and 8B.

Finally, as shown in FIGS. 8A and 8B, the air bearing surface 80 of the recording head and the reproducing head is formed through the steps of machining and polishing, and thus a thin film magnetic head is completed. A three-dimensional structure around the top yoke 12e is as shown in FIG. 12.

Functions and Advantages of Method of Manufacturing Thin Film Magnetic Head

Next, the description is given with regard to functions and advantages of the method of manufacturing a thin film magnetic head according to the embodiment.

In the embodiment, after forming the pole chip precursory layer 112, the pole chip portion 12a is formed on the pole chip precursory layer 112 and is then used as a mask to pattern the pole chip precursory layer 112 into the pole chip portion 12c. In this case, the number of manufacturing steps for forming the pole chip portion 12c can be reduced for the following reason. That is, for example, after forming the pole chip precursory layer 112, an additional step of forming a mask for patterning the pole chip precursory layer 112 is required in order to form the pole chip portion 12c without forming the pole chip portion 12a. On the other hand, the embodiment does not require the additional step of forming the mask for patterning, because the pole chip portion 12a is used as the mask for patterning the pole chip precursory layer 112. Moreover, there is no need for the step of removing the mask after patterning the pole chip precursory layer 112, because the pole chip portion 12a used as the mask constitutes a part of the top pole chip 12ac.

In the embodiment, the pole chip precursory layer 112 is formed on the underlayer including an uneven region comprising the nonmagnetic layer pattern 10 and so on, and thereafter the surface of the pole chip precursory layer 112 is polished and flattened by means of CMP or the like, so that the pole chip portion 12a can be formed with higher accuracy for the following reason. That is, when the pole chip precursory layer 112 is not flattened, the surface portion of the pole chip precursory layer 112 has an uneven structure corresponding to the uneven region of the underlayer (the nonmagnetic layer pattern 10 and so on). In this case, a problem with the related art arises: in the step of exposing a photoresist film to light, an influence of light reflected from an inclined surface portion of the underlayer causes an increase in an exposed region (more particularly, a portion having a locally minimum width) in the photoresist film and thus results in great deterioration in the accuracy in forming a frame pattern. On the other hand, the embodiment involves performing exposure on the underlayer (the pole chip precursory layer 112) flattened through the step of polishing, so that the embodiment prevents the reflection of light in the step of exposure and thus prevents the increase in the exposed region, as distinct from the related art. Therefore, the frame pattern for forming the pole chip portion 12a can be formed with higher accuracy. More specifically, an improvement in the accuracy in forming the frame pattern allows local minimization of the width of the front end portion 12a(1) of the pole chip portion 12a to about 0.1 to 0.3 $\mu$m, for example.

Separately forming the pole chip portion 12a and 12c constituting the top pole chip 12ac contributes to the improved accuracy of the top pole chip 12ac from the following viewpoint. That is, in the case where the pole chip portion 12a and 12c constituting the top pole chip 12ac is not separately formed but is formed at a time by means of frame plating, a problem with the related art arises: there is too great a difference between the thickness of the photoresist film required for forming the top pole chip 12ac and the width of the photoresist film to be processed (more particularly, the portion having the locally minimum width), so that the accuracy in forming the frame pattern deteriorates greatly. On the other hand, the embodiment involves separately forming the pole chip portion 12a and 12c constituting the top pole chip 12ac, so that the thickness of the photoresist film for forming the pole chip portion 12a constituting a part of the top pole chip 12ac becomes less than the thickness of the photoresist film required for forming the top pole chip 12ac at a time. A decrease in the thickness of the photoresist film allows an improvement in the accuracy in forming the pole chip portion 12a.

In the embodiment, a magnetic material containing iron, nickel and cobalt, e.g., an iron-nickel-cobalt alloy (CoNiFe), is used as a material of the pole chip portion 12a. In general, the iron-nickel-cobalt alloy is a magnetic material that is harder than a magnetic material such as Permalloy or iron nitride, so that the etching rate for the iron-nickel-cobalt alloy becomes lower than the etching rate for Permalloy, iron nitride or the like. Thus, in the etching process for patterning the pole chip precursory layer 112, the amount of etching of the pole chip portion 12a can be smaller than the amount of etching of the pole chip precursory layer 112, and therefore a film decrease of the pole chip portion 12a can be prevented. Therefore, the pole chip portion 12a made of the iron-nickel-cobalt alloy can be used as a mask in order to pattern the pole chip precursory layer 112. To form the pole chip portion 12a, it is, however, necessary to ensure a necessary and sufficient thickness of the pole chip portion 12a after allowing for "a film decrease" in the etching process. The amount of etching of the pole chip portion 12a (the amount of film decrease of the pole chip portion 12a) can be adjusted by varying the etching conditions such as the type of etching gas and the processing temperature.

Preferably, the iron-nickel-cobalt alloy is used as the material of the pole chip portion 12a only when a film thickness of the pole chip portion 12a to be formed is appropriately thin. The reason is as follows: for example, when the iron-nickel-cobalt alloy is used as the material to form the top pole chip 12ac at a time, the iron-nickel-cobalt alloy partly cracks or delaminates due to storage of internal stress, so that the top pole chip 12ac cannot be normally formed. More specifically, the iron-nickel-cobalt alloy can be used as a material of a magnetic layer portion to form the magnetic layer portion having a film thickness of about 2.5 $\mu$m or less. The top pole chip portion 12a and 12c constituting parts of the top pole chip 12ac is separately formed and thus the film thickness of the pole chip portion 12a is appropriately reduced, whereby, even when a hard magnetic material such as the iron-nickel-cobalt alloy is used, the above-mentioned "cracking" or "delamination" or the like can be avoided, and therefore the pole chip portion 12a can be formed with stability.

The embodiment involves using RIE as the etching method for patterning the pole chip precursory layer 112, and therefore the embodiment can form the pole chip portion 12c with higher accuracy in a shorter time as compared to a method using ion milling. More particularly, the etching process using RIE is performed under the appropriate etching conditions, and therefore the time required to form the pole chip portion 12c can be further reduced.

The advantages on an improvement in the forming accuracy and a reduction in the forming time, which are obtained by using RIE as the etching method, are obtained in the same manner in the case where the bottom pole 9 or the top yoke 12e is formed.

The embodiment involves using RIE as a method for selectively etching the write gap layer 11 and the bottom pole 9 by using the top pole chip 12ac as a mask, and therefore the process of etching the write gap layer 11 and the bottom pole 9 can be performed with higher accuracy in a shorter time by the same function as the function of the above-mentioned formation of the pole chip portion 12c. Also in this case, the time required for the etching process can be further reduced through the optimization of the etching conditions.

The embodiment involves etching and removing a part of the nonmagnetic layer pattern 10 in a peripheral region around the top pole chip 12ac when forming the pole portion 100 by means of the etching process, as shown in FIGS. 5A, 5B and 11, and therefore the position of the surface of the underlayer on which the thin film coil 14 is to be formed becomes lower than the position of the surface of the underlayer which is obtained when the part of the nonmagnetic layer pattern 10 is not etched. Therefore, the insulating film 16 having a sufficient thickness is formed over the thin film coil 14 in the following step, so that the thin film coil 14 can be surely insulated from the top yoke 12e to be formed in the following step.

Lowering the position of the surface of the underlayer on which the thin film coil 14 is to be formed can contribute to the stabilized formation of the pole chip portion 12a for the following reason. That is, for example, when the position of the surface of the underlayer is fixed, the thickness of the insulating film 16 to be formed over the thin film coil 14 depends on the film thickness of the pole chip portion 12a. In this case, the film thickness of the pole chip portion 12a must be increased in order to increase the thickness of the insulating film 16 to be formed over the thin film coil 14. However, as described above, an increase in the film thickness of the pole chip portion 12a made of the iron-nickel-cobalt alloy causes the instability of formation of the pole chip portion 12a. On the other hand, the embodiment involves lowering the position of the surface of the underlayer, thereby allowing reducing the film thickness of the pole chip portion 12a while ensuring a sufficient thickness of the insulating film 16 over the thin film coil 14. Accordingly, the embodiment can avoid disadvantages of the increased film thickness of the above-mentioned pole chip portion 12a.

In the embodiment, an organic insulating material such as a photoresist exhibiting fluidity during heating is used as a material of the insulating film 15 for filling up the gap between the windings of the thin film coil 14 (including the coil connecting portion 14s), and therefore the embodiment permits filling up the gap between the windings of the thin film coil 14 and the like and thus ensuring insulation between the windings, as distinct from a method using an inorganic insulating material such as alumina exhibiting no fluidity during heating.

Structure of Thin Film Magnetic Head

Next, the structure of the thin film magnetic head according to the embodiment will be described with reference to FIGS. 8A, 8B, 12 and 13.

Figure 13:
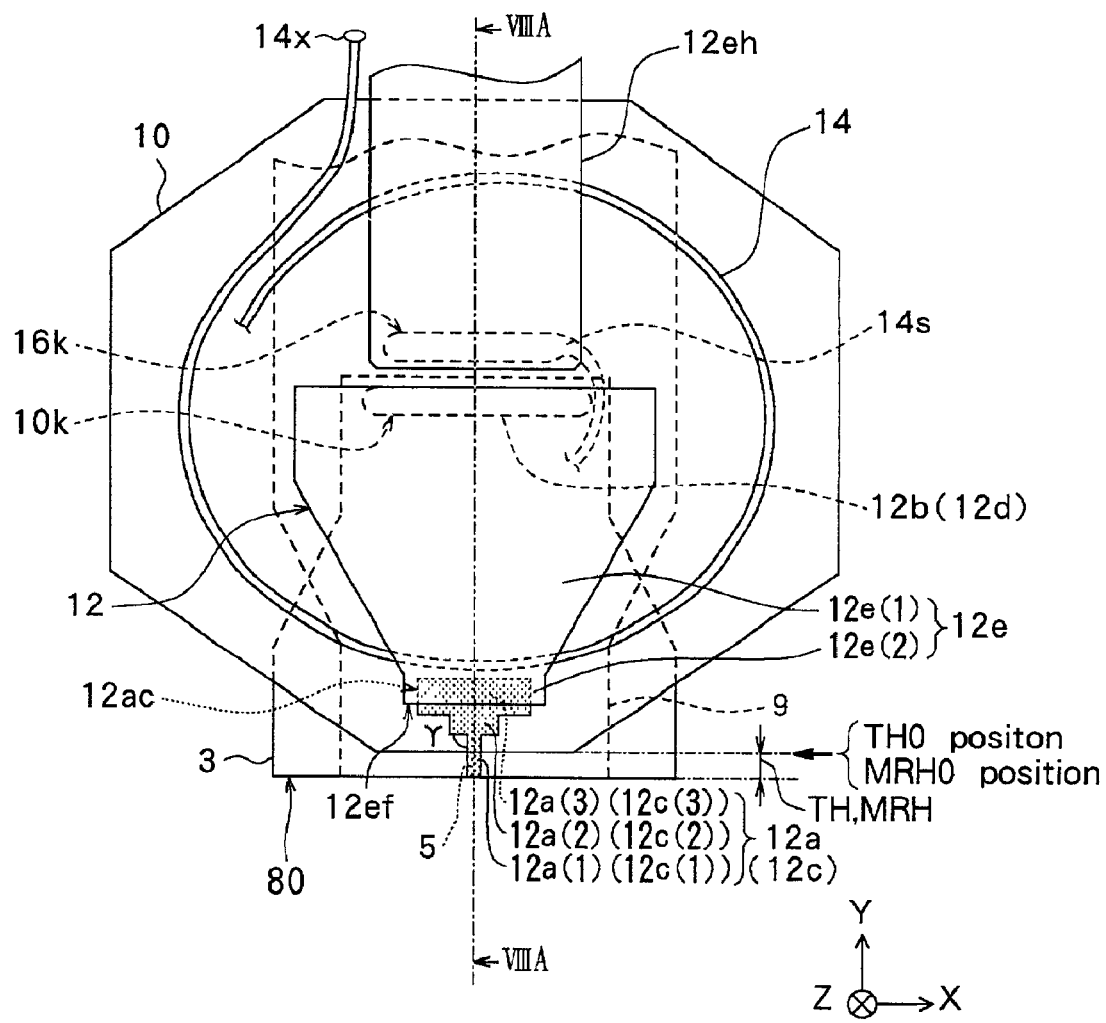
FIG. 13 is a plan view of a planar structure of a thin film magnetic head according to the first embodiment of the invention.

FIG. 13 shows a schematic representation of a planar structure of the thin film magnetic head manufactured by the method of manufacturing a thin film magnetic head according to the embodiment. FIG. 13 does not show the insulating films 15 and 16, the overcoat layer 17 and so on. In FIG. 13, the thin film coil 14, its outermost periphery portion alone, is shown, and the nonmagnetic layer pattern 10, its outermost end alone, is shown. FIG. 8A corresponds to a cross section viewed in the direction of the arrows along the line VIIIA—VIIIA of FIG. 13. The expressions about the X-axis, Y-axis and Z-axis directions in FIG. 13 are the same as the expressions in FIGS. 1A to 12.

As shown in FIG. 13, the position of the most front edge of the nonmagnetic layer pattern 10 is the reference position for determining the throat height (TH), i.e., the throat height zero position (the TH0 position). The throat height (TH) is defined as a length between the position (the TH0 position) of the most front edge of the nonmagnetic layer pattern 10 and the air bearing surface 80. "An MRH0 position" in FIG. 13 represents the position of the most rear edge of the MR film 5, i.e., an MR height zero position. An MR height (MRH) corresponds to a length between the MR height zero position and the air bearing surface 80. For example, the throat height zero position (the TH0 position) substantially matches the MR height zero position (the MRH0 position).

For example, the top pole 12 comprises the top pole chip 12ac, the magnetic path connecting portions 12b and 12d and the top yoke 12e, which are separately formed. In other words, the top pole 12 comprises an assembly of these portions.

The top yoke 12e includes the yoke portion 12e(1) having a large area for containing a magnetic flux generated by the thin film coil 14, and the connecting portion 12e(2) having a uniform width smaller than the width of the yoke portion 12e(1). For example, the yoke portion 12e(1) has a substantially uniform width in the rearward portion thereof and has a gradually narrower width in the frontward portion thereof at a position closer to the air bearing surface 80. For example, the width of the connecting portion 12e(2) is greater than the width of the rear end portion 12a(3) of the pole chip portion 12a. However, the width of the connecting portion 12e(2) is not necessarily limited to this case, and, for example, the width of the connecting portion 12e(2) may be smaller than the width of the rear end portion 12a(3).

For example, the top pole chip 12ac has a two-layer structure and comprises the pole chip portion 12a for serving as the top layer portion and the pole chip portion 12c for serving as the bottom layer portion.

The pole chip portion 12a includes the front end portion 12a(1), the middle portion 12a(2) and the rear end portion 12a(3), which are located in this order when viewed at the side of the air bearing surface 80. Each of these portions has a rectangular planar shape, for example. The front end portion 12a(1) has a substantially uniform width throughout the portion 12a(1), and the width of the front end portion 12a(1) determines the write track width during recording. The width of the middle portion 12a(2) is greater than the width of the front end portion 12a(1), and the width of the rear end portion 12a(3) is greater than the width of the middle portion 12a(2). That is, a coupling portion between the front end portion 12a(1) and the middle portion 12a(2) (hereinafter sometimes referred to as "a first coupling portion") and a coupling portion between the middle portion 12a(2) and the rear end portion 12a(3) (hereinafter sometimes referred to as "a second coupling portion") are formed into steps in the width direction. The centers of the portions constituting the pole chip portion 12a are coaxial in the width direction.

For example, the position of the first coupling portion of the pole chip portion 12a is located rearward with respect to the TH0 position (or the MRH0 position). For example, the position of a front edge surface 12ef of the top yoke 12e is located rearward with respect to the position of the second coupling portion of the pole chip portion 12a. That is, the top yoke 12e is located apart from the air bearing surface 80. The position of the top yoke 12e is not necessarily limited to the above-mentioned case, and, for example, the position of the edge surface 12ef may substantially match the position of the second coupling portion. The centers of the top yoke 12e and the pole chip portion 12a are coaxial in the width direction.

In the first coupling portion of the pole chip portion 12a, an angle γ of a corner portion at which a side edge surface of the front end portion 12a(1) crosses a front edge surface of the middle portion 12a(2) is equal to 90 degrees, for example. The angle γ of the corner portion is not necessarily limited to 90 degrees. Preferably, the angle γ lies between, for example, 90 and 120 degrees, because the angle γ within the above-mentioned range allows smoothing the flow of a magnetic flux flowing from the rear end portion 12a(3) and the middle portion 12a(2) into the front end portion 12a(1).

The pole chip portion 12c has substantially the same structure as the pole chip portion 12a has. The pole chip portion 12c includes the front end portion 12c(1), the middle portion 12c(2) and the rear end portion 12c(3), which correspond to the front end portion 12a(1), the middle portion 12a(2) and the rear end portion 12a(3) of the pole chip portion 12a, respectively.

As shown in FIGS. 8A, 12 and 13, the top pole chip 12ac extends from the bottom step region of the write gap layer 11 to the top step region thereof. A front part of the top yoke 12e overlaps and is magnetically coupled to a part of the rear end portion 12a(3) of the pole chip portion 12a, and the front part of the top yoke 12e is also magnetically coupled to the pole chip portion 12c with the pole chip portion 12a in between. On the other hand, as shown in FIGS. 5A and 13, a rearward part of the top yoke 12e is magnetically coupled to the bottom pole 9 with the magnetic path connecting portions 12b and 12d in between in the opening 10k. That is, the top pole 12 (the top pole chip 12ac, the magnetic path connecting portions 12b and 12d and the top yoke 12e) is connected to the bottom pole 9, and thus a propagation path of a magnetic flux, namely, a magnetic path, is formed.

As shown in FIG. 13, the thin film coil 14 comprises the winding having a spiral planar shape. For example, the coil connecting portion 14s and a terminal 14x are formed at the inner and outer terminal ends of the thin film coil 14, respectively. Both the coil connecting portion 14s and the terminal 14x are integral with the thin film coil 14. The coil connecting wiring 12eh is formed on the coil connecting portion 14s, and the thin film coil 14 is electrically connected to the coil connecting wiring 12eh through the coil connecting portion 14s. Both the terminal 14x and a rear end portion (not shown) of the coil connecting wiring 12eh are connected to an external circuit (not shown) so that the external circuit can feed a current through the thin film coil 14.

As shown in FIGS. 8A, 12 and 13, for example, the nonmagnetic layer pattern 10 is located in such a manner that the most front edge thereof is located in a region in which the front end portion 12c(1) of the pole chip portion 12c lies. As shown in FIGS. 8A and 13, for example, the nonmagnetic layer pattern 10 is located in such a wide-ranging region as may substantially include a region where the top pole 12 and the thin film coil 14 are located.

Functions and Advantages of Structure of Thin Film Magnetic Head

Next, functions and advantages of the structure of the thin film magnetic head according to the embodiment will be described with reference to FIGS. 8A, 12 and 13.

Firstly, the brief description is now given with regard to a basic operation of the thin film magnetic head, i.e., an operation of recording data on the recording medium and an operation of reproducing data from the recording medium.

In the thin film magnetic head according to the embodiment, when an external circuit (not shown) feeds a current through the thin film coil 14 at the time of the recording operation of information, a magnetic flux is generated in response to the current. The generated magnetic flux propagates through the top yoke 12e from the yoke portion 12e(1) to the connecting portion 12e(2), and then flows into the rear end portion 12a(3) of the pole chip portion 12a magnetically coupled to the top yoke 12e. After flowing into the rear end portion 12a(3), the magnetic flux propagates to the front end portion 12a(1) via the middle portion 12a(2). After propagating to the front end portion 12a(1), the magnetic flux further propagates and reaches to a tip portion of the front end portion 12a(1) close to the air bearing surface 80. After flowing into the rear end portion 12a(3) of the pole chip portion 12a, a part of the magnetic flux also propagates to the rear end portion 12c(3) of the pole chip portion 12c magnetically coupled to the pole chip portion 12a, and then reaches to a tip portion of the front end portion 12c(1) via the middle portion 12c(2) in the same manner. After reaching to the tip portions of the front end portion 12a(1) and the front end portion 12c(1), the magnetic flux generates a signal magnetic field for recording to the outside near the write gap layer 11. The signal magnetic field partly magnetizes a magnetic recording medium, thereby enabling information to be recorded on the magnetic recording medium.

For reproducing, a sense current is fed through the MR film 5 of the reproducing head. Since the resistance of the MR film 5 changes according to a reproducing signal magnetic field from the magnetic recording medium, information recorded on the magnetic recording medium can be read out by detecting the resistance change according to a change in the sense current.

In the embodiment, the uniform width portion of the top pole chip 12ac constituting a part of the pole portion 100 comprises two parts, i.e., top and bottom parts (the front end portions 12a(1) and 12c(1)), both of which are made of a magnetic material having a high magnetic flux density of 1.5 tesla or more. Therefore, even when a pole width is locally minimized in order to increase a recording density, the phenomenon of saturation of magnetic flux is prevented, so that the propagation of magnetic flux is smoothed. Therefore, a sufficient amount of magnetic flux is supplied to the respective tip portions of the front end portions 12a(1) and 12c(1) having a low magnetic volume, so that superior overwrite characteristics can be ensured.

In the embodiment, the top pole chip 12ac has the two-layer structure, an iron-nickel-cobalt alloy is used as a material of the pole chip portion 12a that is the top layer portion of the top pole chip 12ac, and nickel iron is used as a material of the pole chip portion 12c that is the bottom layer portion thereof. This also contributes to the ensured superior overwrite characteristics. The reason is as follows. That is, in general, the iron-nickel-cobalt alloy to be used as the material of the pole chip portion 12a can be used as an etching mask because of its properties of high hardness as described above, whereas it is difficult to control the composition of the iron-nickel-cobalt alloy for plating. When the composition is insufficiently controlled, variations in magnetic flux density may occur in part in the iron-nickel-cobalt alloy, and thus variations may occur in characteristics of propagation of magnetic flux. On the other hand, the composition of the nickel iron to be used as the material of the pole chip portion 12c can be controlled with relative ease by using sputtering as a method of forming the pole chip portion 12c. Therefore, even if the composition of the iron-nickel-cobalt alloy somewhat varies and thus variations occur in the characteristics of propagation of magnetic flux through the pole chip portion 12a, the pole chip portion 12c made of the nickel iron having the properly controlled composition ensures that a magnetic flux properly propagates through the pole chip portion 12c.

In the embodiment, the nonmagnetic layer pattern 10 made of a nonmagnetic material such as alumina is located on and adjacent to the flat bottom pole 9. The nonmagnetic layer pattern 10 functions as a magnetic flux shield to prevent the flow of magnetic flux (the leakage of magnetic flux) from a region over the pattern 10 toward a region under the pattern 10. The existence of the nonmagnetic layer pattern 10 allows preventing a magnetic flux from propagating from the top pole chip 12ac, through the write gap layer 11 and to the bottom pole 9 in a region corresponding to the region where the nonmagnetic layer pattern 10 is located, as compared to the existence of only the thin write gap layer 11 between the top pole chip 12ac and the bottom pole 9. More particularly, the most front edge of the nonmagnetic layer pattern 10 is located in the region in which the front end portion 12a(1) of the pole chip portion 12a (or the front end portion 12c(1) of the pole chip portion 12c) lies, and thus "the leakage of magnetic flux" can be prevented throughout almost all of the top pole chip 12ac. Therefore, a propagation loss of magnetic flux resulting from "the leakage of magnetic flux" can be avoided in the process of propagation of magnetic flux through the top pole chip 12ac. This also contributes to the ensured superior overwrite characteristics. The nonmagnetic layer pattern 10 can prevent a magnetic flux from propagating from the bottom pole 9 to the top pole chip 12ac, as well as prevent a magnetic flux from propagating from the top pole chip 12ac to the bottom pole 9.

In the embodiment, the respective widths W1, W2 and W3 of the front end portion 12a(1), the middle portion 12a(2) and the rear end portion 12a(3), which constitute the pole chip portion 12a, are set so as to satisfy W1<W2<W3. Therefore, the magnetic volumes of the portions 12a(1), 12a(2) and 12a(3) also satisfy V1<V2<V3, where V1, V2 and V3 denote the magnetic volumes of the portions 12a(1), 12a(2) and 12a(3), respectively. In the process in which a magnetic flux propagates from the rear end portion 12a(3) to the front end portion 12a(1) via the middle portion 12a(2) after flowing into the pole chip portion 12a, the magnetic flux is, therefore, gradually focused according to a gradual decrease in the magnetic volume, so that a sufficient amount of magnetic flux is supplied to the front end portion 12a(1). As described above, the magnetic volumes of the portions constituting the pole chip portion 12a are optimized, and thus the phenomenon of saturation of magnetic flux is avoided in the process of propagation of magnetic flux. This also contributes to the ensured superior overwrite characteristics. The above-mentioned advantages based on the gradual decrease in the magnetic volume are obtained in the same manner in the case of the pole chip portion 12c.

In the embodiment, the nonmagnetic layer pattern 10 has the inclined surface at and near the front edge of the nonmagnetic layer pattern 10, and therefore the flow of magnetic flux through the top pole chip 12ac in the region over the inclined surface can be smoothed.

In the embodiment, the position of the most front edge of the top yoke 12e is located rearward with respect to the position of the air bearing surface 80, so that a direct exit of magnetic flux from the top yoke 12e to the air bearing surface 80 can be avoided. Therefore, the occurrence of the side erase phenomenon can be prevented.

Modifications of First Embodiment

In the embodiment, a magnetic material having a high magnetic flux density of 1.5 tesla or more (e.g., iron nitride, an iron-nickel-cobalt alloy or the like) is used as a material of both the pole chip precursory layer 112 (the pole chip portion 12c) and the pole chip portion 12a. The magnetic flux density of the magnetic material to be used for forming the above-mentioned portions 112 (12c) and 12a can be freely set. More specifically, for example, two types of magnetic materials having an equal magnetic flux density may be used as the material of the above-mentioned portions, or two types of magnetic materials having different magnetic flux densities may be used as the material thereof. In either of these cases, almost the same advantages as the advantages of the above-described embodiment can be obtained. When the magnetic materials having different magnetic flux densities are used, for example, it is preferable that the magnetic flux density of the magnetic material for forming the pole chip precursory layer 112 be higher than the magnetic flux density of the magnetic material for forming the pole chip portion 12a for the following reason. In other words, the operation of the thin film magnetic head (e.g., the recording operation of information, etc.) depends primarily on the action of a magnetic flux propagating through a region of the top pole chip 12ac close to the write gap layer 11. When two types of magnetic materials having different magnetic flux densities are used, it is therefore preferable that a distribution of magnetic flux (hereinafter sometimes referred to as "a magnetic flux density profile") be constructed so that a bottom layer region (the pole chip portion 12c) of the top pole chip 12ac has a higher magnetic flux density than a top layer region (the pole chip portion 12a) of the top pole chip 12ac has. The magnetic flux density profile of the top pole chip 12ac may be freely adjusted as needed.

In the embodiment, a method of forming the bottom pole 9, the pole chip portion 12c, the top yoke 12e and the like is that a predetermined magnetic material layer is formed by means of sputtering and thereafter the magnetic material layer is patterned by the etching process. However, the invention is not necessarily limited to this method, and the above-mentioned portions may be formed by means of frame plating. When the composition of the pole chip precursory layer 112 is properly controlled so as to ensure good characteristics of propagation of magnetic flux through the pole chip portion 12c to be finally formed, it is preferable that the material described by referring to the above-mentioned embodiment be used as a material of the pole chip portion 12c.

In the embodiment, an iron-nickel-cobalt alloy is used as a material of the pole chip portion 12a, but the invention is not necessarily limited to this embodiment, and, for example, Permalloy, iron nitride, an amorphous alloy such as a cobalt-iron alloy, a zirconium-cobalt-iron alloy oxide or a zirconium-iron alloy nitride, or the like may be used. A method of forming the pole chip portion 12a is not limited to the above-described frame plating, and sputtering and etching may be used in the same manner as the method of forming the bottom pole 9 and the like. To reduce the amount of film decrease of the pole chip portion 12a for functioning as a mask for patterning the pole chip precursory layer 112, it is preferable that the iron-nickel-cobalt alloy be used as the material of the pole chip portion 12a as described by referring to the above-mentioned embodiment.

In the embodiment, electroplating is used as a method of forming the bottom shield layer 3 and the top shield layer 7, but the invention is not necessarily limited to this embodiment. For example, the same method as the method of forming the pole chip portion 12c and the like, i.e., sputtering and etching, may be used as a method of forming the bottom shield layer 3 and/or the top shield layer 7. In this case, iron nitride, an amorphous alloy (a cobalt-iron alloy, a zirconium-cobalt-iron alloy oxide or a zirconium-iron alloy nitride) or the like, as well as the above-mentioned Permalloy, may be used as a material of the bottom shield layer 3 and the top shield layer 7. The use of the same method as the method of forming the pole chip portion 12c and the like allows forming the bottom shield layer 3 and the top shield layer 7 with higher accuracy in a shorter time, and therefore contributes to the reduced time required for manufacturing the whole thin film magnetic head.

Figure 14:
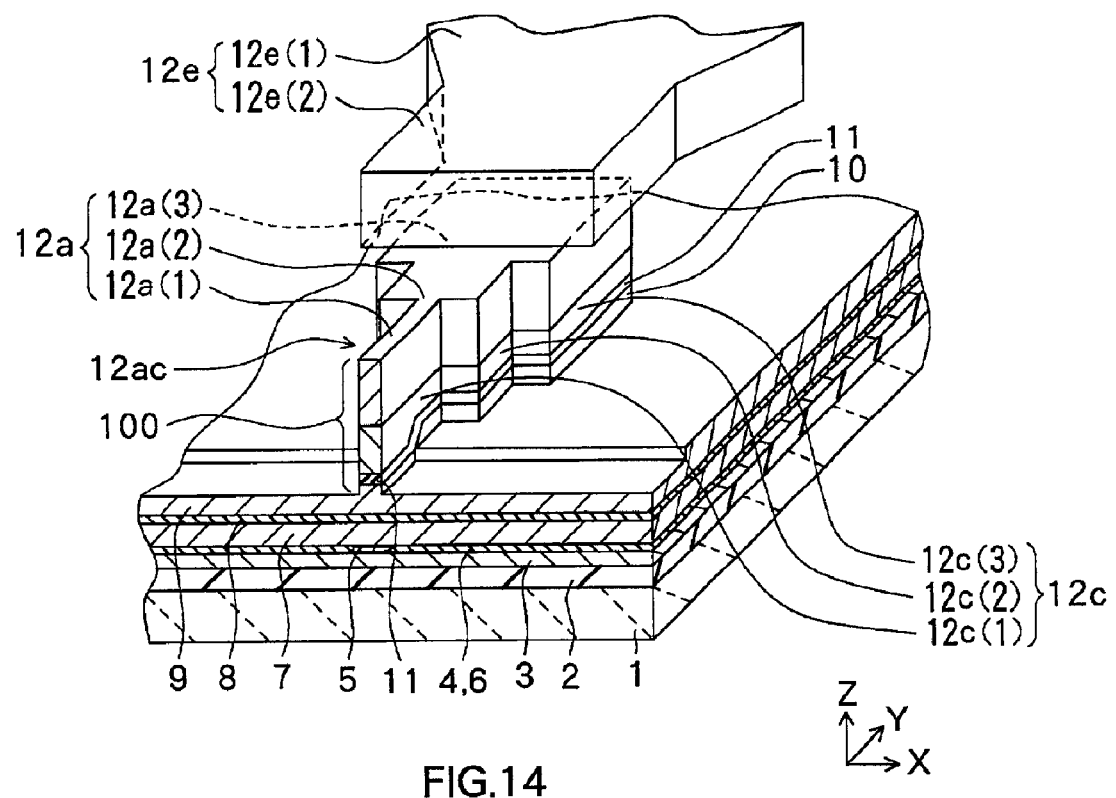
FIG. 14 is a perspective view of a modification of the method of manufacturing a thin film magnetic head according to the first embodiment of the invention.
Figure 15:
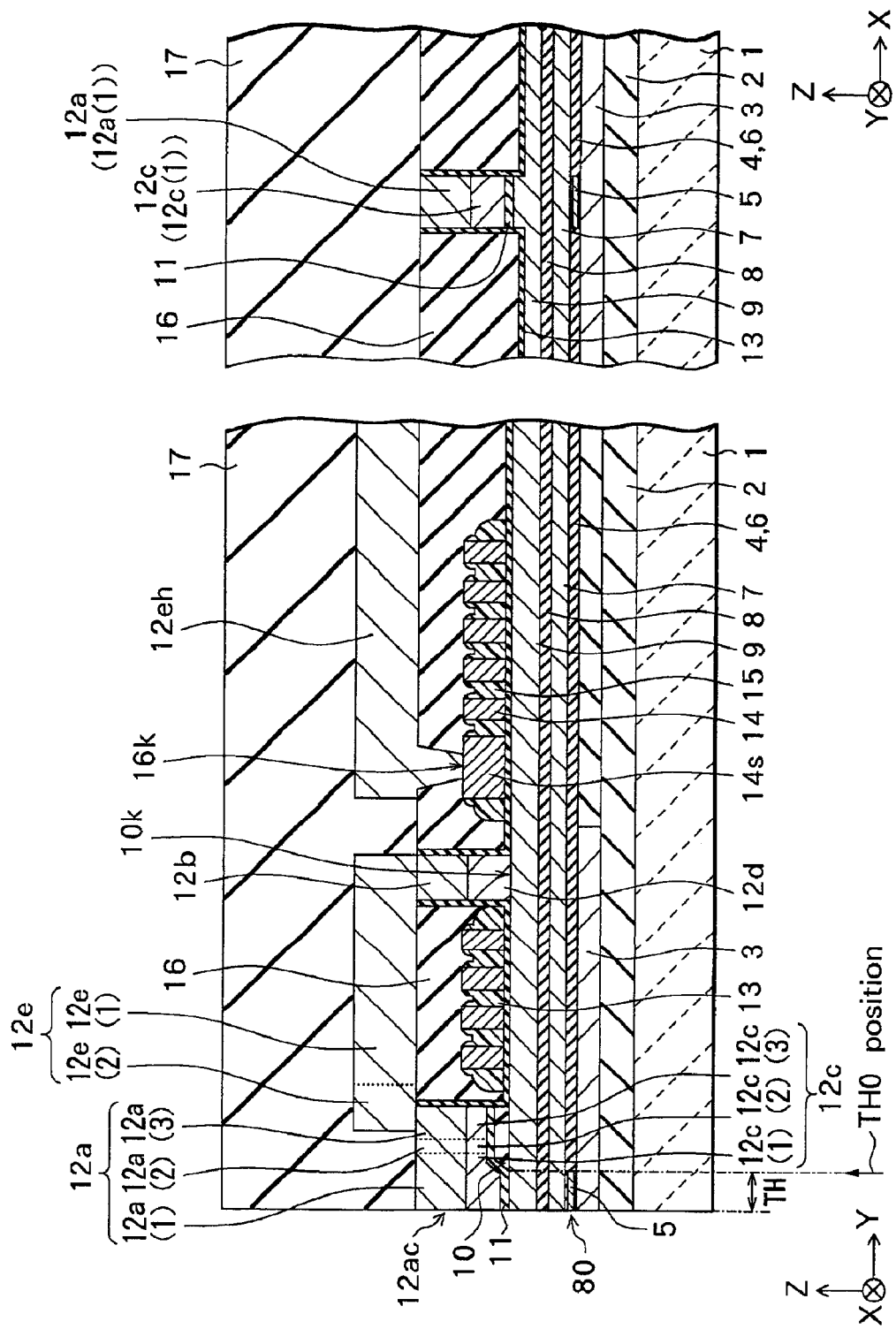
FIGS. 15A and 15B are cross sectional views corresponding to the perspective view shown in FIG. 14.

In the embodiment, only a part of the nonmagnetic layer pattern 10 in the peripheral region around the top pole chip 12ac is removed by the etching process using RIE for forming the pole portion 100 as shown in FIG. 11, but the invention is not necessarily limited to this embodiment. For example, as shown in FIG. 14, the nonmagnetic layer pattern 10 in the peripheral region around the top pole chip 12ac may be removed so as to expose the bottom pole 9 under the adjusted etching conditions. In this case, the structure of the thin film magnetic head to be finally formed is as shown in FIGS. 15A and 15B. FIGS. 15A and 15B correspond to FIGS. 8A and 8B. As shown in FIGS. 15A and 15B, when the etching process is performed until the bottom pole 9 is exposed, the position of the surface of the underlayer in the region where the thin film coil 14 is located becomes lower than the position of the surface of the underlayer shown in FIGS. 8A and 8B. Therefore, as described above, the film thickness of the pole chip portion 12a can be further reduced by lowering the position of the surface of the underlayer in the region where the thin film coil 14 is located. Accordingly, the pole chip portion 12a can be formed with higher stability.

In the embodiment, a photoresist is used as a material of the insulating film 15, but the invention is not necessarily limited to this embodiment. Besides the above-mentioned photoresist, a polyimide resin, SOG (spin on glass) or the like exhibiting fluidity during heating similarly to the photoresist, for example, may be used.

In the embodiment, alumina is used as a material of the write gap layer 11 and sputtering is used as a method of forming the write gap layer 11, but the invention is not necessarily limited to this embodiment. Besides alumina, an inorganic insulating material such as aluminum nitride (AlN), silicon oxide or silicon nitride may be used as the material of the write gap layer 11, or a nonmagnetic metal such as tantalum (Ta), titanium tungsten (WTi) or titanium nitride (TiN) may be used. Besides sputtering, CVD (chemical vapor deposition) may be used as the method of forming the write gap layer 1. The write gap layer 11 is formed by using this method, and thus the gap layer can be prevented from containing a pinhole or the like, so that the leakage of magnetic flux through the write gap layer 11 can be avoided. This advantage is effective particularly when the thickness of the write gap layer 1 is reduced.

Figure 16:
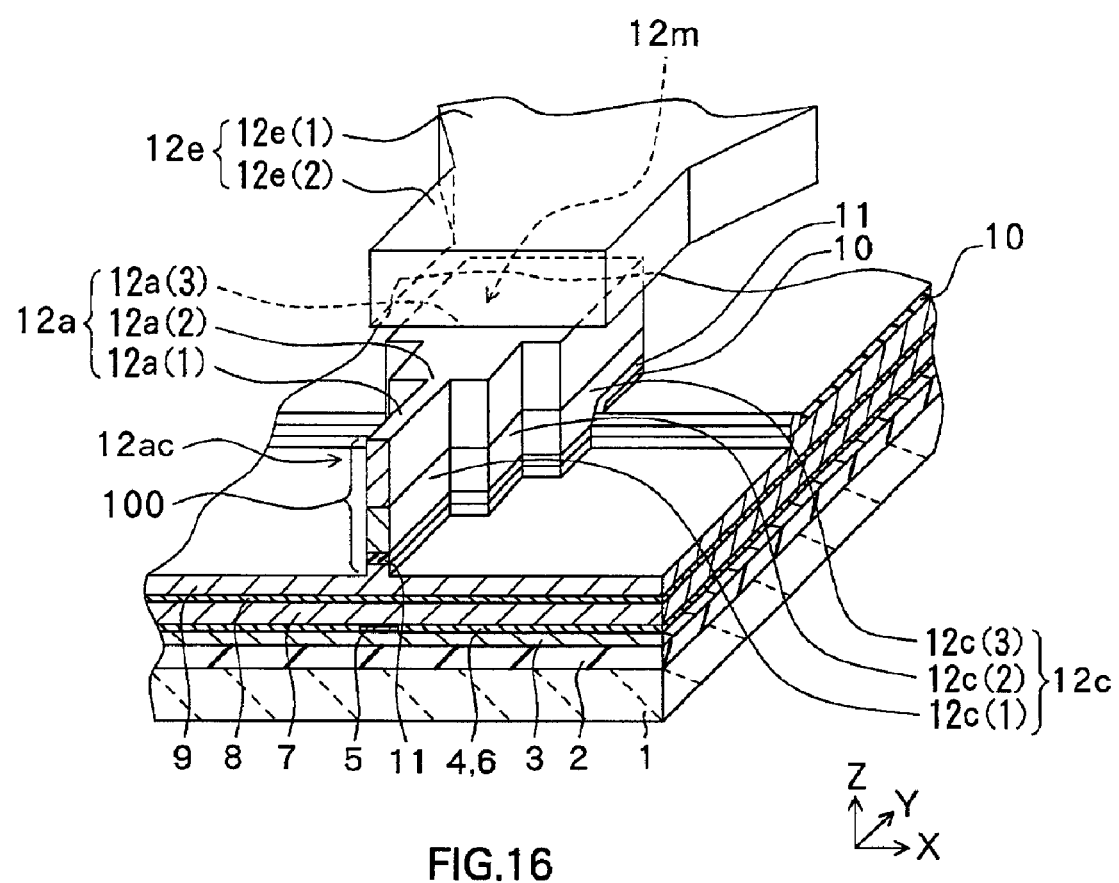
FIG. 16 is a perspective view of a modification of a structure of the thin film magnetic head according to the first embodiment of the invention.

In the embodiment, as shown in FIG. 12, the most front edge of the nonmagnetic layer pattern 10 is located in the region in which the front end portion 12c(1) of the pole chip portion 12c lies, but the invention is not necessarily limited to this embodiment, and the position of the most front edge can be freely changed. For example, as shown in FIG. 16, the most front edge of the nonmagnetic layer pattern 10 may be located in a region in which the rear end portion 12c(3) of the pole chip portion 12c lies. In this case, it is preferable that the position of the most front edge of the nonmagnetic layer pattern 10 substantially match or be located frontward with respect to the position of the most front edge of the top yoke 12e. The reason is as follows: a magnetic flux flows downward from the top yoke 12e to the top pole chip 12ac in a region corresponding to a contact surface 12m on which the pole chip portion 12a is in contact with the top yoke 12e, and thus "the leakage of magnetic flux", in particular, is prone to occur in the above-mentioned region. The nonmagnetic layer pattern 10 extends so as to include the region corresponding to the contact surface 12m, and thus "the leakage of magnetic flux" can be prevented in the region corresponding to the contact surface 12m. The structure shown in FIG. 16, except for the above-mentioned structural feature, is substantially the same as the structure shown in FIG. 12.

In the embodiment, as shown in FIGS. 8A and 8B, the formation of the nonmagnetic layer pattern 10 on the bottom pole 9 is followed by the formation of the write gap layer 11 for coating both the bottom pole 9 and the nonmagnetic layer pattern 10, but the invention is not necessarily limited to this embodiment. For example, as shown in FIGS. 17A and 17B, the formation of the write gap layer 11 on the bottom pole 9 may be followed by the formation of the nonmagnetic layer pattern 10 on the write gap layer 11. Also in this case, about the same advantages as the advantages of the above-described embodiment can be obtained. FIGS. 17A and 17B show the case where the write gap layer 11 is exposed by removing the nonmagnetic layer pattern 10 in the peripheral region around the top pole chip 12ac by means of the etching process using RIE for forming the pole portion 100. The structure shown in FIGS. 17A and 17B, except for the above-mentioned structural feature, is substantially the same as the structure shown in FIGS. 8A and 8B.

Figure 18A:
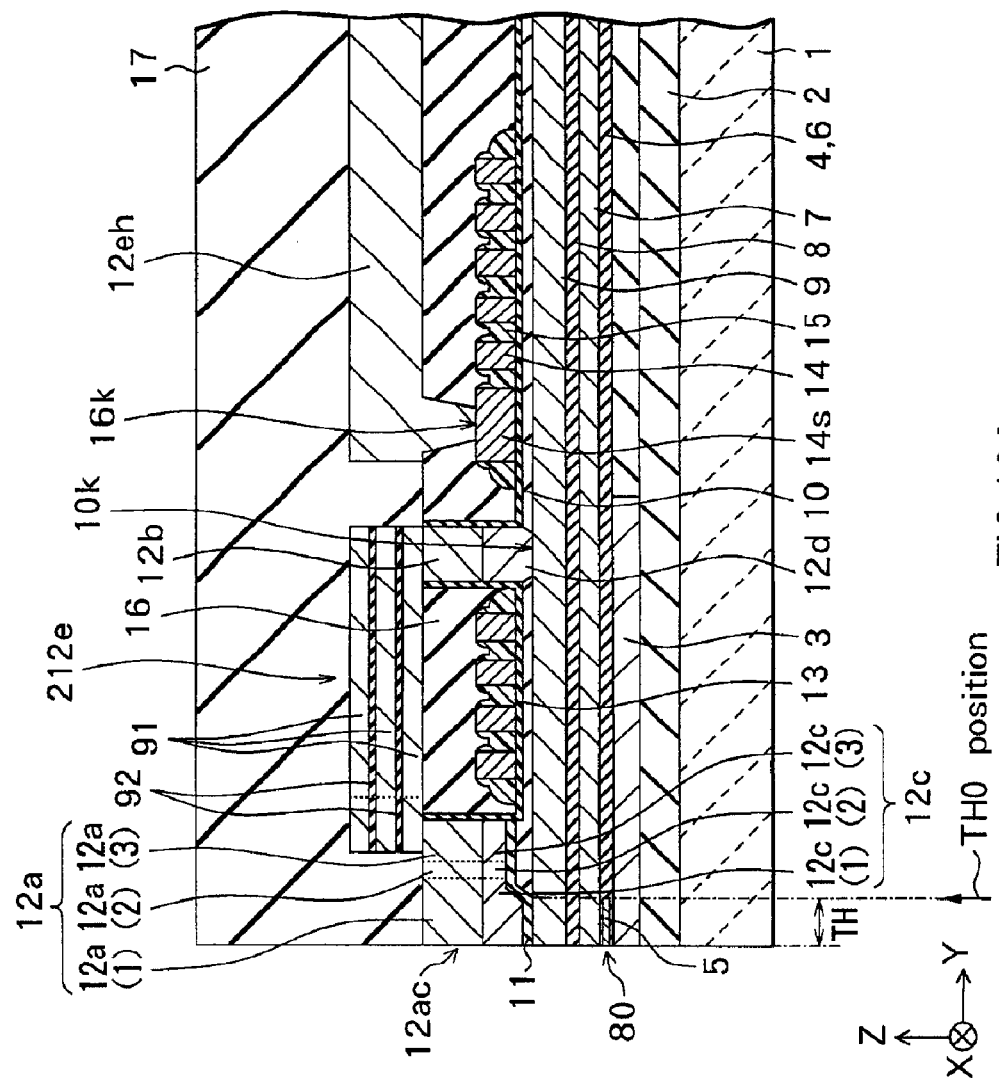
FIGS. 18A and 18B are cross sectional views of a modification of a top yoke of the thin film magnetic head according to the first embodiment of the invention.
Figure 18B:
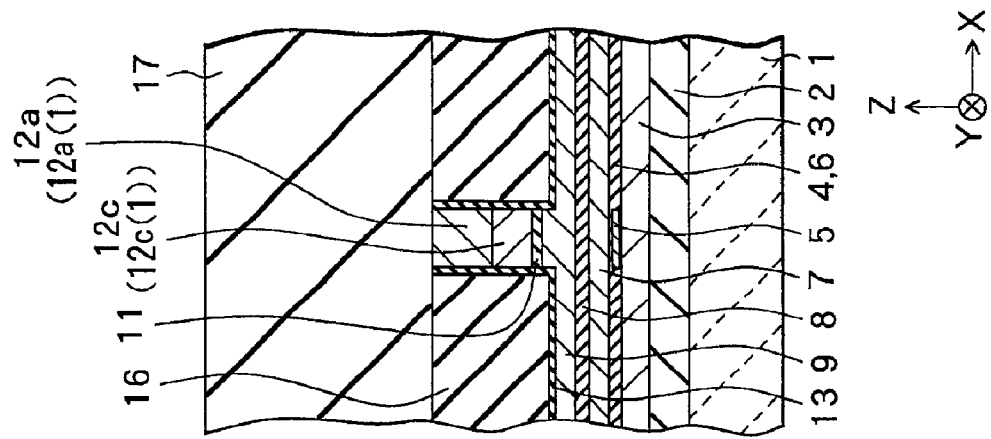

In the embodiment, the description is given with regard to the case where the top yoke (12e) has a single-layer structure of iron nitride (see FIGS. 8A and 8B), but the invention is not necessarily limited to this embodiment. For example, as shown in FIGS. 18A and 18B, a top yoke (212e) may have a stacked structure comprising a high saturation magnetic flux density material layer 91 such as iron nitride alternating with an inorganic insulating material layer 92 such as alumina. The top yoke having this structure allows preventing the generation of eddy current in the magnetic path and thus permits improving HF characteristics. RIE is used to form both the above-mentioned high saturation magnetic flux density material layer 91 and inorganic insulating material layer 92, thereby allowing a reduction in the forming time. The structure shown in FIGS. 18A and 18B, except for the top yoke 212e, is substantially the same as the above-mentioned structure shown in FIGS. 8A and 8B.

In the embodiment, the coil connecting portion 14s is located at the inner terminal end of the thin film coil 14, but the invention is not necessarily limited to this embodiment. For example, the coil connecting portion 14s may be located at the outer terminal end of the thin film coil 14. Also in this case, a coil connecting wiring 14eh is provided so as to be connected to the coil connecting portion 14s, and thus, almost the same advantages as the advantages of the above-described embodiment can be obtained.

Second Embodiment

Next, a second embodiment of the invention will be described.

Figures 23A, 23B:
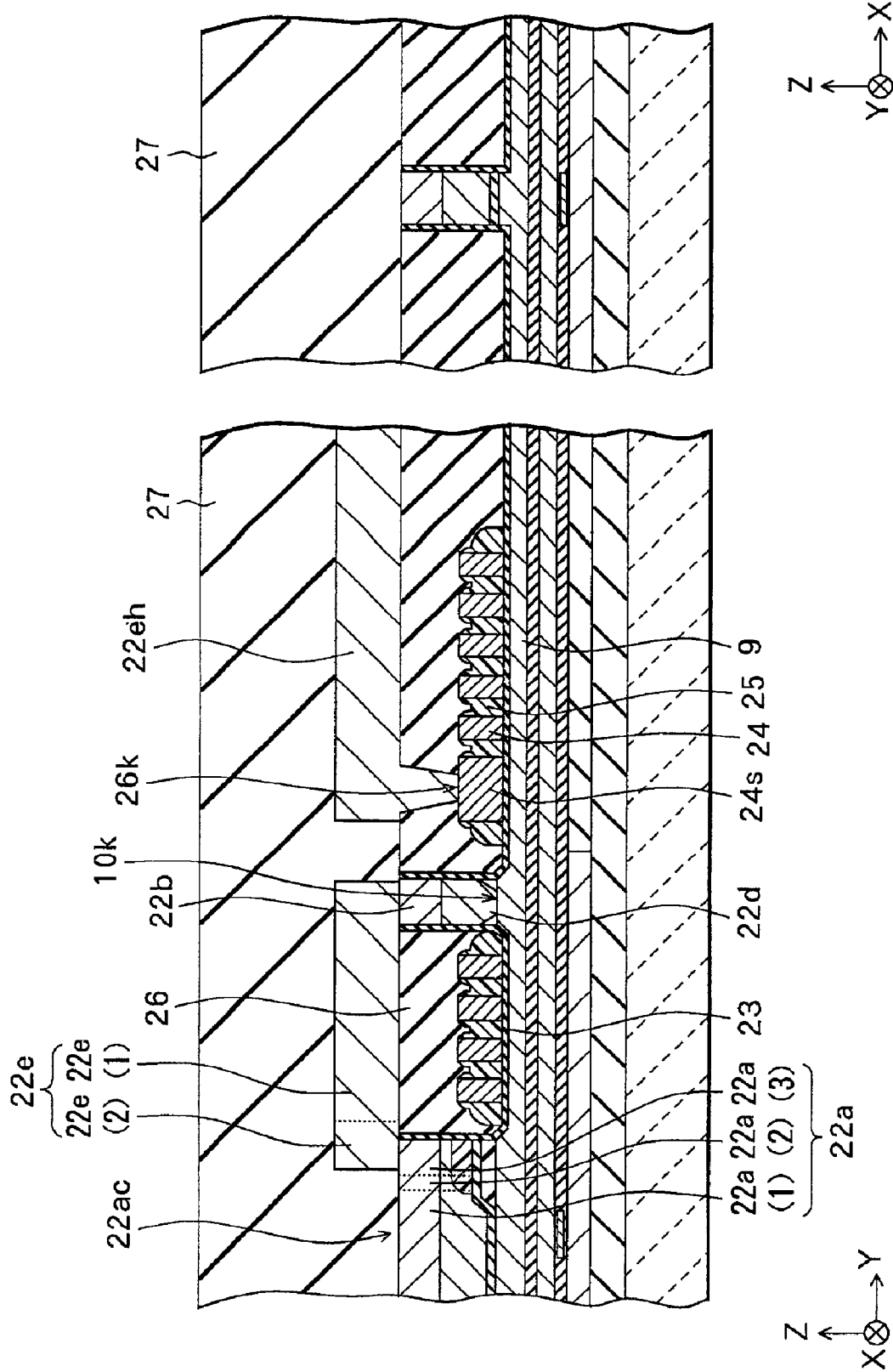
FIGS. 23A and 23B are cross sectional views for describing a step following the step of FIGS. 22A and 22B.
Figures 24A, 24B:
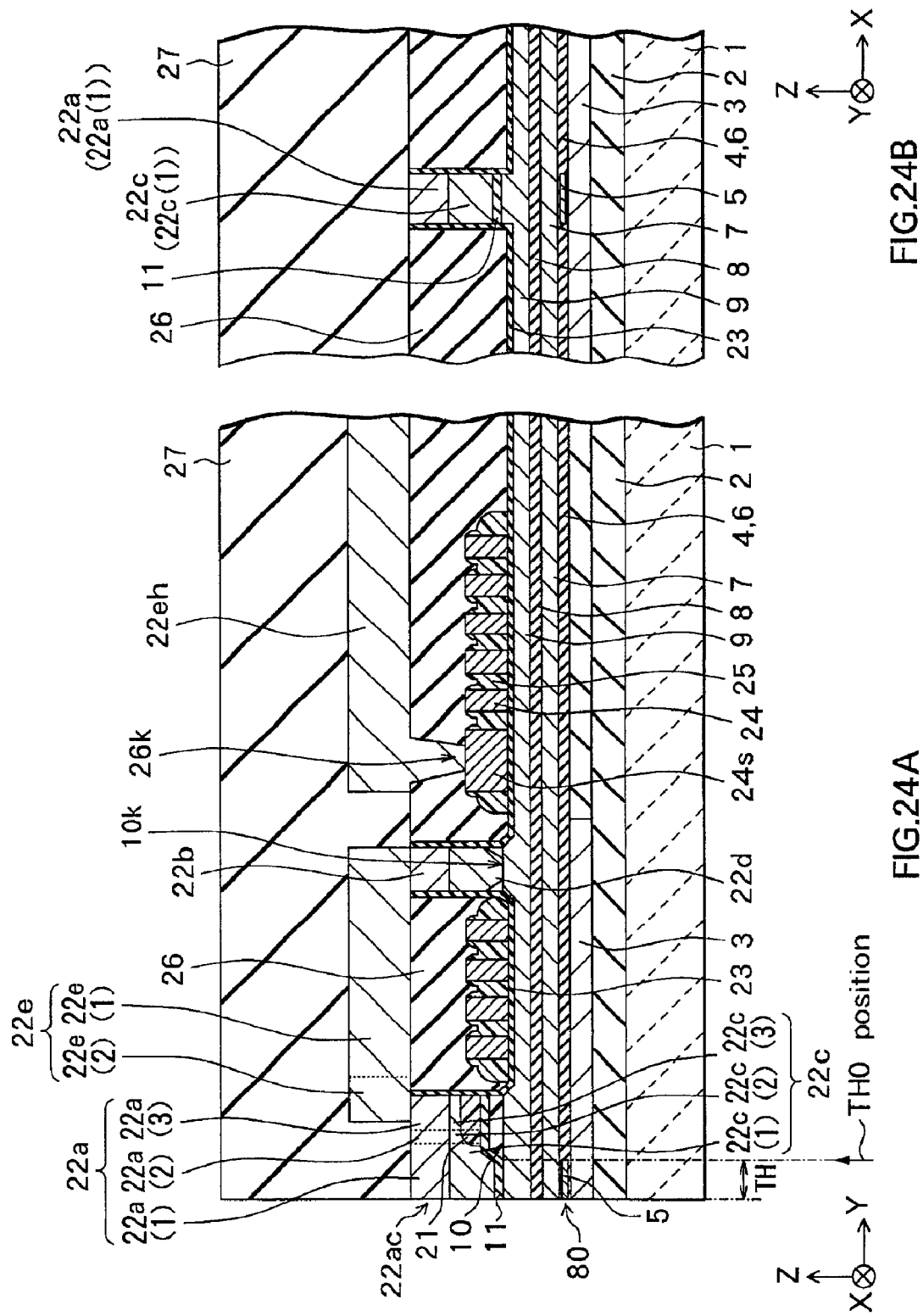
FIGS. 24A and 24B are cross sectional views for describing a step following the step of FIGS. 23A and 23B.
Figure 25:
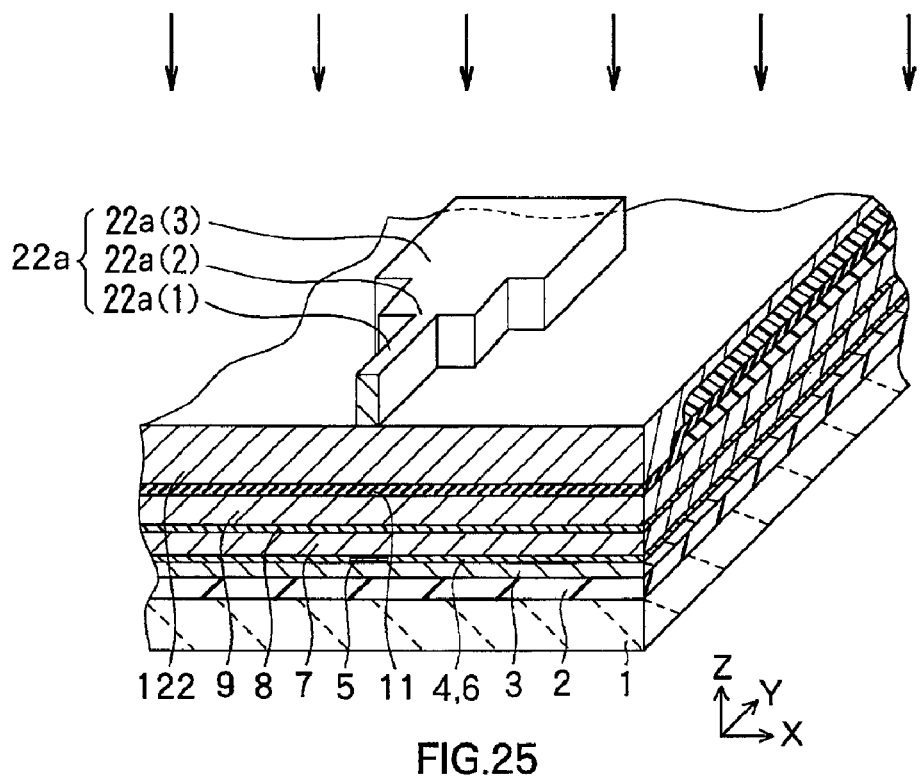
FIG. 25 is a perspective view corresponding to the cross sectional views shown in FIGS. 20A and 20B.
Figure 26:
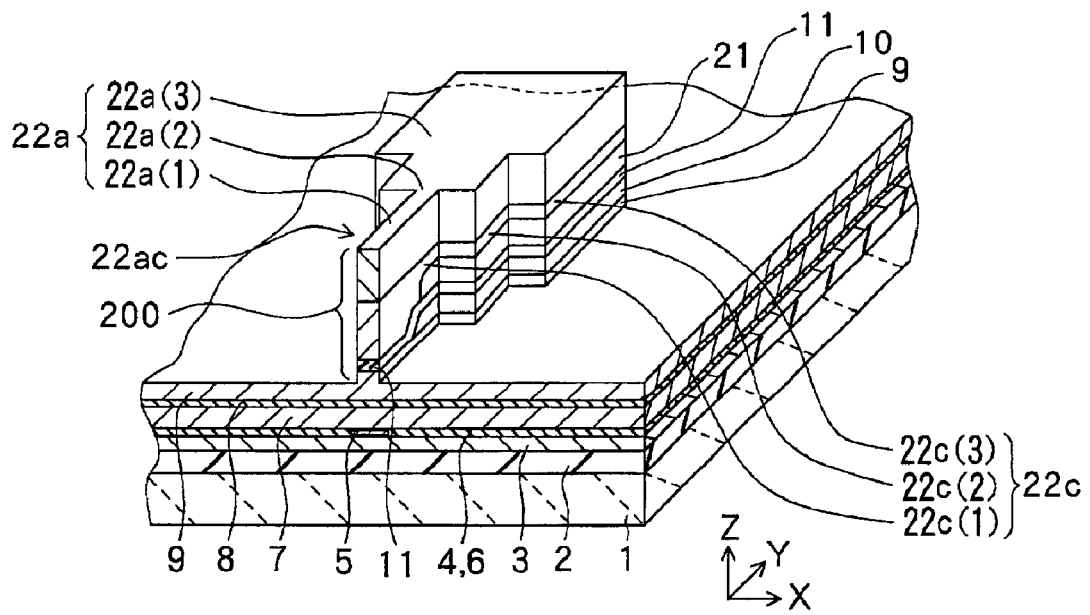
FIG. 26 is a perspective view corresponding to the cross sectional views shown in FIGS. 21A and 21B.
Figure 27:
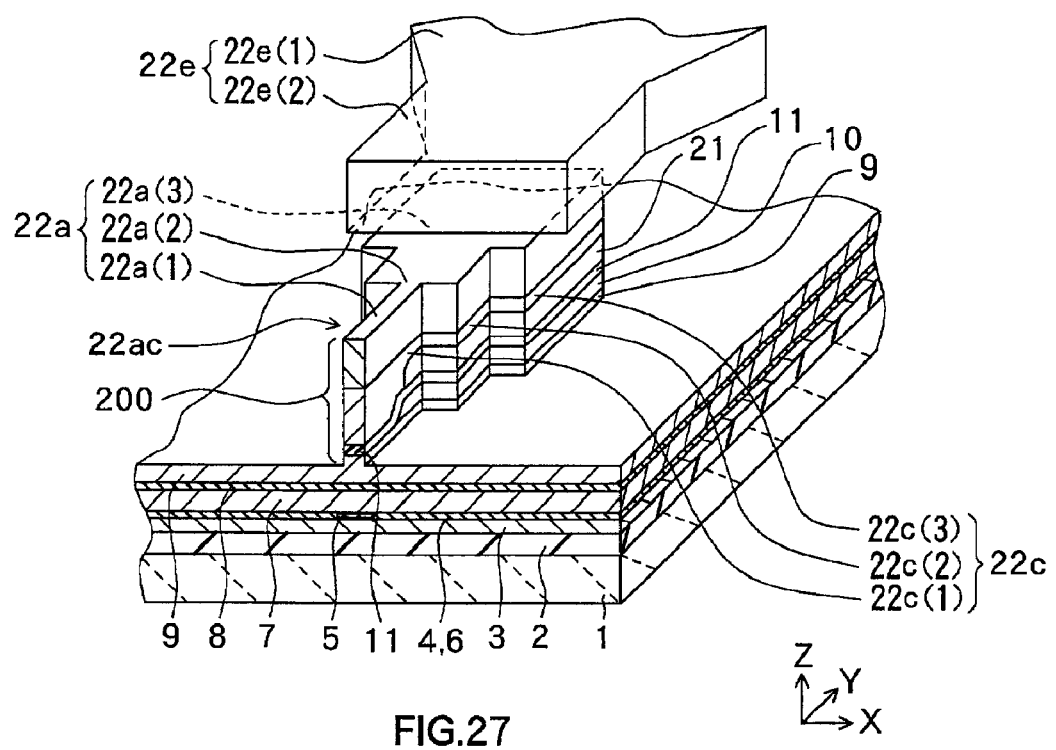
FIG. 27 is a perspective view corresponding to the cross sectional views shown in FIGS. 24A and 24B.

Firstly, the description is given with reference to FIGS. 19A to 27 with regard to a method of manufacturing a composite thin film magnetic head as a method of manufacturing a thin film magnetic head according to the second embodiment of the invention. FIGS. 19A, 20A, 21A, 22A, 23A and 24A show a cross section perpendicular to the air bearing surface, and FIGS. 19B, 20B, 21B, 22B, 23B and 24B show a cross section of a pole portion parallel to the air bearing surface. FIGS. 25 to 27 are perspective views corresponding to main manufacturing steps. FIG. 25 corresponds to a state shown in FIGS. 20A and 20B, FIG. 26 corresponds to a state shown in FIGS. 21A and 21B, and FIG. 27 corresponds to a state shown in FIGS. 24A and 24B. FIG. 26 does not show an insulating film 24 and the like shown in FIGS. 21A and 21B, and FIG. 27 does not show a thin film coil 25, insulating films 26 and 27, an overcoat layer 27 and the like shown in FIGS. 24A and 24B. The expressions about the X-axis, Y-axis and Z-axis directions in FIGS. 19A to 27 are the same as the expressions in the above-described first embodiment. In FIGS. 19A to 27, the same parts as the elements of the above-described first embodiment are indicated by the same reference numerals.

In the method of manufacturing a thin film magnetic head according to the second embodiment, the step of forming the write gap layer 11 shown in FIGS. 19A and 19B and the preceding steps are the same as the step of forming the write gap layer 11 shown in FIGS. 2A and 2B and the preceding steps in the above-described first embodiment, and thus the description thereof is omitted.

In the second embodiment, after forming the write gap layer 11, a film made of a material exhibiting fluidity during heating, e.g., an organic insulating material such as a photoresist, is deposited with a thickness of about 0.5 $\mu$m to 1.0 $\mu$m on the flat write gap layer 11 on the nonmagnetic layer pattern 10 by use of high-accuracy photolithography. Then, this photoresist film is subjected to heat treatment at a temperature between 200 and 250 degrees, for example. By this heat treatment, a nonmagnetic layer pattern 21 is formed as shown in FIGS. 19A and 19B. The nonmagnetic layer pattern 21 has an inclined surface, which is located at and near an edge of the nonmagnetic layer pattern 21 and is curved so as to more steeply decline at a position closer to the edge. For instance, the nonmagnetic layer pattern 21 is formed in such a manner that the position of the most front edge of the nonmagnetic layer pattern 21 is located rearward with respect to the position of the most front edge of the nonmagnetic layer pattern 10 and thus the nonmagnetic layer pattern 10 and the nonmagnetic layer pattern 21 are formed into steps. The nonmagnetic layer pattern 21 corresponds to a specific example of "a second nonmagnetic layer pattern" of the invention.

Next, as shown in FIGS. 19A and 19B, a pole chip precursory layer 122 made of a magnetic material having a high magnetic flux density of 1.5 tesla or more, e.g., iron nitride, is formed with a thickness of about 0.8 µm to 2.0 µm by means of, for example, sputtering so as to coat the overall surface. Besides iron nitride, a magnetic material having a high magnetic flux density of 1.5 tesla or more similarly to iron nitride, e.g., an amorphous alloy such as a cobalt-iron alloy (FeCo), a zirconium-cobalt-iron alloy oxide (FeCoZrO) or a zirconium-iron alloy nitride (FeZrN), may be used as a material of the pole chip precursory layer 122, as in the case of the pole chip precursory layer 112 of the above-described first embodiment. The pole chip precursory layer 122 corresponds to a specific example of "a magnetic material layer" of the invention.

Next, as shown in FIGS. 20A and 20B, a surface of the pole chip precursory layer 122 is polished and flattened by means of CMP, for example. For instance, this polishing takes place until a film thickness of the pole chip precursory layer 122 reaches to about 0.5 µm to 1.5 µm in the region located frontward with respect to the region where the nonmagnetic layer pattern 10 is located.

Figure 28:
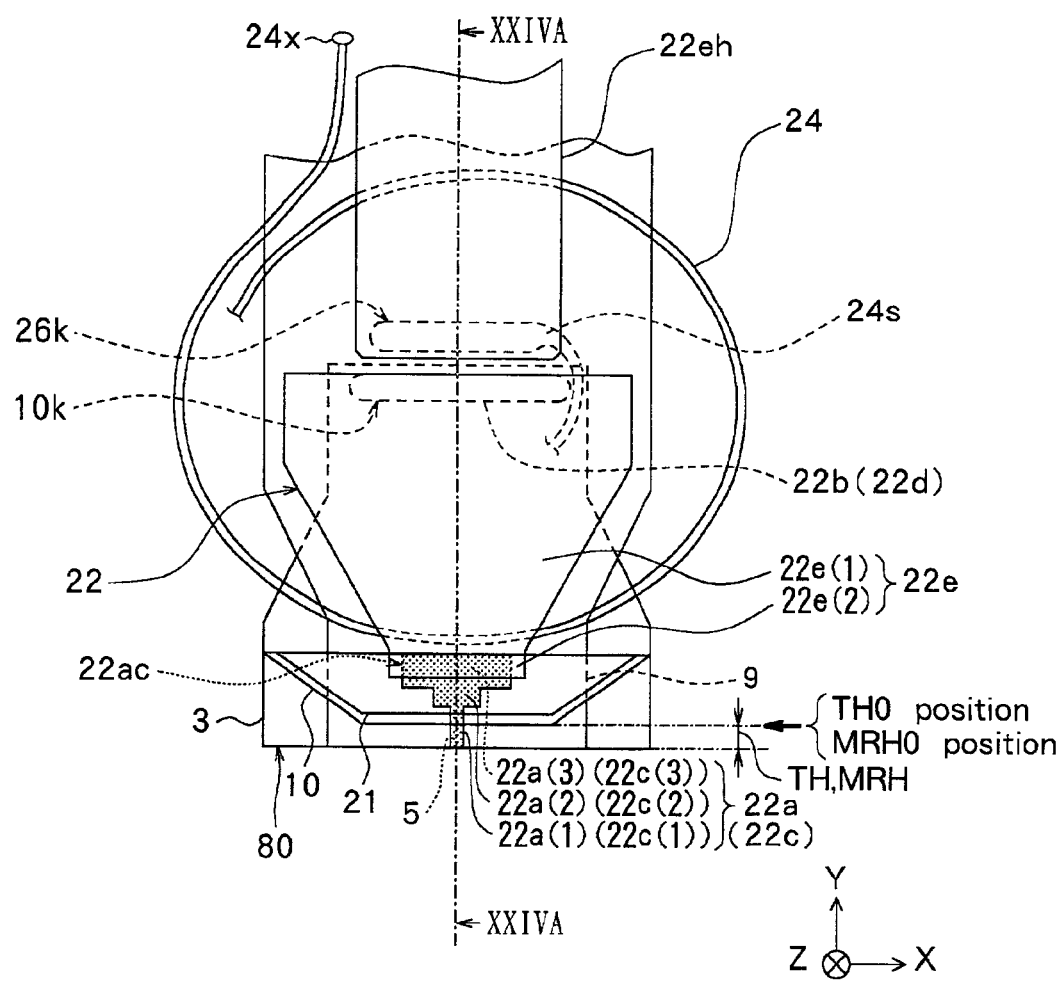
FIG. 28 is a plan view of a planar structure of a thin film magnetic head according to the second embodiment of the invention.
Figure 29:
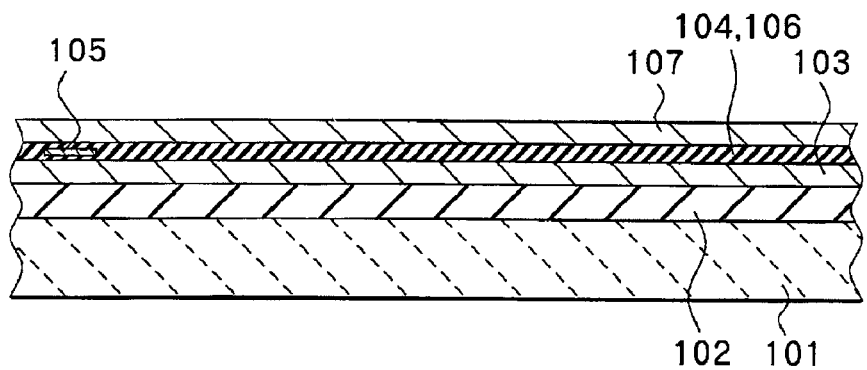
FIG. 29 is a cross sectional view for describing a step of a method of manufacturing a thin film magnetic head of the related art.
Figure 30:
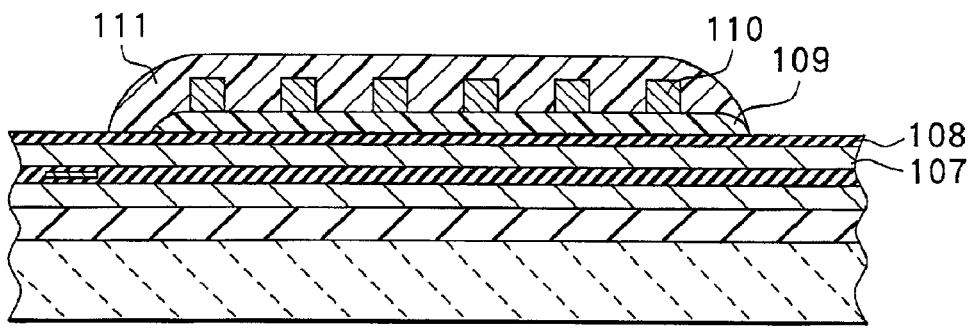
FIG. 30 is a cross sectional view for describing a step following the step of FIG. 29.
Figure 31:
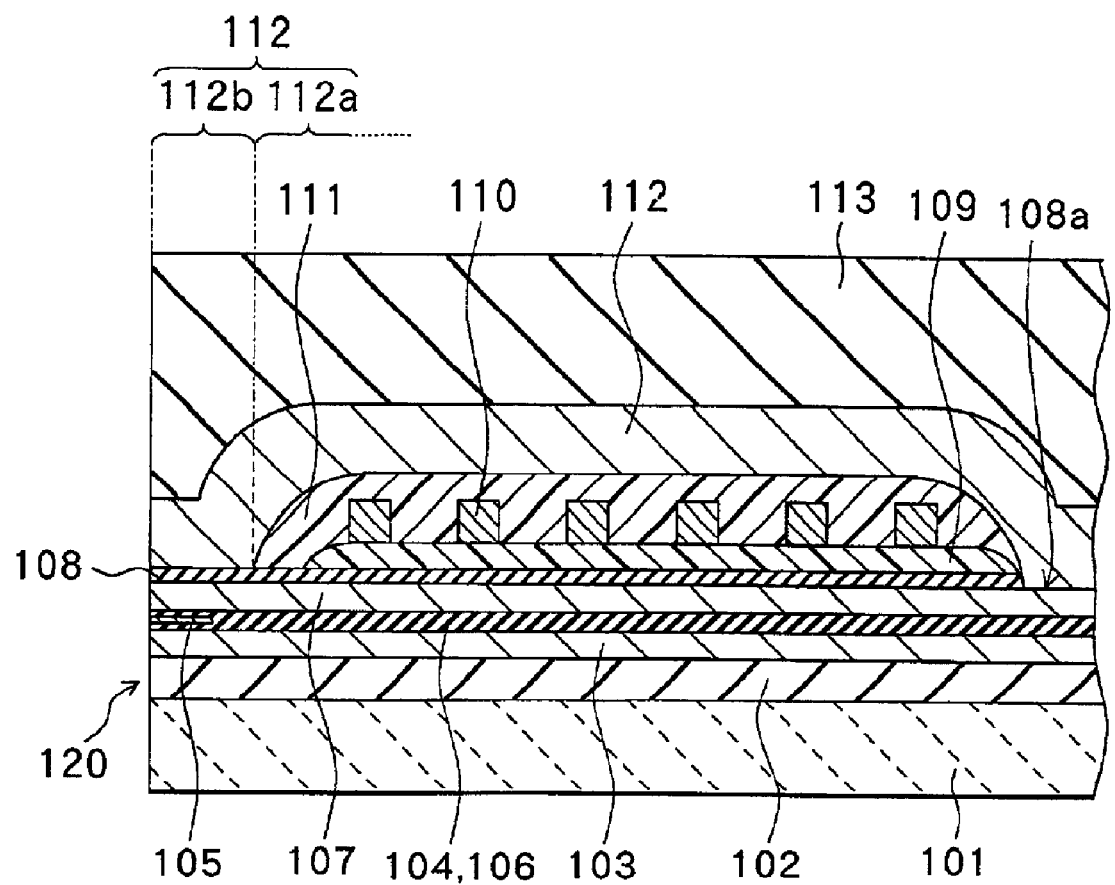
FIG. 31 is a cross sectional view for describing a step following the step of FIG. 30.
Figure 32:
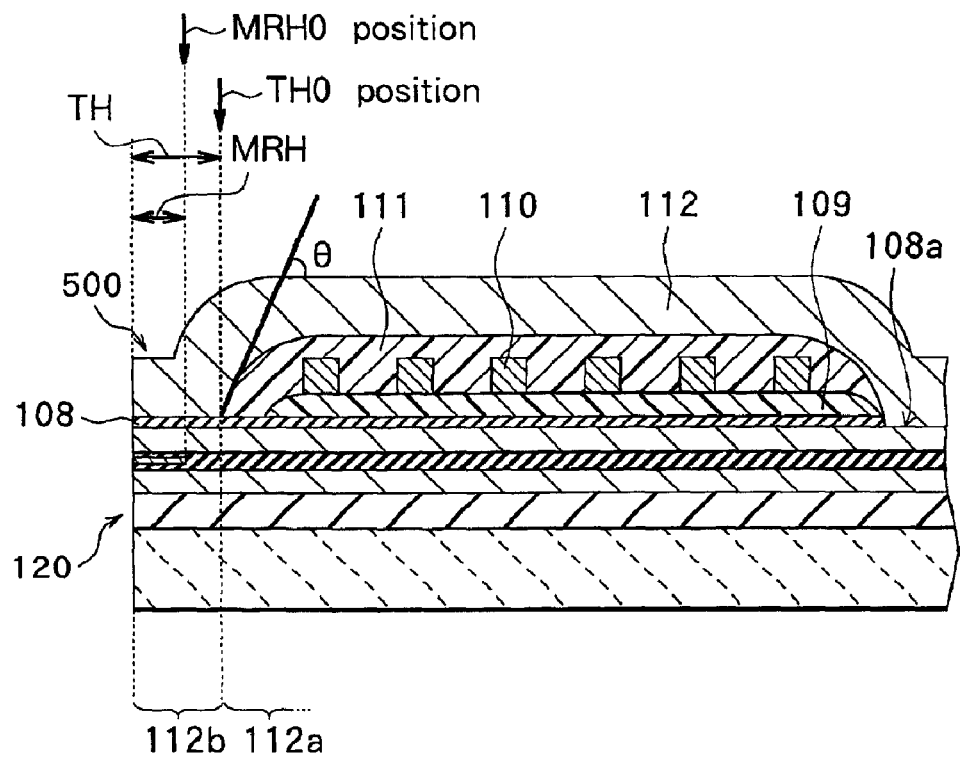
FIG. 32 is a cross sectional view of a principal structure of a thin film magnetic head of the related art.
Figure 33:
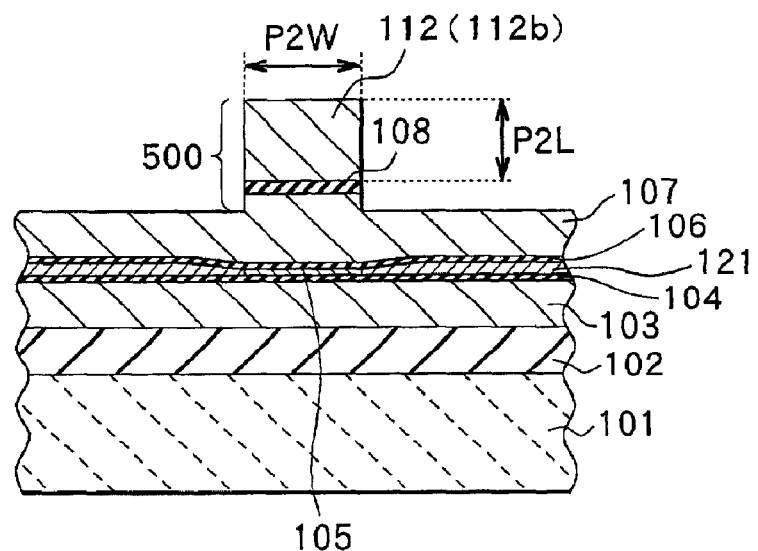
FIG. 33 is a cross sectional view of a cross section of a pole portion of the thin film magnetic head shown in FIG. 32, parallel to an air bearing surface.
Figure 34:
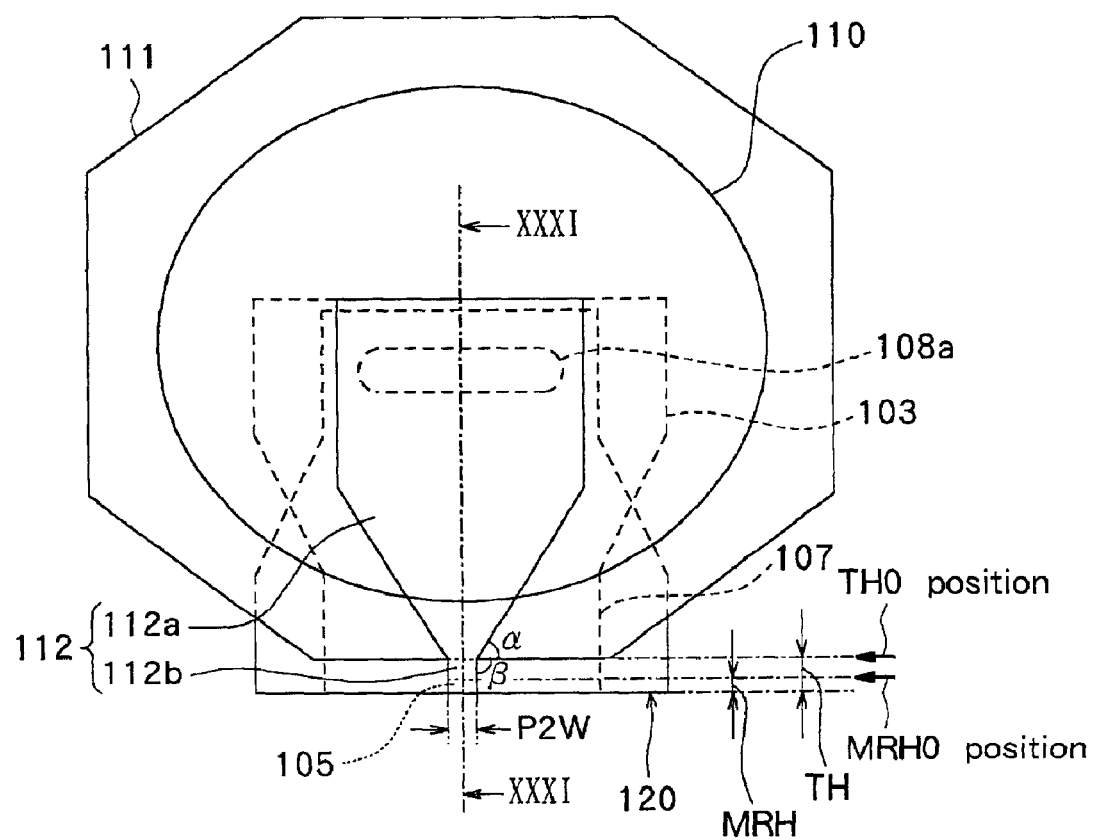
FIG. 34 is a plan view of a structure of the thin film magnetic head of the related art.

Next, as shown in FIGS. 20A, 20B and 25, a pole chip portion 22a made of a magnetic material containing iron (Fe), cobalt (Co) and nickel (Ni) and having a high saturation magnetic flux density of 1.5 tesla or more, e.g., an iron-nickel-cobalt alloy (CoNiFe, Co: 45 wt %, Ni: 30 wt %, Fe: 25 wt %), is selectively formed with a thickness of about 1.5 µm to 2.5 µm at a predetermined position on the pole chip precursory layer 122 by means of frame plating, for example. At the same time when the pole chip portion 22a is formed, a magnetic path connecting portion 22b (not shown in FIG. 25) is selectively formed on the pole chip precursory layer 122. The pole chip portion 22a and the magnetic path connecting portion 22b constitute a part of a top pole 22. The positions of the pole chip portion 22a and the magnetic path connecting portion 22b on the pole chip precursory layer 122, the method of forming the portions 22a and 22b, the structural features of the portions 22a and 22b, and the like are substantially the same as those of the pole chip portion 12a and the magnetic path connecting portion 12b of the above-described first embodiment. The pole chip portion 22a includes a front end portion 22a(1), a middle portion 22a(2) and a rear end portion 22a(3), as shown in FIG. 28 to be described later, for example. The pole chip portion 22a corresponds to a specific example of "a first magnetic film" of the invention.

Next, the overall surface is etched by means of, for example, RIE using both the pole chip portion 22a and the magnetic path connecting portion 22b as masks. For the etching process using RIE, the etching conditions (e.g., the type of etching gas, the processing temperature and so on) are adjusted as in the case of the etching process for forming the pole chip portion 12c or the like and the pole portion 100 of the above-described first embodiment. In the second embodiment in particular, for example, the etching conditions are adjusted so that the region, except for regions where the pole chip portion 22a and the magnetic path connecting portion 22b are located, may be uniformly trenched by means of the etching process for forming the pole portion 100. As shown in FIGS. 21A, 21B and 26, this etching process removes the respective parts of the nonmagnetic layer pattern 21, the write gap layer 11, the nonmagnetic layer pattern 10 and the bottom pole 9 in a region of the pole chip precursory layer 122 excluding the regions where the pole chip portion 22a and the magnetic path connecting portion 22b are located, thereby forming a pole chip portion 22c and a magnetic path connecting portion 22d for constituting a part of the top pole 22. A pole portion 200 having the trim structure is formed by the above-mentioned etching process. The masks in themselves, i.e., the pole chip portion 22a and the magnetic path connecting portion 22b in themselves, are also etched by the etching process for forming the pole chip portion 22c and so on, so that the film thicknesses of the portions 22a and 22b decrease.

The pole chip portion 22c and the magnetic path connecting portion 22d have substantially the same structural features as the pole chip portion 22a and the magnetic path connecting portion 22b have (see FIG. 28). The pole chip portion 22c includes a front end portion 22c(1), a middle portion 22c(2) and a rear end portion 22c(3). Both the pole chip portion 22c and the magnetic path connecting portion 22d are made of a magnetic material (iron nitride) having a high saturation magnetic flux density of 1.5 tesla or more. Hereinafter, the pole chip portion 22a and the pole chip portion 22c are sometimes generically called "a top pole chip 22ac".

The top pole chip 22ac is formed as a combination of the pole chip portion 22a and the pole chip portion 22c through the steps of forming the pole chip portion 22a and the pole chip portion 22c, as in the case of the top pole chip 12ac of the above-described first embodiment. The pole chip portion 22c corresponds to a specific example of "a second magnetic film" of the invention. The front end portion 22a(1) of the pole chip portion 22a and the front end portion 22c(1) of the pole chip portion 22c correspond to a specific example of "a uniform width portion" of the invention, and the pole chip portion 22a and the pole chip portion 22c correspond to a specific example of "a predetermined magnetic layer portion" of the invention.

Next, as shown in FIGS. 21A and 21B, an insulating film 23 made of, for example, alumina is formed with a thickness of about 0.3 µm to 0.5 µm so as to coat the overall surface.

Figures 22A, 22B:
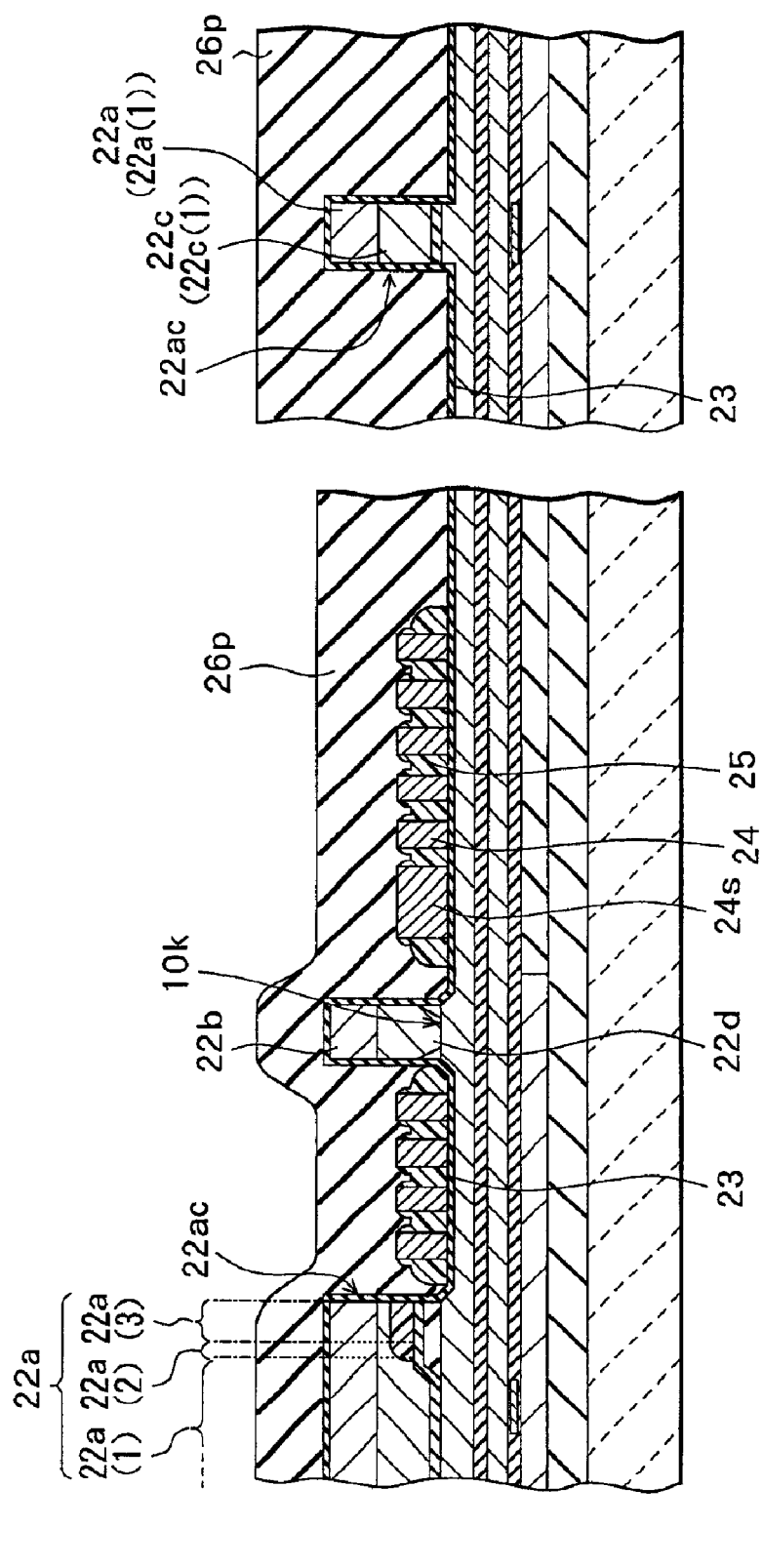
FIGS. 22A and 22B are cross sectional views for describing a step following the step of FIGS. 21A and 21B.

Next, as shown in FIGS. 22A and 22B, a thin film coil 24 made of, for example, copper (Cu) for an inductive recording head is selectively formed with a thickness of about 1.0 µm to 1.5 µm on the flat insulating film 23 in a region located rearward with respect to the region where the top pole chip 22ac is located (excluding the region where the magnetic path connecting portions 22b and 22d are located), by means of electroplating, for example. For example, the thin film coil 24 has substantially the same structural features as the thin film coil 14 of the above-described first embodiment has. At the same time when the thin film coil 24 is formed, for example, a coil connecting portion 24s is integrally formed with the thin film coil 24 on the insulating film 23 at an inner terminal end of the thin film coil 24. The coil connecting portion 24s serves to electrically connect the thin film coil 24 to a coil connecting wiring 22eh (see FIGS. 23A and 23B) to be formed in the following step.

Next, as shown in FIGS. 22A and 22B, an insulating film 25 for providing insulation between windings of the thin film coil 24 and the like is formed. A material of the insulating film 25, a method of forming the insulating film 25, structural features of the insulating film 25 and the like are substantially the same as those of the insulating film 15 of the above-described first embodiment.

Next, as shown in FIGS. 22A and 22B, a layer made of an insulating material, e.g., an alumina layer 26p, is formed with a thickness of about 3.0 μm to 4.0 μM by means of, for instance, sputtering so as to coat the overall surface, and thus the alumina layer 26p coats a region having an uneven structure comprising the top pole chip 22ac, the magnetic path connecting portions 22b and 22d, the thin film coil 24, the coil connecting portion 24s and so forth.

Next, as shown in FIGS. 23A and 23B, the overall surface of the alumina layer 26p is polished and flattened by means of CMP, for example. By this polishing, an insulating film 26 for coating the thin film coil 24 and so on is formed. The polishing takes place until at least the top pole chip 22ac and the magnetic path connecting portion 22b are exposed.

Next, as shown in FIGS. 23A and 23B, the insulating film 26 coating the top surface of the coil connecting portion 24s is partly etched by means of, for example, RIE or ion milling, and thus an opening 26k for connecting the coil connecting portion 24s to the coil connecting wiring 22eh to be formed in the following step is formed.

Next, as shown in FIGS. 23A and 23B, a top yoke 22e for constituting a part of the top pole 22 is selectively formed with a thickness of about 2.0 μm to 3.0 μm on the flattened region, more specifically a region extending from the magnetic path connecting portion 22b to the rear end portion 22a(3) of the pole chip portion 22a. At the same time when the top yoke 22e is formed, the coil connecting wiring 22eh is formed in a region extending from the coil connecting portion 24s to an external circuit (not shown). A material of the top yoke 22e and the coil connecting wiring 22eh, a method of forming them, structural features of them and the like are substantially the same as those of the top yoke 12e and the coil connecting wiring 12eh of the above-described first embodiment, for example. The top yoke 22e has a planar shape shown in FIG. 28 to be described later, for instance. The top pole 22 comprising the top pole chip 22ac, the magnetic path connecting portions 22b and 22d and the top yoke 22e corresponds to a specific example of "a first magnetic layer" of the invention.

Next, as shown in FIGS. 23A and 23B, an overcoat layer 27 made of an insulating material, e.g., an inorganic insulating material such as alumina, is formed with a thickness of about 20 μm to 40 μm so as to coat the overall surface.

Finally, as shown in FIGS. 24A and 24B, the air bearing surface 80 of the recording head and the reproducing head is formed through the steps of machining and polishing, and thus a thin film magnetic head is completed. A three-dimensional structure around the top yoke 22e is as shown in FIG. 27.

FIG. 28 shows a schematic representation of a planar structure of the thin film magnetic head manufactured by the method of manufacturing a thin film magnetic head according to the second embodiment. In FIG. 28, the same parts as the elements of the above-described first embodiment shown in FIG. 13 are indicated by the same reference numerals. FIG. 28 does not show the insulating films 23, 25 and 26, the overcoat layer 27 and so on. The thin film coil 24, its outermost periphery portion alone, is shown in FIG. 28. FIG. 24A corresponds to a cross section viewed in the direction of the arrows along the line XXIVA—XXIVA of FIG. 28.

As shown in FIG. 28, for example, the top pole 22 comprises the top pole chip 22ac, the magnetic path connecting portions 22b and 22d and the top yoke 22e, which are separately formed. The above-mentioned portions 22ac, 22b, 22d and 22e constituting the top pole 22 have substantially the same structural features as the portions constituting the top pole 12 of the above-described first embodiment (i.e., the top pole chip 12ac, the magnetic path connecting portions 12b and 12d and the top yoke 12e) have. The top yoke 22e includes a yoke portion 22e(1) and a connecting portion 22e(2). The pole chip portion 22a includes the front end portion 22a(1), the middle portion 22a(2) and the rear end portion 22a(3), and the pole chip portion 22c includes the front end portion 22c(1), the middle portion 22c(2) and the rear end portion 22c(3).

As shown in FIGS. 24A, 27 and 28, the top pole chip 22ac extends from a bottom step region of the write gap layer 11 to the inclined surface portion of the nonmagnetic layer pattern 21 via a top step region of the write gap layer 11 on the nonmagnetic layer pattern 10. The top yoke 22e is magnetically coupled to the bottom pole 9 with the magnetic path connecting portions 22b and 22d in between in the opening 10k and is also magnetically coupled to the pole chip portion 22c with the pole chip portion 22a in between. That is, the top pole 22 (the pole chip portions 22a and 22c, the magnetic path connecting portions 22b and 22d and the top yoke 22e) is connected to the bottom pole 9, and thus a magnetic path is formed.

As shown in FIG. 28, the thin film coil 24 and the coil connecting portion 24s have the same structural features as the thin film coil 14 and the coil connecting portion 14s of the above-described first embodiment have. The thin film coil 24 is electrically connected to the coil connecting wiring 22eh through the coil connecting portion 24s in the opening 26k. Both an outer terminal 24x of the thin film coil 24 and a rearward part (not shown) of the coil connecting wiring 22eh are connected to an external circuit (not shown) so that the external circuit can feed a current through the thin film coil 24.

As shown in FIGS. 24A, 27 and 28, for example, the nonmagnetic layer pattern 21 is located in such a manner that the most front edge thereof is located in the region in which the front end portion 22a(1) of the pole chip portion 22a (or the front end portion 22c(1) of the pole chip portion 22c) lies. For instance, the position of the most front edge of the nonmagnetic layer pattern 21 is located rearward with respect to the position of the most front edge of the nonmagnetic layer pattern 10.

Structural features of the elements shown in FIG. 28, except for the above-mentioned elements, are the same as the structural features of the elements of the above-described first embodiment (see FIG. 13).

In the second embodiment, the nonmagnetic layer pattern 21 made of a nonmagnetic material such as a photoresist is located on and adjacent to the write gap layer 11 on the nonmagnetic layer pattern 10 as shown in FIGS. 24A and 24B. The nonmagnetic layer pattern 21 functions as a magnetic flux shield, similarly to the nonmagnetic layer pattern 10. The provision of the nonmagnetic layer pattern 21 as well as the nonmagnetic layer pattern 10 allows further preventing "the leakage of magnetic flux", as compared to the provision of only the nonmagnetic layer pattern 10. Moreover, in the second embodiment, the most front edge of the nonmagnetic layer pattern 21 is located in the region in which the front end portion 22c(1) of the pole chip portion 22c lies, so that the propagation loss of magnetic flux resulting from "the leakage of magnetic flux" throughout almost all of the top pole chip 22ac can be further reduced by the same function as the function of the nonmagnetic layer pattern 10. Therefore, more excellent overwrite characteristics can be ensured.

In the second embodiment, the etching process for forming the pole portion 200 involves uniformly etching the region other than the region where the top pole chip 22ac is located (excluding the region where the magnetic path connecting portion 22b is located), thereby trenching the bottom pole 9 partway, so that the position of the surface of the underlayer (the insulating film 23) in the region where the thin film coil 24 is located can become still lower than the corresponding position of the above-described first embodiment (see FIGS. 8A, 8B, 15A and 15B). Therefore, a film thickness of the pole chip portion 22a can be further reduced (to about 1.0 to 2.0 μm) by the same function as the function described by referring to the above-mentioned first embodiment, so that the top pole chip 22ac can be formed with still higher stability.

In the second embodiment, the position of the most front edge of the nonmagnetic layer pattern 21 is located rearward with respect to the position (i.e., the TH0 position) of the most front edge of the nonmagnetic layer pattern 10 so that the nonmagnetic layer patterns 10 and 21 are formed into a stepped portion, and therefore a magnetic flux flowing into the top pole chip 22ac is gradually focused while propagating along the above-mentioned stepped portion. Accordingly, the flow of magnetic flux through the top pole chip 22ac can be smoothed.

In the second embodiment, the nonmagnetic layer pattern 21 has the inclined surface at and near the front edge of the nonmagnetic layer pattern 21, and therefore the flow of magnetic flux through the top pole chip 22ac in a region over the inclined surface portion of the nonmagnetic layer pattern 21 can be smoothed by the same function as the function of the nonmagnetic layer pattern 10.

In the second embodiment, as shown in FIG. 27, the nonmagnetic layer pattern 21 is positioned so that the most front edge of the nonmagnetic layer pattern 21 is located in the region in which the front end portion 22c(1) of the pole chip portion 22c lies, but the invention is not necessarily limited to this embodiment. For example, the position of the nonmagnetic layer pattern 21 may be changed as in the case where the position of the nonmagnetic layer pattern 10 is changed as described by referring to the above-mentioned first embodiment (see FIG. 16).

Functions, advantages, modifications and the like of the method of manufacturing a thin film magnetic head according to the second embodiment, except for the above-mentioned functions, advantages, modifications and the like, are the same as those of the method according to the above-described first embodiment, and thus the description thereof is omitted.

Although the invention has been described above by referring to some embodiments, the invention is not limited to these embodiments and various modifications of the invention are possible. For example, in the above-mentioned embodiments, the description is given with regard to the case where the top pole chip having the two-layer structure is formed, but the invention is not necessarily limited to these embodiments, and a top pole chip having a multilayer structure comprising three or more layers may be formed. Also in this case, the same advantages as the advantages of the above-described embodiments can be obtained. When a plurality of magnetic materials having different magnetic flux densities are used as the materials of the portions for constituting the top pole chip, it is preferable that the magnetic flux density profile of the top pole chip be adjusted so that the magnetic flux density may become higher in a direction from top layer portion of the top pole chip to the bottom layer portion thereof, as described above. Of course, the magnetic flux density profile of the top pole chip may be freely adjusted.

In the above-described embodiments, the surface of the pole chip precursory layer is polished and flattened after forming the pole chip precursory layer for forming the pole chip portion for constituting the bottom layer portion of the top pole chip, but the invention is not necessarily limited to these embodiments. For example, the above-mentioned polishing may be eliminated in the case where the underlayer in the region where the pole chip precursory layer is formed is previously flat.

The planar shapes of the magnetic layer portions (the top pole chip, the top yoke, etc.) constituting the top pole described by referring to the above-mentioned embodiments are not necessarily limited to the planar shapes shown in FIGS. 13 and 28. The planar shapes can be freely changed, as long as they allow the optimization of the magnetic volumes of the magnetic layer portions and thus permit a sufficient supply of a magnetic flux generated by the thin film coil to the tip portion of the front end portion.

Although the method of manufacturing a composite thin film magnetic head has been described in the above-mentioned embodiments and the modifications thereof, the invention may be applied to a record-only thin film magnetic head having an inductive magnetic transducer for writing or a thin film magnetic head having an inductive magnetic transducer for both recording and reproducing. The invention may be applied to a thin film magnetic head having a structure in which the element for writing and the element for reading are stacked in reverse order.

As described above, according to the thin film magnetic head of the invention, the predetermined magnetic layer portion includes the first magnetic film and the second magnetic film which are located apart from and close to the gap layer, respectively, and both the first and second magnetic films are made of a magnetic material having a magnetic flux density of 1.5 tesla or more, so that a sufficient magnetic flux can be guided to a recording-medium-facing surface even when the uniform width portion for determining the write track width is locally minimized. Therefore, superior overwrite characteristics can be ensured.

When the first nonmagnetic layer pattern, which extends in such a manner that the rearward portion thereof is coupled to the insulating layer and the front edge thereof terminates at a predetermined position at the front of the recording-medium-facing surface, is provided between the second magnetic layer and the second magnetic film, the existence of the first nonmagnetic layer pattern allows preventing the leakage of magnetic flux between the first and second magnetic layers, thereby reducing the propagation loss of magnetic flux.

When the second nonmagnetic layer pattern, which extends in such a manner that the rearward portion thereof is coupled to the insulating layer and the front edge thereof terminates rearward with respect to the front edge of the first nonmagnetic layer pattern, is further provided between the first nonmagnetic layer pattern and the second magnetic film, the existence of the second nonmagnetic layer pattern allows further preventing the leakage of magnetic flux between the first and second magnetic layers and also allows further smoothing the flow of magnetic flux.

When the first and second nonmagnetic layer patterns are inclined to the flat surface of the second magnetic layer at and near the respective front edges of the first and second nonmagnetic layer patterns, a magnetic flux can more smoothly flow through the predetermined magnetic layer portion over the first and second nonmagnetic layer patterns.

When the front edge of the first nonmagnetic layer pattern is located in the region in which the uniform width portion of the predetermined magnetic layer portion lies, the leakage of magnetic flux can be prevented throughout almost all of the predetermined magnetic layer portion.

According to the method of manufacturing a thin film magnetic head of the invention, the method includes the steps of: forming the magnetic material layer; selectively forming the first magnetic film for constituting one part of the predetermined magnetic layer portion, on the magnetic material layer; and selectively etching the magnetic material layer by using the first magnetic film as a mask, thereby selectively forming the second magnetic film for constituting the other part of the predetermined magnetic layer portion. Therefore, an additional step of forming a mask for patterning the magnetic material layer becomes unnecessary. Accordingly, the number of steps required for manufacturing the thin film magnetic head can be reduced, so that the manufacturing time can be reduced.

When the magnetic material layer is formed by means of sputtering and the first magnetic film is formed through the growth of a plated film, the composition of the material of the magnetic material layer can be properly controlled.

When the step of etching involves reactive ion etching, the second magnetic film can be formed with higher accuracy in a shorter time.

When the step of etching takes place at a temperature of 50 degrees or higher, the time required for etching can be reduced.

When the step of etching further includes selectively removing the gap layer and the second magnetic layer except for the region where the uniform width portion of the predetermined magnetic layer portion is formed, the gap layer and the second magnetic layer can be processed with higher accuracy in a shorter time.

According to the method of manufacturing a thin film magnetic head of another aspect of the invention, the method includes the steps of: forming the magnetic material layer; polishing and flattening the surface of the magnetic material layer; and forming the first magnetic film on the flattened magnetic material layer, and therefore the first magnetic film is formed on the flat underlayer. Accordingly, the occurrence of problems and the like incident to exposure can be prevented, so that the first magnetic film can be formed with higher accuracy.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head including:
a first magnetic layer and a second magnetic layer which are magnetically coupled to each other and have two magnetic poles facing each other with a gap layer in between near and in a recording-medium-facing surface to be faced with a recording medium; and
a thin film coil provided between the first and second magnetic layers with an insulating layer in between, the first magnetic layer having a predetermined magnetic layer portion including a uniform width portion which extends away from the recording-medium-facing surface and determines a write track width on the recording medium,
wherein the predetermined magnetic layer portion includes a first magnetic film and a second magnetic film which are located apart from and close to the gap layer, respectively, and both the first and second magnetic films are made of a magnetic material having a magnetic flux density of 1.5 tesla or more, and
wherein a first nonmagnetic layer pattern, which extends in such a manner that the rearward portion thereof is coupled to the insulating layer and the front edge thereof terminates at a predetermined position at the front of the recording-medium-facing surface, is provided between the second magnetic layer and the second magnetic film.

2. A thin film magnetic head according to claim 1, wherein at least one of the first and second magnetic films is made of either an alloy containing at least nickel and iron or iron nitride.

3. A thin film magnetic head according to claim 2, wherein the alloy containing nickel and iron further contains at least cobalt.

4. A thin film magnetic head according to claim 1, wherein at least one of the first and second magnetic films is made of a material containing an amorphous alloy.

5. A thin film magnetic head according to claim 4, wherein the amorphous alloy is an alloy made of cobalt and iron, an oxide of an alloy made of zirconium, cobalt and iron, or a nitride of an alloy made of zirconium and iron.

6. A thin film magnetic head according to claim 1, wherein the first magnetic film is made of an alloy containing at least nickel, iron and cobalt, and the second magnetic film is made of either an alloy containing at least nickel and iron or an alloy made of cobalt and iron.

7. A thin film magnetic head according to claim 1, wherein an interface between the first and second magnetic films is flat.

8. A thin film magnetic head according to claim 6, wherein an interface between the first and second magnetic films is flat.

9. A thin film magnetic head according to claim 1, wherein the first nonmagnetic layer pattern is made of a nonmagnetic metal.

10. A thin film magnetic head according to claim 8, wherein a first nonmagnetic layer pattern, which extends in such a manner that the rearward portion thereof is coupled to the insulating layer and the front edge thereof terminates at a predetermined position at the front of the recording-medium-facing surface, is provided between the second magnetic layer and the second magnetic film.

11. A thin film magnetic head according to claim 10, wherein the first nonmagnetic layer pattern is made of a nonmagnetic metal.

12. A thin film magnetic head according to claim 9, wherein a second nonmagnetic layer pattern, which extends in such a manner that the rearward portion thereof is coupled to the insulating layer and the front edge thereof terminates rearward with respect to the front edge of the first nonmagnetic layer pattern, is further provided between the first nonmagnetic layer pattern and the second magnetic film.

13. A thin film magnetic head according to claim 12, wherein the second magnetic layer has a flat surface, and the first and second nonmagnetic layer patterns are inclined to the flat surface of the second magnetic layer at and near the respective front edges of the first and second nonmagnetic layer patterns.

14. A thin film magnetic head according to claim 11, wherein a second nonmagnetic layer pattern, which extends in such a manner that the rearward portion thereof is coupled to the insulating layer and the front edge thereof terminates rearward with respect to the front edge of the first nonmagnetic layer pattern, is further provided between the first nonmagnetic layer pattern and the second magnetic film.

15. A thin film magnetic head according to claim 14, wherein the second magnetic layer has a flat surface, and the first and second nonmagnetic layer patterns are inclined to the flat surface of the second magnetic layer at and near the respective front edges of the first and second nonmagnetic layer patterns.

16. A thin film magnetic head according to claim 13, wherein the front edge of the first nonmagnetic layer pattern is located in a region in which the uniform width portion of the predetermined magnetic layer portion lies.

17. A thin film magnetic head according to claim 15, wherein the front edge of the first nonmagnetic layer pattern is located in a region in which the uniform width portion of the predetermined magnetic layer portion lies.

* * * * *